United States Patent
Chen et al.

(10) Patent No.: US 11,790,502 B2
(45) Date of Patent: Oct. 17, 2023

(54) SYSTEMS AND METHODS FOR IMAGE PROCESSING

(71) Applicant: GUANGZHOU COMPUTATIONAL SUPER-RESOLUTION BIOTECH CO., LTD., Guangdong (CN)

(72) Inventors: Liangyi Chen, Guangzhou (CN); Haoyu Li, Guangzhou (CN); Weisong Zhao, Guangzhou (CN); Xiaoshuai Huang, Guangzhou (CN)

(73) Assignee: GUANGZHOU COMPUTATIONAL SUPER-RESOLUTIONS BIOTECH CO., LTD., Guangdong (CN)

(*) Notice: Subject to any disclaimer, the term of this patent is extended or adjusted under 35 U.S.C. 154(b) by 39 days.

(21) Appl. No.: 17/455,019

(22) Filed: Nov. 16, 2021

(65) Prior Publication Data
US 2022/0076393 A1     Mar. 10, 2022

Related U.S. Application Data

(63) Continuation of application No. 17/305,312, filed on Jul. 2, 2021, now Pat. No. 11,189,016, which is a
(Continued)

(51) Int. Cl.
*G06K 9/00* (2022.01)
*G06T 5/10* (2006.01)

(52) U.S. Cl.
CPC ...... *G06T 5/10* (2013.01); *G06T 2207/10056* (2013.01); *G06T 2207/10064* (2013.01); *G06T 2207/30024* (2013.01)

(58) Field of Classification Search
CPC . G06T 3/4053; G06T 3/4076; G06T 5/00–10; G06T 11/005; G06T 2211/424; G06T 2200/21; A61B 6/5258
See application file for complete search history.

(56) References Cited

U.S. PATENT DOCUMENTS

| 2009/0161932 | A1  | 6/2009 | Chen |
|---|---|---|---|
| 2009/0161933 | A1* | 6/2009 | Chen ............... A61B 6/037 382/131 |

(Continued)

FOREIGN PATENT DOCUMENTS

| CN | 105551000 A | 5/2016 |
|---|---|---|
| CN | 106991647 A | 7/2017 |

(Continued)

OTHER PUBLICATIONS

Jesse Aaron et al., A Guide to Accurate Reporting in Digital Image Processing—can Anyone Reproduce Your Quantitative Analysis?, Journal of Cell Science, 134(6): 1-10, 2021.
(Continued)

*Primary Examiner* — Atiba O Fitzpatrick
(74) *Attorney, Agent, or Firm* — METIS IP LLC

(57) ABSTRACT

Systems and methods for image processing are provided in the present disclosure. The systems may generate a preliminary image by filtering image data generated by an image acquisition device. The system may generate an intermediate image by performing, based on a first objective function, a first iterative operation on the preliminary image. The first objective function may include a first term associated with a first difference between the intermediate image and the preliminary image, a second term associated with continuity of the intermediate image and a third term associated with sparsity of the intermediate image. The systems may also generate a target image by performing, based on a second objective function, a second iterative operation on the intermediate image. The second objective function may be associated with a system matrix of the image acquisition device and a second difference between the intermediate image and the target image.

18 Claims, 38 Drawing Sheets

Related U.S. Application Data continuation of application No. PCT/CN2020/094853, filed on Jun. 8, 2020.

(56) References Cited

U.S. PATENT DOCUMENTS

| | | | |
|---|---|---|---|
| 2009/0274355 A1* | 11/2009 | Chen | G06T 11/006 382/131 |
| 2010/0128958 A1* | 5/2010 | Chen | G06T 11/006 382/278 |
| 2010/0310144 A1* | 12/2010 | Chen | G06T 11/006 382/131 |
| 2011/0262054 A1 | 10/2011 | Benson et al. | |
| 2011/0293193 A1* | 12/2011 | Garg | G06T 11/006 382/203 |
| 2012/0177267 A1* | 7/2012 | Chen | G06T 11/005 382/131 |
| 2013/0321908 A1* | 12/2013 | Babacan | G02B 21/365 359/385 |
| 2014/0219552 A1 | 8/2014 | Porikli et al. | |
| 2017/0191945 A1* | 7/2017 | Zhang | G06T 5/003 |
| 2017/0299681 A1* | 10/2017 | Trzasko | G01R 33/56308 |
| 2017/0316552 A1 | 11/2017 | Hanocka et al. | |
| 2018/0286088 A1* | 10/2018 | Hilbert | G01R 33/4835 |
| 2019/0076101 A1* | 3/2019 | Pan | A61B 6/032 |
| 2019/0209867 A1* | 7/2019 | Sun | G06T 7/0014 |
| 2020/0090382 A1 | 3/2020 | Huang et al. | |
| 2020/0105031 A1 | 4/2020 | Cheng et al. | |
| 2020/0111194 A1 | 4/2020 | Wang et al. | |
| 2020/0256942 A1* | 8/2020 | Wang | G01R 33/5608 |
| 2020/0279413 A1* | 9/2020 | Wheaton | G06T 7/0002 |
| 2020/0305756 A1* | 10/2020 | Wheaton | G01R 33/561 |
| 2020/0320752 A1 | 10/2020 | Chen et al. | |
| 2021/0158583 A1* | 5/2021 | Huang | G06N 3/08 |
| 2021/0319600 A1* | 10/2021 | Tao | A61B 6/5211 |
| 2021/0366168 A1* | 11/2021 | Hu | G06T 7/11 |
| 2022/0114711 A1* | 4/2022 | Ozcan | G06T 3/4076 |
| 2022/0262001 A1* | 8/2022 | Lyu | G06T 7/0016 |

FOREIGN PATENT DOCUMENTS

| | | |
|---|---|---|
| CN | 108665411 A | 10/2018 |
| CN | 109741258 A | 5/2019 |
| CN | 110276813 A | 9/2019 |
| CN | 111127575 A | 5/2020 |
| WO | 2017149399 A2 | 9/2017 |
| WO | 2020006352 A1 | 1/2020 |

OTHER PUBLICATIONS

L. B. Lucy, Statistical Limits to Superresolution, Astronomy and Astrophysics, 261(2): 706-710, 1992.
Timo Aspelmeier et al., Modern Statistical Challenges in High-Resolution Fluorescence Microscopy, Annual Review of Statistics and Its Application, 2: 163-202, 2015.
Mark Stanford Robbins et al., The Noise Performance of Electron Multiplying Charge-Coupled Devices, IEEE Transactions on Electron Devices, 50(5): 1227-1232, 2003.
Alessandro Foi et al., Practical Poissonian-Gaussian Noise Modeling and Fitting for Single-Image Raw-Data, IEEE Transactions on Image Processing, 1-18, 2008.
Kim I. Mortensen et al., Optimized Localization-Analysis for Single-Molecule Tracking and Super-Resolution Microscopy, Nature Methods, 2010, 16 pages.
Michael Hirsch et al., A Stochastic Model for Electron Multiplication Charge-Coupled Devices—From Theory to Practice, Plos One, 8(1): e53671-1-e53671-13, 2013.
Liu, Sheng et al., SCMOS Noise-Correction Algorithm for Microscopy Images, Nature Methods, 14(8): 760-761, 2017.
Max Born et al., Principles of Optics, Edition 7th, Cambridge University Press, 1999, 854 pages.
Rainer Heintzmann et al., The Sampling Limit in Fluorescence Microscopy, Micron, 38: 145-149, 2007.
Adolf W. Lohmann et al., Space-Bandwidth Product of Optical Signals and Systems, Journal of the Optical Society of America A, 13(3): 470-473, 1996.
Eric Betzig et al., Imaging Intracellular Fluorescent Proteins at Nanometer Resolution, Science, 313: 1642-1645, 2006.
Michael J. Rust et al., Sub-Diffraction-Limit Imaging by Stochastic Optical Reconstruction Microscopy (STORM), Nature Methods, 2006, 3 pages.
Jervis Vermal Thevathasan et al., Nuclear Pores as Versatile Reference Standards for Quantitative Superresolution Microscopy, Nature Methods, 2019, 30 pages.
S. P. Lloyd, Least Squares Quantization in PCM, IEEE Transactions on Information Theory, 28(2): 129-137, 1982.
Amir Beck et al., A Fast Iterative Shrinkage-Thresholding Algorithm for Linear Inverse Problems, Siam J. Imaging Sciences, 2(1): 183-202, 2009.
Mats G. Lofdahl, Multi-Frame Blind Deconvolution with Linear Equality Constraints, Image Reconstruction from Incomplete Data II, 1-10, 2002.
David A. Agard et al., Three-Dimensional Microscopy: Image Processing For High Resolution Subcellular Imaging, Proceedings of Spie the International Society for Optical, 1161: 24-30, 1989.
Aggelos K. Katsaggelos, Iterative Image Restoration Algorithms, Optical Engineering, 28(7): 735-748, 1989.
The Extended European Search Report in European Application No. 20904266.2 dated Nov. 26, 2021, 6 pages.
First Office Action in Chinese Application No. 202080012667.7 dated Dec. 17, 2021, 12 pages.
I. J. Cox et al., Information Capacity and Resolution in an Optical System, Journal of the Optical Society of America, 3(8): 1152-1158, 1986.
A. Descloux et al., Parameter-Free Image Resolution Estimation Based on Decorrelation Analysis, Nature Methods, 2019, 7 pages.
Zhang, Yulin et al., Mitochondria Determine the Sequential Propagation of the Calcium Macrodomains Revealed by the Super-Resolution Calcium Lantern Imaging, Science China Life Sciences, 63(10): 1543-1551, 2020.
Mo, Yanquan et al., Structured Illumination Microscopy Artifacts Caused by Illumination Scattering, BioRxiv, 2021, 18 pages.
Shawn M. Douglas et al., Rapid Prototyping of 3D DNA-Origami Shapes with CaDNAno, Nucleic Acids Research, 37(15): 5001-5006, 2009.
Do-Nyun Kim et al., Quantitative Prediction of 3D Solution Shape and Flexibility of Nucleic Acid Nanostructures, Nucleic Acids Research, 40(7): 2862-2868, 2012.
Carlos Ernesto Castro et al., A Primer to Scaffolded DNA Origami, Nature Methods, 8(3): 221-229, 2011.
Gu, Lusheng et al., Molecular Resolution Imaging by Repetitive Optical Selective Exposure, Nature Methods, 2019, 5 pages.
Paul W Tillberg et al., Protein-Retention Expansion Microscopy of Cells and Tissues Labeled Using Standard Fluorescent Proteins and Antibodies, Nature Biotechnology, 34(9): 987-992, 2016.
Philippe Thevenaz et al., A Pyramid Approach to Subpixel Registration Based on Intensity, IEEE Transactions on Image Processing, 7(1): 27-41, 1998.
Wang, Zhou et al., Image Quality Assessment: From Error Visibility to Structural Similarity, IEEE Transactions on Image Processing, 13(4): 600-612, 2004.
Martin Weigert et al., Content-Aware Image Restoration: Pushing the Limits of Fluorescence Microscopy, Nature Methods, 2018, 8 pages.
Zhang, Zhen et al., Extracting Microtubule Networks from Super-resolution Single-Molecule Localization Microscopy Data, Molecular Biology of the Cell, 28(2): 333-345, 2017.
F.P.Ph. De Vries, Automatic, Adaptive, Brightness Independent Contrast Enhancement, Signal Processing, 1990, 14 pages.
F. Meyer et al., Morphological Segmentation, Journal of Visual Communication and Image Representation, 1(1): 21-46, 1990.
S. D. Yanowitz et al., A New Method for Image Segmentation, Computer Vision, Graphics, and Image Processing, 46(1): 82-95, 1989.

(56) References Cited

OTHER PUBLICATIONS

Peng, Tingying et al., A BaSiC Tool for Background and Shading Correction of Optical Microscopy Images, Nature Communications, 2017, 7 pages.
Matthias Geissbuehler et al., How to Display Data By Color Schemes Compatible with Rred-Green Color Perception Deficiencies, Optics Express, 21(8): 9862-9874, 2013.
Loic A Royer et al., ClearVolume: Open-Source Live 3D Visualization for Light-Sheet Microscopy, Nature Methods, 12(6): 480-481, 2015.
Benjamin Schmid et al., 3Dscript: Animating 3D/4D Microscopy Data Using a Natural-Language-Based Syntax, Nature Methods, 2019, 3 pages.
Lothar Schermelleh et al., Super-Resolution Microscopy Demystified, Nature Cell Biology, 2019, 13 pages.
Xu, Ke et al., Actin, Spectrin, and Associated Proteins Form a Periodic Cytoskeletal Structure in Axons, Science, 339(6118): 452-456, 2013.
Steffen Lawo et al., Subdiffraction Imaging of Centrosomes Reveals Higher-Order Organizational Features of Pericentriolar Material, Nature Cell Biology 14(11): 1148-1158, 2012.
V. Mennella et al., Subdiffraction-Resolution Fluorescence Microscopy Reveals a Domain of the Centrosome Critical for Pericentriolar Material Organization, Nature Cell Biology, 14(11): 1159-1168, 2012.
M. F. Garcia-Parajo et al., Real-Time Light-Driven Dynamics of the Fluorescence Emission in Single Green Fluorescent Protein Molecules, Proceedings of the National Academy Sciences of the United States of America, 97(13): 7237-7242, 2000.
Steffen J. Sahl et al., Comment on "Extended-Resolution Structured Illumination Imaging of Endocyticand Cytoskeletal Dynamics", Science, 2016, 4 pages.
L.H. Schaefer et al., Structured Illumination Microscopy: Artefact Analysis and Reduction Utilizing a Parameter Optimization Approach, Journal of Microscopy, 216(2): 165-174, 2004.
B. R. Hunt, Super-Resolution of Images: Algorithms, Principles, Performance, International Journal of Imaging Systems and Technology 6(4): 297-304, 1995.
W. Lukosz, Optical Systems with Resolving Powers Exceeding the Classical Limit, Journal of the Optical Society of America, 56(11): 1463-1472, 1966.
W. Lukosz, Optical Systems with Resolving Powers Exceeding the Classical Limit. II, Journal of the Optical Society of America, 57(7): 932-941, 1967.
P. B. Fellgett et al., On the Assessment of Optical Images, Philosophical Transactions of the Royal Society of London. Series A, Mathematical and Physical Sciences, 247(931): 369-407, 1955.
L. A. Shepp et al., Maximum Likelihood Reconstruction for Emission Tomography, IEEE Transactions on Medical Imaging, 1(2): 113-122, 1982.
Zhu, Lei et al., Using Total-Variation Regularization for Intensity Modulated Radiation Therapy Inverse Planning with Field-Specific Numbers of Segments, Physics in Medicine and Biology, 53(23): 6653-6672, 2008.
Vincent Studer et al., Compressive Fluorescence Microscopy for Biological and Hyperspectral Imaging, Proceedings of the National Academy of Sciences of the United States of America, 109(26): 1679-1687, 2012.
Hazen P. Babcock et al., Fast Compressed Sensing Analysis for Super-Resolution Imaging Using L1-Homotopy, Optics Express, 21(23): 28583-28596, 2013.
C. M. Galloway et al., An Iterative Algorithm for Background Removal in Spectroscopy by Wavelet Transforms, Applied Spectroscopy, 63(12): 1370-1376, 2009.
Tom Goldstein et al., The Split Bregman Method for L1-Regularized Problems, SIAM Journal on Imaging Sciences, 2(2): 323-343, 2009.
L. Landweber, An Iteration Formula for Fredholm Integral Equations of the First Kind, American Journal of Mathematics, 73(3): 615-624, 1951.

Ilya Sutskever et al., On the Importance of Initialization and Momentum in Deep Learning, Proceedings of the 30th International Conference on Machine Learning, 28(3): 1139-1147, 2013.
Eugene Veklerov et al., Stopping Rule forthe MLE Algorithm Based on Statistical Hypothesis Testing, IEEE Transactions on Medical Imaging, 6(4): 313-319, 1987.
David S. C. Biggs et al., Acceleration of Iterative Image Restoration Algorithms, Applied Optics, 36(8): 1766-1775, 1997.
Stefan Geissbuehler et al., Mapping Molecular Statistics with Balanced Super-Resolution Optical Fluctuation Imaging (bSOFI), Optical Nanoscopy, 2012, 7 pages.
Simon C. Stein et al., Fourier Interpolation Stochastic Optical Fluctuation Imaging, Optics Express, 23(12): 16154-16163, 2015.
Wang, Yilun et al., A New Alternating Minimization Algorithm for Total Variation Image Reconstruction, SIAM Journal on Imaging Sciences, 1(3): 248-272, 2008.
John Z Xue et al., Nuclear Assembly Shaped by Microtubule Dynamics, Nucleus, 5(1): 40-46, 2014.
Erney Ramïrez-Aportela et al., FSC-Q: A CryoEM Map-To-Atomic Model Quality Validation Based On The Local Fourier Shell Correlation, Nature Communications, 12: 1-7, 2021.
Richard J. Marsh et al., Sub-diffraction Error Mapping for Localisation Microscopy Images, Nature Communications, 12: 1-13, 2021.
Zhao, Weisong et al., Extending Resolution of Structured Illumination Microscopy with Sparse Deconvolution, Research Square, 2021, 56 pages.
Jonathon Nixon-Abell et al., Increased Spatiotemporal Resolution Reveals Highly Dynamic Dense Tubular Matrices in the Peripheral ER, Science, 2016, 29 pages.
Alex M. Valm et al., Applying Systems-level Spectral Imaging and Analysis to Reveal the Organelle Interactome, Nature, 2017, 32 pages.
Samuel T. Hess et al., Dynamic Clustered Distribution of Hemagglutinin Resolved at 40 nm in Living Cell Membranes Discriminates Between Raft Theories, Proceedings of the National Academy of Sciences of the United States of America, 104(44): 17370-17375, 2007.
Hari Shroff et al., Live-Cell Photoactivated Localization Microscopy of Nanoscale Adhesion Dynamics, Nat Methods, 2008, 16 pages.
Volker Westphal et al., Video-Rate Far-Field Optical Nanoscopy Dissects Synaptic Vesicle Movement, Science, 320(5873): 246-249, 2008.
Zhu, Lei et al., Faster STORM Using Compressed Sensing, Nature Methods, 2012, 6 pages.
Wonchul Shin et al., Visualization of Membrane Pore in Live Cells Reveals a Dynamic-Pore Theory Governing Fusion and Endocytosis, Cell , 2018, 25 pages.
Antoine G. Godin et al., Super-Resolution Microscopy Approaches for Live Cell Imaging, Biophysical Journal, 107(8): 1777-1784, 2014.
Huang, Xiaoshuai et al., Fast, Long-Term, Super-Resolution Imaging with Hessian Structured Illumination Microscopy, Nature Biotechnology, 36(5): 451-459, 2018.
Li, Dong et al., Extended-Resolution Structured Illumination Imaging of Endocytic and Cytoskeletal Dynamics, Science, 2015, 12 pages.
Guo, Yuting et al., Visualizing Intracellular Organelle and Cytoskeletal Interactions at Nanoscale Resolution on Millisecond Timescales, Cell, 175(5): 1430-1442, 2018.
Hans Wolter, On Basic Analogies and Principal Differences Between Optical and Electronic Information, Progress in Optics, 1961, 58 pages.
J. L. Harris, Diffraction and Resolving Power, Journal of the Optical Society of America, 54(7): 931-936, 1964.
Joseph W. Goodman, Introduction to Fourier Optics, Roberts and Company Publishers, 2005, 457 pages.
Jari Lindberg, Mathematical Concepts of Optical Superresolution, Journal of Optics, 14(8): 1-23, 2012.
Mario Bertero et al., Super-Resolution by Data Inversion, Progress in Optics, 1996, 50 pages.

(56) References Cited

OTHER PUBLICATIONS

William Hadley Richardson, Bayesian-Based Iterative Method of Image Restoration, Journal of the Optical Society of America, 62(1): 55-59, 1972.
L. B. Lucy, An Iterative Technique for the Rectification of Observed Distributions, The Astronomical Journal, 79(6): 745-754, 1974.
L. B. Lucy, Resolution Limits for Deconvolved Images, The Astronomical Journal, 104(3): 1260-1265, 1992.
K. G. Puschmann et al., On Super-Resolution in Astronomical Imaging, Astronomy & Astrophysics, 436(1): 373-378, 2005.
Snir Gazit et al., Super-Resolution and Reconstruction of Sparse Sub-Wavelength Images, Optics Express, 2009, 5 pages.
Laurent Demanet et al., The Recoverability Limit for Superresolution via Sparsity, arXiv:1502.01385v1 [cs.IT], 2015, 19 pages.
Albert C. Fannjiang, Compressive Imaging of Subwavelength Structures, SIAM Journal on Imaging Sciences, 2(4): 1277-1291, 2009.
Olaf Schulz et al., Resolution Doubling in Fluorescence Microscopy with Confocal Spinning-Disk Image Scanning Microscopy, Proceedings of the National Academy of Sciences of the United States of America, 110(52): 21000-21005, 2013.
Zong, Weijian et al., Fast High-Resolution Miniature Two-Photon Microscopy for Brain Imaging in Freely Behaving Mice, Nature Methods, 14(7): 713-720, 2017.
De-En Sun et al., Click-ExM Enables Expansion Microscopy for All Biomolecules, Nature Methods, 2021, 26 pages.
Nicolas Dey et al., Richardson-Lucy Algorithm with Total Variation Regularization for 3D Confocal Microscope Deconvolution, Microscopy Research and Technique, 69(4): 260-266, 2006.
M. Laasmaa et al., Application of Regularized Richardson-Lucy Algorithm for Deconvolution of Confocal Microscopy Images, Journal of Microscopy, 243(2): 124-140, 2011.
Emmanuel J. Candes et al., Near-Optimal Signal Recovery From Random Projections: Universal Encoding Strategies?, IEEE Transactions on Information Theory, 52(12): 5406-5425, 2006.
David P. Hoffman et al., The Promise and Peril of Deep Learning in Microscopy, Nature Methods, 2021, 2 pages.
Chinmay Belthangady et al., Applications, Promises, and Pitfalls of Deep Learning for Fluorescence Image Reconstruction, Nature Methods, 2019, 11 pages.
Anna Szymborska et al., Nuclear Pore Scaffold Structure Analyzed by Super-Resolution Microscopy and Particle Averaging, Science, 341(6146): 655-658, 2013.
Jiong Ma et al., Super-Resolution Mapping of Scaffold Nucleoporins in the Nuclear Pore Complex, Journal of Cell Science, 130(7): 1299-1306, 2017.
Fabian Göttfert et al., Strong Signal Increase in STED Fluorescence Microscopy by Imaging Regions of Subdiffraction Extent, Proceedings of the National Academy of Sciences of the United States of America, 114(9): 2125-2130, 2017.
Xia, Shumin et al., Nanoscale Architecture of the Cortical Actin Cytoskeleton in Embryonic Stem Cells, Cell Reports, 28(5): 1251-1267, 2019.
A. Szameit et al., Sparsity-Based Single-Shot Subwavelength Coherent Diffractive Imaging, Nature Materials, 2012, 5 pages.
Robert P J Nieuwenhuizen et al., Measuring Image Resolution in Optical Nanoscopy, Nature Methods, 10(6): 557-562, 2013.
Siân Culley et al., Quantitative Mapping and Minimization of Super-Resolution Optical Imaging Artifacts, Nature Methods, 15(4): 263-266, 2018.
R. L. Ornberg et al., Beginning of Exocytosis Captured by Rapid-Freezing of Limulus Amebocytes, The Journal of Cell Biology, 90(1): 40-54, 1981.
Christian A. Wurm et al., Nanoscale Distribution of Mitochondrial Import Receptor Tom20 is Adjusted to Cellular Conditions and Exhibits an Inner-Cellular Gradient, Proceedings of the National Academy of Sciences of the United States of America, 108(33): 13546-13551, 2011.
Andrew G York et al., Instant Super-Resolution Imaging in Live Cells and Embryos via Analog Image Processing, Nature Methods, 10(11): 1122-1126, 2013.
Andrew G York et al., Resolution Doubling in Live, Multicellular Organisms via Multifocal Structured Illumination Microscopy, Nature Methods, 9(7): 749-754, 2012.
Claus B. Muller et al., Image Scanning Microscopy, Physical Review Letters, 2010, 4 pages.
Patrick Theer et al., PSFj: Know Your Fluorescence Microscope, Nature Methods, 11(10): 981-982, 2014.
Saveez Saffarian et al., Distinct Dynamics of Endocytic Clathrin-Coated Pits and Coated Plagues, PLoS Biology, 2009, 18 pages.
Florian Luisier et al., Fast Interscale Wavelet Denoising of Poisson-Corrupted Images, Signal Processing, 90(2): 415-427, 2010.
Bei-Bei Chu et al., Cholesterol Transport Through Lysosome-Peroxisome Membrane Contacts, Cell, 161(2): 291-306, 2015.
International Search Report in PCT/CN2020/094853 dated Mar. 8, 2021, 5 pages.
Written Opinion in PCT/CN2020/094853 dated Mar. 8, 2021, 4 pages.

* cited by examiner

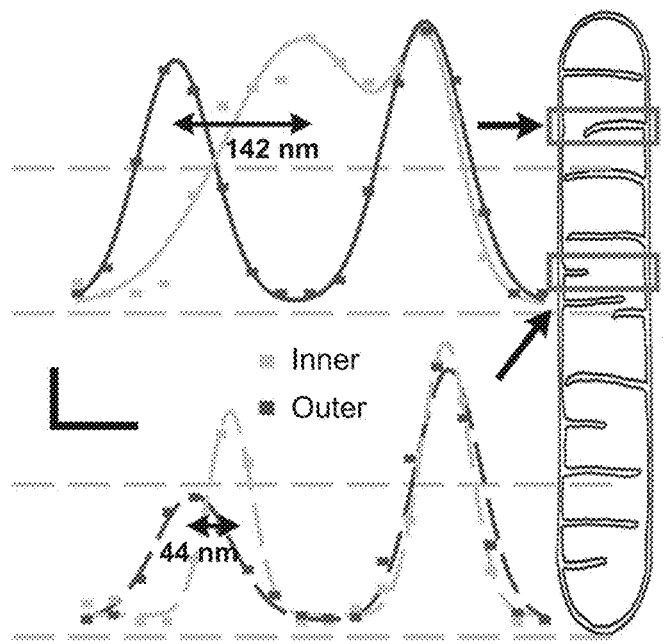 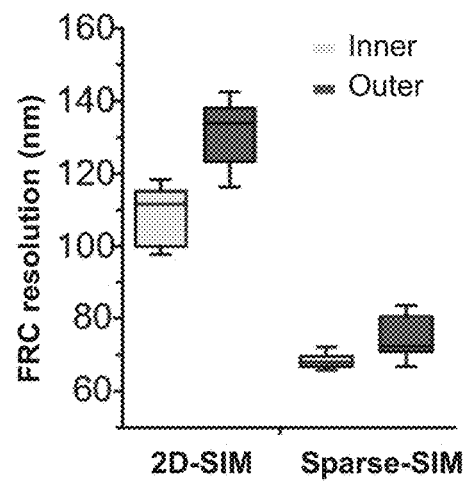
FIG. 9C  FIG. 9D
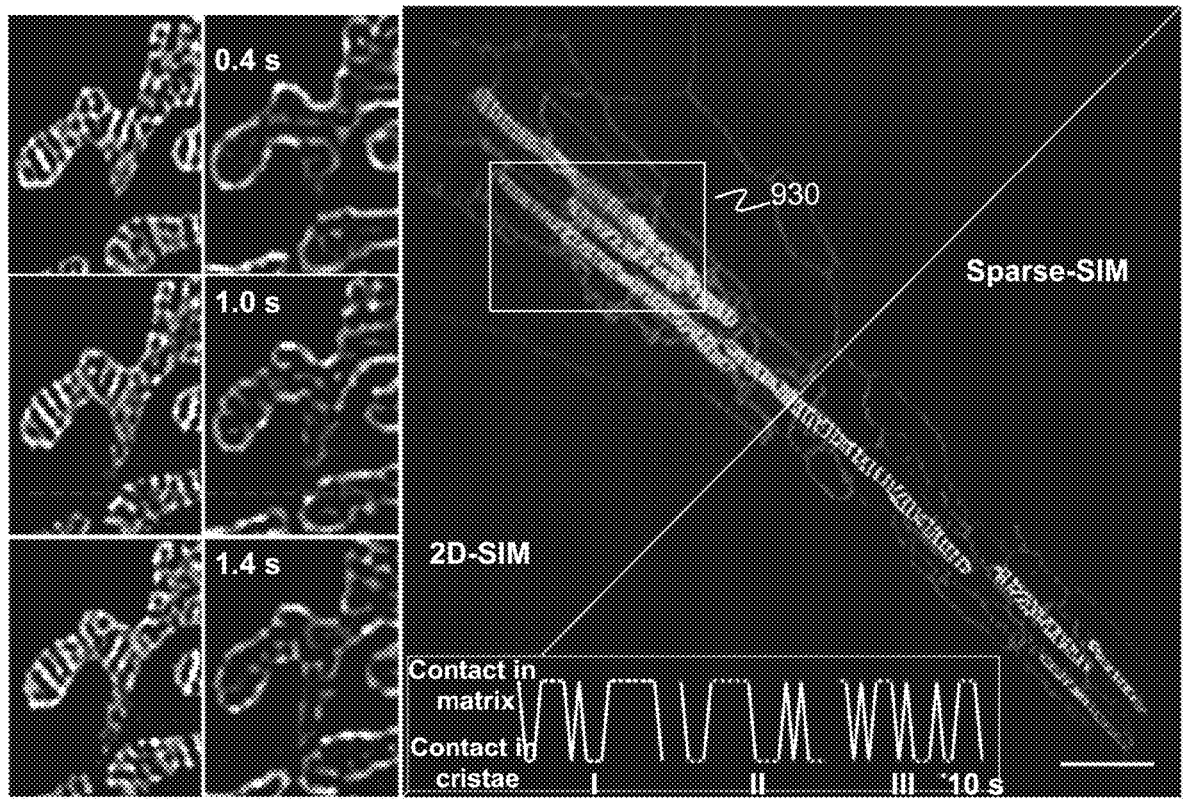
FIG. 9E  FIG. 9F

SYSTEMS AND METHODS FOR IMAGE PROCESSING

CROSS-REFERENCE TO RELATED APPLICATION

This application is a Continuation of U.S. application Ser. No. 17/305,312, filed on Jul. 2, 2021, which is a Continuation of International Application No. PCT/CN2020/094853, filed on Jun. 8, 2020, the contents of which are incorporated herein by reference.

TECHNICAL FIELD

The present disclosure relates to the field of image processing, and in particular, to systems and methods for reconstructing superresolution images that extract spatial resolution beyound the image data generated by an image acquisition device.

BACKGROUND

Original images generated or collected by an image acquisition device (e.g., a microscope, a telescope, a camera, a webcam) usually have relatively poor resolution and/or relatively low contrast, due to problems such as photobleaching, phototoxicity, etc. Image processing techniques are widely used in image reconstruction to produce images with higher qualities. However, conventional image processing techniques are limited by factors such as signal to noise ratio (SNR), physical optics limits, or the like, thereby the reconstructed images usually have artifacts or the reconstruction speed may be relatively low. Therefore, it is desirable to provide systems and methods for efficient image processing to effectively improve image resolution and reconstruction speed.

SUMMARY

In one aspect of the present disclosure, a method for image processing may be provided. The method may be implemented on at least one machine each of which has at least one processor and at least one storage device. The method may include generating a preliminary image by filtering image data generated by an image acquisition device. The method may include generating an intermediate image by performing, based on a first objective function, a first iterative operation on the preliminary image. The first objective function may include a first term, a second term and a third term. The first term may be associated with a first difference between the intermediate image and the preliminary image. The second term may be associated with continuity of the intermediate image. The third term may be associated with sparsity of the intermediate image. The method may also include generating a target image by performing, based on a second objective function, a second iterative operation on the intermediate image. The second objective function may be associated with a system matrix of the image acquisition device and a second difference between the intermediate image and the target image.

In another aspect of the present disclosure, a system for image processing is provided. The system may include at least one storage medium including a set of instructions, and at least one processor in communication with the at least one storage medium. When executing the set of instructions, the at least one processor may be directed to cause the system to perform following operations. The at least one processor may generate a preliminary image by filtering image data generated by an image acquisition device. The at least one processor may generate an intermediate image by performing, based on a first objective function, a first iterative operation on the preliminary image. The first objective function may include a first term, a second term and a third term. The first term may be associated with a first difference between the intermediate image and the preliminary image. The second term may be associated with continuity of the intermediate image. The third term may be associated with sparsity of the intermediate image. The at least one processor may generate a target image by performing, based on a second objective function, a second iterative operation on the intermediate image. The second objective function may be associated with a system matrix of the image acquisition device and a second difference between the intermediate image and the target image.

In another aspect of the present disclosure, a non-transitory computer readable medium is provided. The non-transitory computer readable medium may include at least one set of instructions for image processing. When executed by one or more processors of a computing device, the at least one set of instructions may cause the computing device to perform a method. The method may include generating a preliminary image by filtering image data generated by an image acquisition device. The method may include generating an intermediate image by performing, based on a first objective function, a first iterative operation on the preliminary image. The first objective function may include a first term, a second term and a third term. The first term may be associated with a first difference between the intermediate image and the preliminary image. The second term may be associated with continuity of the intermediate image. The third term may be associated with sparsity of the intermediate image. The method may also include generating a target image by performing, based on a second objective function, a second iterative operation on the intermediate image. The second objective function may be associated with a system matrix of the image acquisition device and a second difference between the intermediate image and the target image.

In another aspect of the present disclosure, a system for image processing is provided. The system may include a primary image generation module, a sparse reconstruction module, and a deconvolution module. The primary image generation module may be configured to generate a preliminary image by filtering image data generated by an image acquisition device. The sparse reconstruction module may be configured to generate an intermediate image by performing, based on a first objective function, a first iterative operation on the preliminary image. The first objective function may include a first term, a second term and a third term. The first term may be associated with a first difference between the intermediate image and the preliminary image. The second term may be associated with continuity of the intermediate image. The third term may be associated with sparsity of the intermediate image. The deconvolution module may be configured to generate a target image by performing, based on a second objective function, a second iterative operation on the intermediate image. The second objective function may be associated with a system matrix of the image acquisition device and a second difference between the intermediate image and the target image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in detail of exemplary embodiments. These exemplary embodiments are described in detail with reference to the drawings. These embodiments are not limiting, and in these embodiments, the same number indicates the same structure, wherein:

FIGS. 9A-9G illustrate exemplary results indicating intricate dynamics within the mitochondria and between ER-mitochondria visualized by dual-color Sparse-SIM according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that the term "object" and "subject" may be used interchangeably as a reference to a thing that undergoes an imaging procedure of the present disclosure.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
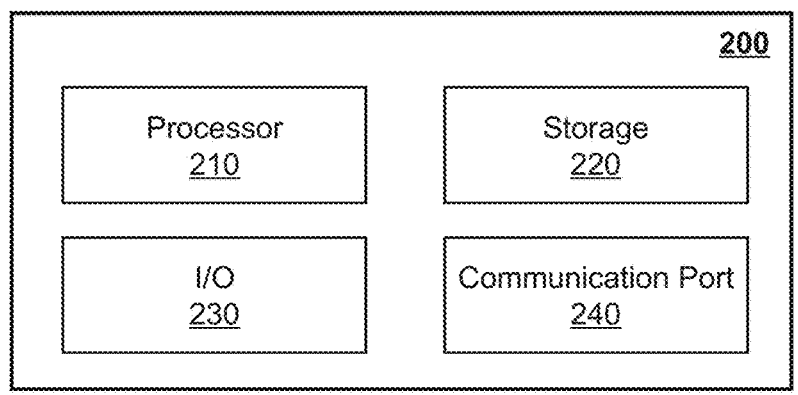
FIG. 2 is a schematic diagram illustrating an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

It should be noted that when an operation is described to be performed on an image, the term "image" used herein may refer to a dataset (e.g., a matrix) that contains values of pixels (pixel values) in the image. As used herein, a representation of an object (e.g., a person, an organ, a cell, or a portion thereof) in an image may be referred to as the object for brevity. For instance, a representation of a cell or organelle (e.g., mitochondria, endoplasmic reticulum, centrosome, Golgi apparatus, etc.) in an image may be referred to as the cell or organelle for brevity. As used herein, an operation on a representation of an object in an image may be referred to as an operation on the object for brevity. For instance, a segmentation of a portion of an image including a representation of a cell or organelle from the image may be referred to as a segmentation of the cell or organelle for brevity.

It should be understood that the term "resolution" as used herein, refers to a measure of the sharpness of an image. The term "superresolution" or "super-resolved" or "SR" as used herein, refers to an enhanced (or increased) resolution, e.g., which may be obtained by a process of combining a sequence of low-resolution images to generate a higher resolution image or sequence. The term "fidelity" or "integrity" as used herein, refers to a degree to which an electronic device (e.g., an image acquisition device) accurately reproduces its effect (e.g., image). The term "continuity" as used herein, refers to a feature that is temporally and/or spatially continuous. The term "sparsity" as used herein, refers to a feature that a vector or matrix is mostly zeros, e.g., a count of values of 0 in a vector or matrix is much greater than a count of values of 1 in the vector or matrix.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood the operations of the flowcharts may be implemented not in order. Conversely, the operations may be implemented in inverted order, or simultaneously. Moreover, one or more other operations may be added to the flowcharts. One or more operations may be removed from the flowcharts.

The present disclosure relates to systems and methods for image processing. The systems and methods may generate a preliminary image by filtering image data generated by an image acquisition device. The systems and methods may generate an intermediate image by performing, based on a first objective function, a first iterative operation on the preliminary image. The first objective function may include a first term, a second term, and a third term. The first term may be associated with a first difference between the intermediate image and the preliminary image. The second term may be associated with the continuity of the intermediate image. The third term may be associated with the sparsity of the intermediate image. The systems and methods may generate a target image by performing, based on a second objective function, a second iterative operation on the intermediate image. The second objective function may be associated with a system matrix of the image acquisition device and a second difference between the intermediate image and the target image.

According to the systems and methods of the present disclosure, the image data generated from the image acquisition device may be reconstructed in consideration of the fidelity (and/or integrity), the continuity and the sparsity of the image information to generate the target image, thereby improving reconstruction speed and reducing photobleaching. The processed (or reconstructed) target image may include an improved resolution and contrast in comparison to a reference image that is generated in consideration of only the fidelity and the continuity. What's more, the systems and methods can extend the resolution of the target image beyond physical limits posed by the image acquisition device, and can permit extrapolations of bandwidth limited by the image acquisition device.

Moreover, although the systems and methods disclosed in the present disclosure are described primarily regarding the processing of images generated by structured illumination microscopy, it should be understood that the descriptions are merely provided for the purposes of illustration, and not intended to limit the scope of the present disclosure. The systems and methods of the present disclosure may be applied to any other kind of systems including an image acquisition device for image processing. For example, the systems and methods of the present disclosure may be applied to microscopes, telescopes, cameras (e.g., surveillance cameras, camera phones, wedcams), unmanned aerial vehicles, medical imaging devices, or the like, or any combination thereof.

Merely by way of example, the methods disclosed in the present disclosure may be used to process images generated by structured illumination microscopy (SIM), and obtain reconstructed images with a relatively high resolution. In some embodiments, to temporally encode superresolution information via specific optics and fluorescent on-off indicators, modern live-cell superresolution microscopes may be ultimately limited by the maximum collected photon flux. Taking advantage of a priori knowledge of the sparsity and continuity of fluorescent structures, a mathematical deconvolution algorithm that extends resolution beyond physical limits posed by the hardware may be provided in the present disclosure. As a result, sparse structured illumination microscopy (Sparse-SIM) (e.g., SIM using sparse reconstruction (e.g., sparse deconvolution) as described in FIG. 5) may achieve substantially 60 nm resolution at a temporal resolvability of substantially 2 ms, allowing it to resolve intricate structures (e.g., small vesicular fusion pores, relative movements between the inner and outer membranes of mitochondria in live cells, etc.). Likewise, sparse spinning-disc confocal-based SIM may allow routine four-color and three-dimensional live-cell SR imaging (with substantially 90 nm resolution), demonstrating the general applicability of sparse deconvolution.

The emergence of superresolution (SR) fluorescence microscopy technologies may have revolutionized biology and enabled previously unappreciated, intricate structures to be observed, such as periodic actin rings in neuronal dendrites, nuclear pore complex structures, and the organization of pericentriolar materials surrounding the centrioles. However, many of these earlier experiments were conducted in fixed cells in which the dynamic structural and functional changes of cellular structures were lost.

Despite theoretically unlimited resolution for all major classes of SR technologies, the spatial resolution of live-cell SR microscopy may be limited. On the one hand, for a finite number of fluorophores within the cell volume, an N-fold increase in spatial resolution in the XYZ axes may lead to voxels that are $N^3$-fold smaller, requiring a more than $N^3$-fold increase in illumination intensity to maintain the same contrast. Furthermore, because multiple raw images are usually taken to reconstruct one super-resolved image, relatively small voxels may be more likely to be affected by motion artifacts of mobile molecules in live cells, which may degrade the achievable resolution. Therefore, any increase in spatial resolution may need to be matched with an increase in temporal resolution to maintain meaningful resolution. Given the saturation of fluorescence emissions at excessive illumination, the highest spatial resolution of current live-SR microscopy may be limited to, e.g., substantially 60 nm, irrespective of the imaging modalities used. To achieve that resolution, excessive illumination power (e.g., kW-MW/mm$^2$) and/or long exposures (e.g., >2 s) may be usually required, which may compromise both the integrity of the holistic fluorescent structure and the practical resolution of fast-moving subcellular structures, such as tubular endoplasmic reticulum, lipid droplets, mitochondria, and lysosomes.

Compared to other types of SR imaging technologies, structured illumination microscopy (SIM) may have higher photon efficiency but may be prone to artifacts. By developing a Hessian deconvolution for SIM reconstruction, high-fidelity SR imaging may be achieved using only one-tenth of the illumination dose needed in conventional SIM, which enables ultrafast and hour-long imaging in live cells. However, Hessian SIM may suffer from a resolution limit of, e.g., 90-110 nm posed by linear spatial frequency mixing, which prevents structures such as small caveolae or vesicle fusion pores from being well resolved. Although nonlinear SIM may be used to achieve substantially 60 nm resolution, such implementations may come at a cost of reduced temporal resolution and may require photoactivatable or photoswitchable fluorescent proteins that are susceptible to photobleaching. In addition, because conventional SIM uses wide-field illumination, the fluorescence emissions and the scattering from the out-of-focus planes may compromise image contrast and resolution inside deep layers of the cell cytosol and nucleus. Although total internal reflection illumination or grazing incidence illumination can be combined with SIM, high-contrast SR-SIM imaging may be largely limited to imaging depths of, e.g., 0.1-1 µm. It may be challenging for SR technologies to achieve millisecond frame rates with substantially 60 nm spatiotemporal resolution (e.g., in live cells), or be capable of multiple-color, three-dimensional, and/or long-term SR imaging.

As first proposed in the 1960s and 1970s, mathematical bandwidth extrapolation may be used to boost spatial resolution. It follows that when the object been imaged has a finite size, there may exist a unique analytic function that coincides inside the bandwidth-limited frequency spectrum band of the optical transfer function (OTF) of the image acquisition device, thus enabling the reconstruction of the complete object by extrapolating the observed spectrum. However, these bandwidth extrapolation operations may fail in actual applications because the reconstruction critically depends on the accuracy and availability of the assumed a priori knowledge. By replacing specific prior knowledge regarding the object itself with a more general sparsity assumption, a compressive sensing paradigm may enable SR in proof-of-principle experiments. However, such reconstructions may be unstable unless the measurement is carried out in the near field, while its resolution limit is inversely proportional to the SNR. Thus, although theoretically possible, it may be challenging to demonstrate mathematical SR technologies in real biological experiments. More descriptions of the mathematical SR technologies may be found elsewhere in the present disclosure (e.g., FIGS. 4-6 and the description thereof). More descriptions of the biological experiments may be found elsewhere in the present disclosure (e.g., Examples. 1-5, FIGS. 7-20 and descriptions thereof).

By incorporating both the sparsity and the continuity priors, a deconvolution algorithm that can surpass the physical limitations imposed by the hardware of the image acquisition device and increase both the resolution and contrast of live cell SR microscopy images may be provided. By applying the sparse deconvolution algorithm to wide-field microscopy, SIM, and spinning-disc confocal-based SIM (SD-SIM), legitimate mathematical SR that allows intricate sub-cellular structures and dynamics to be visualized in live cells may be demonstrated.

It should be understood that application scenarios of systems and methods disclosed herein are only some exemplary embodiments provided for the purposes of illustration, and not intended to limit the scope of the present disclosure. For persons having ordinary skills in the art, multiple variations and modifications may be made under the teachings of the present disclosure.

Figure 1:
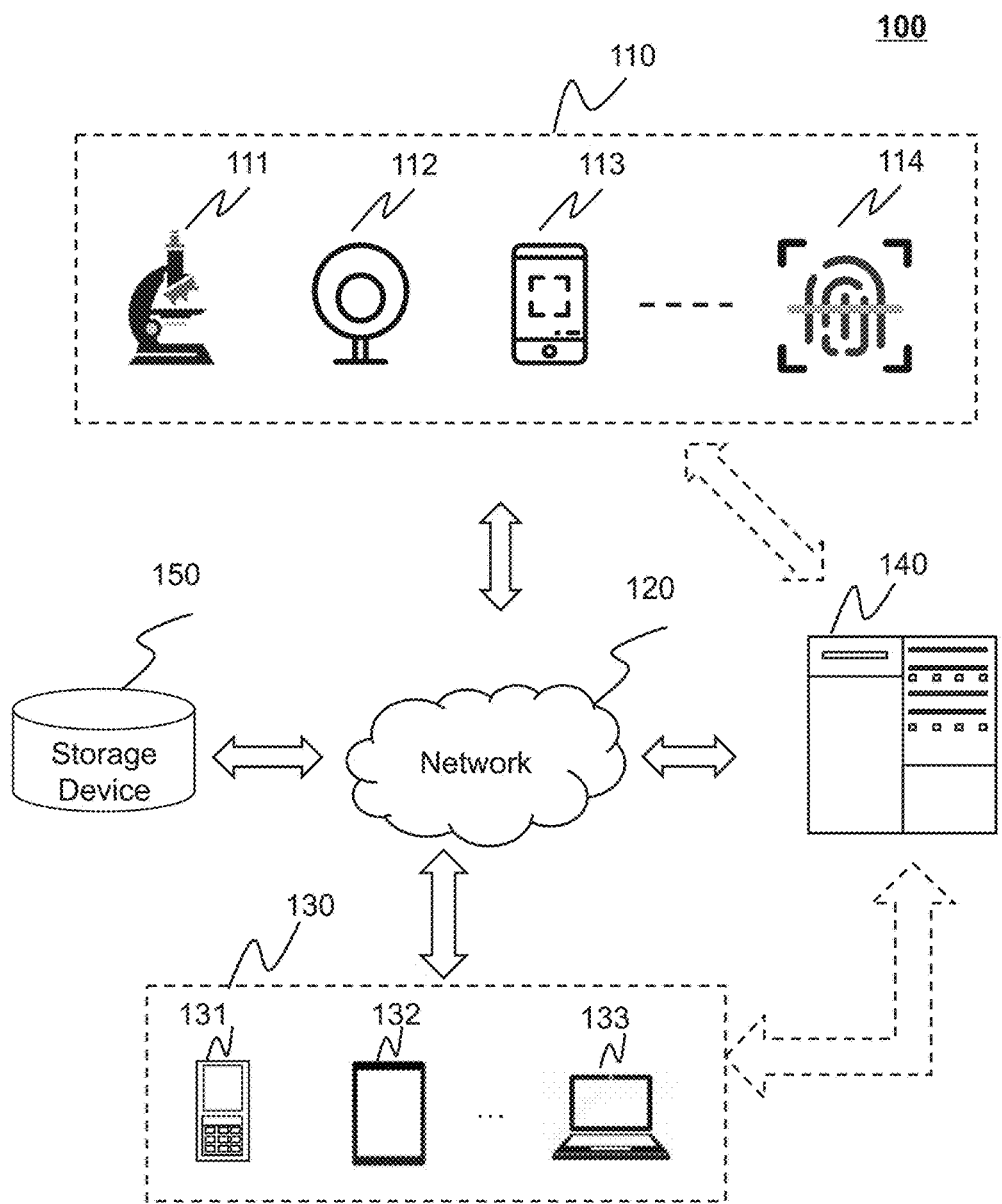
FIG. 1 is a schematic diagram illustrating an exemplary application scenario of an image processing system according to some embodiments of the present disclosure.

FIG. 1 is a schematic diagram illustrating an exemplary application scenario of an image processing system according to some embodiments of the present disclosure. As shown in FIG. 1, the image processing system 100 may include an image acquisition device 110, a network 120, one or more terminals 130, a processing device 140, and a storage device 150.

The components in the image processing system 100 may be connected in one or more of various ways. Merely by way of example, the image acquisition device 110 may be connected to the processing device 140 through the network 120. As another example, the image acquisition device 110 may be connected to the processing device 140 directly as indicated by the bi-directional arrow in dotted lines linking the image acquisition device 110 and the processing device 140. As still another example, the storage device 150 may be connected to the processing device 140 directly or through the network 120. As a further example, the terminal 130 may be connected to the processing device 140 directly (as indicated by the bi-directional arrow in dotted lines linking the terminal 130 and the processing device 140) or through the network 120.

Figure 5:
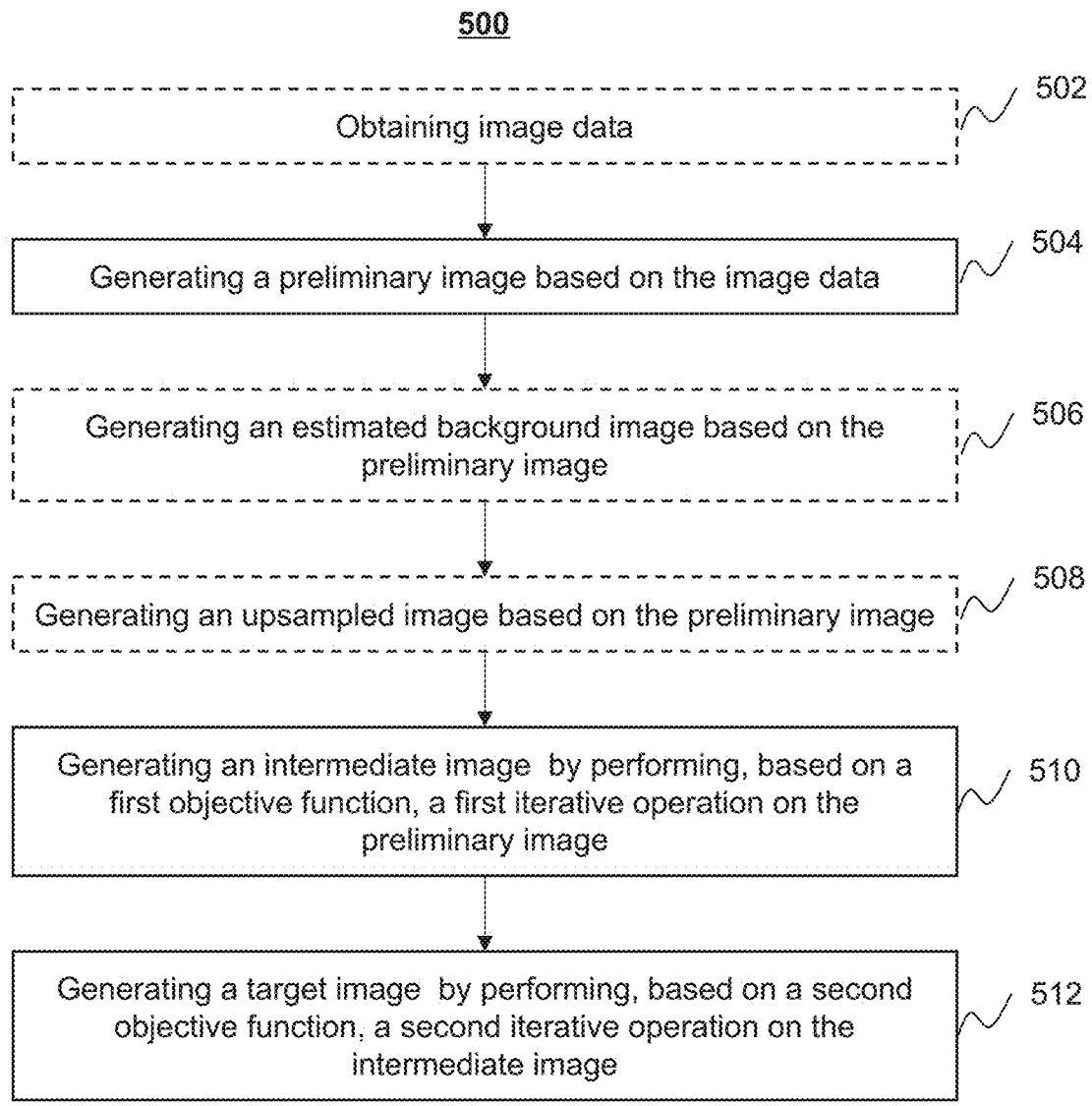
FIG. 5 is a flowchart illustrating an exemplary process for image processing according to some embodiments of the present disclosure.

The imaging processing system 100 may be configured to generate a target image using the sparse deconvolution technique (e.g., as shown in FIG. 5). The target image may be with a relatively high resolution that can extend beyond physical limits posed by the image acquisition device 110. A plurality of target images in a time sequence may form a video stream with a relatively high resolution. For example, the imaging processing system 100 may obtain a plurality of raw cell images with relatively low resolutions generated by the image acquisition device 110 (e.g., SIM). The imaging processing system 100 may generate an SR cell image based on the plurality of raw cell images using the sparse deconvolution technique. As another example, the image processing system 100 may obtain one or more images captured by the image acquisition device 110 (e.g., a camera phone or a phone with a camera). The one or more images may be blurred and/or with relatively low resolutions, as factors such as a shaking of the camera phone, moving of an object to be imaged, an inaccurate focusing, etc. during the capturing and/or physical limits posed by the camera phone. The image processing system 100 may process the image(s) by using the sparse deconvolution technique to generate one or more target images with relatively high resolutions. The processed target image (s) may be sharper than the image(s) without being processed by the sparse deconvolution technique. Thus, the image processing system 100 may display the target images(s) with a relatively high resolution for a user of the image processing system 100.

The image acquisition device 110 may be configured to obtain image data associated with a subject within its detection region. In the present disclosure, "object" and "subject" are used interchangeably. The subject may include one or more biological or non-biological objects. In some embodiments, the image acquisition device 110 may be an optical imaging device, a radioactive-ray-based imaging device (e.g., a computed tomography device), a nuclide-based imaging device (e.g., a positron emission tomography device), a magnetic resonance imaging device), etc. Exemplary optical imaging devices may include a microscope 111 (e.g., a fluorescence microscope), a surveillance device 112 (e.g., a security camera), a mobile terminal device 113 (e.g., a camera phone), a scanning device 114 (e.g., a flatbed scanner, a drum scanner, etc.), a telescope, a webcam, or the like, or any combination thereof. In some embodiments, the optical imaging device may include a capture device (e.g., a detector or a camera) for collecting the image data. For illustration purposes, the present disclosure may take the microscope 111 as an example for describing exemplary functions of the image acquisition device 110. Exemplary microscopes may include a structured illumination microscope (SIM) (e.g., a two-dimensional SIM (2D-SIM), a three-dimensional SIM (3D-SIM), a total internal reflection SIM (TIRF-SIM), a spinning-disc confocal-based SIM (SD-SIM), etc.), a photoactivated localization microscopy (PALM), a stimulated emission depletion fluorescence microscopy (STED), a stochastic optical reconstruction microscopy (STORM), etc. The SIM may include a detector such as an EMCCD camera, an sCMOS camera, etc. The subjects detected by the SIM may include one or more objects of biological structures, biological issues, proteins, cells, microorganisms, or the like, or any combination. Exemplary cells may include INS-1 cells, COS-7 cells, Hela cells, liver sinusoidal endothelial cells (LSECs), human umbilical vein endothelial cells (HUVECs), HEK293 cells, or the like, or any combination thereof. In some embodiments, the one or more objects may be fluorescent or fluorescent-labeled. The fluorescent or fluorescent-labeled objects may be excited to emit fluorescence for imaging. More descriptions of an exemplary SIM device may be found in Chinese Patent Application No. 201810196491.X entitled "A METHOD AND SYSTEM FOR IMAGE RECONSTRUCTION." filed Mar. 9, 2018, the contents of which are hereby incorporated by reference.

The network 120 may include any suitable network that can facilitate the image processing system 100 to exchange information and/or data. In some embodiments, one or more of components (e.g., the image acquisition device 110, the terminal(s) 130, the processing device 140, the storage device 150, etc.) of the image processing system 100 may communicate information and/or data with one another via the network 120. For example, the processing device 140 may acquire image data from the image acquisition device 110 via the network 120. As another example, the processing device 140 may obtain user instructions from the terminal(s) 130 via the network 120. The network 120 may be and/or include a public network (e.g., the Internet), a private network (e.g., a local area network (LAN), a wide area network (WAN), etc.), a wired network (e.g., an Ethernet), a wireless network (e.g., an 802.11 network, a Wi-Fi network, etc.), a cellular network (e.g., a Long Term Evolution (LTE) network), an image relay network, a virtual private network ("VPN"), a satellite network, a telephone network, a router, a hub, a switch, a server computer, and/or a combination of one or more thereof. For example, the network 120 may include a cable network, a wired network, a fiber network, a telecommunication network, a local area network, a wireless local area network (WLAN), a metropolitan area network (MAN), a public switched telephone network (PSTN), a Bluetooth™ network, a ZigBee™ network, a near field communication network (NFC), or the like, or a combination thereof. In some embodiments, the network 120 may include one or more network access points. For example, the network 120 may include wired and/or wireless network access points, such as base stations and/or network switching points, through which one or more components of the image processing system 100 may access the network 120 for data and/or information exchange.

In some embodiments, a user may operate the image processing system 100 through the terminal(s) 130. The terminal(s) 130 may include a mobile device 131, a tablet computer 132, a laptop computer 133, or the like, or a combination thereof. In some embodiments, the mobile device 131 may include a smart home device, a wearable device, a mobile device, a virtual reality device, an augmented reality device, or the like. In some embodiments, the smart home device may include a smart lighting device, a control device of an intelligent electrical apparatus, a smart monitoring device, a smart television, a smart video camera, an interphone, or the like, or a combination thereof. In some embodiments, the wearable device may include a bracelet, footgear, glasses, a helmet, a watch, clothing, a backpack, a smart accessory, or the like, or a combination thereof. In some embodiments, the mobile device may include a mobile phone, a personal digital assistant (PDA), a gaming device, a navigation device, a point of sale (POS) device, a laptop, a tablet computer, a desktop, or the like, or a combination thereof. In some embodiments, the virtual reality device and/or augmented reality device may include a virtual reality helmet, virtual reality glasses, a virtual reality eyewear, an augmented reality helmet, augmented reality glasses, an augmented reality eyewear, or the like, or a combination thereof. For example, the virtual reality device and/or augmented reality device may include a Google Glass™, an Oculus Rift™, a Hololens™, a Gear VR™, or the like. In some embodiments, the terminal(s) 130 may be part of the processing device 140.

The processing device 140 may process data and/or information obtained from the image acquisition device 110, the terminal(s) 130, and/or the storage device 150. For example, the processing device 140 may process image data generated by the image acquisition device 110 to generate a target image with a relatively high resolution. In some embodiments, the processing device 140 may be a server or a server group. The server group may be centralized or distributed. In some embodiments, the processing device 140 may be local or remote. For example, the processing device 140 may access information and/or data stored in the image acquisition device 110, the terminal(s) 130, and/or the storage device 150 via the network 120. As another example, the processing device 140 may be directly connected to the image acquisition device 110, the terminal(s) 130, and/or the storage device 150 to access stored information and/or data. In some embodiments, the processing device 140 may be implemented on a cloud platform. For example, the cloud platform may include a private cloud, a public cloud, a hybrid cloud, a community cloud, a distributed cloud, an interconnected cloud, a multiple cloud, or the like, or a combination thereof. In some embodiments, the processing device 140 may be implemented by a computing device 200 having one or more components as described in FIG. 2.

The storage device 150 may store data, instructions, and/or any other information. In some embodiments, the storage device 150 may store data obtained from the terminal(s) 130, the image acquisition device 110, and/or the processing device 140. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be executed on a cloud platform. For example, the cloud platform may include a private cloud, a public cloud, a hybrid cloud, a community cloud, a distributed cloud, an interconnected cloud, a multiple cloud, or the like, or a combination thereof.

In some embodiments, the storage device 150 may be connected to the network 120 to communicate with one or more other components (e.g., the processing device 140, the terminal(s) 130, etc.) of the image processing system 100. One or more components of the image processing system 100 may access data or instructions stored in the storage device 150 via the network 120. In some embodiments, the storage device 150 may be directly connected to or communicate with one or more other components (e.g., the processing device 140, the terminal(s) 130, etc.) of the image processing system 100. In some embodiments, the storage device 150 may be part of the processing device 140.

FIG. 2 is a schematic diagram illustrating an exemplary computing device according to some embodiments of the present disclosure. The computing device 200 may be used to implement any component of the image processing system 100 as described herein. For example, the processing device 140 and/or the terminal(s) 130 may be implemented on the computing device 200, respectively, via its hardware, software program, firmware, or a combination thereof. Although only one such computing device is shown, for convenience, the computer functions relating to the image processing system 100 as described herein may be implemented in a distributed manner on a number of similar platforms, to distribute the processing load.

As shown in FIG. 2, the computing device 200 may include a processor 210, a storage 220, an input/output (I/O) 230, and a communication port 240.

The processor 210 may execute computer instructions (e.g., program code) and perform functions of the image processing system 100 (e.g., the processing device 140) in accordance with the techniques described herein. The computer instructions may include, for example, routines, programs, objects, components, data structures, procedures, modules, and functions, which perform particular functions described herein. For example, the processor 210 may process image data obtained from any components of the image processing system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combination thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from any component of the image processing system 100. In some embodiments, the storage 220 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

In some embodiments, the storage 220 may store one or more programs and/or instructions to perform exemplary methods described in the present disclosure. For example, the storage 220 may store a program for the processing device 140 to process images generated by the image acquisition device 110.

The I/O 230 may input and/or output signals, data, information, etc. In some embodiments, the I/O 230 may enable user interaction with the image processing system 100 (e.g., the processing device 140). In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network to facilitate data communications. The communication port 240 may establish connections between the processing device 140 and the image acquisition device 110, the terminal(s) 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or a combination thereof. The wireless connection may include a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
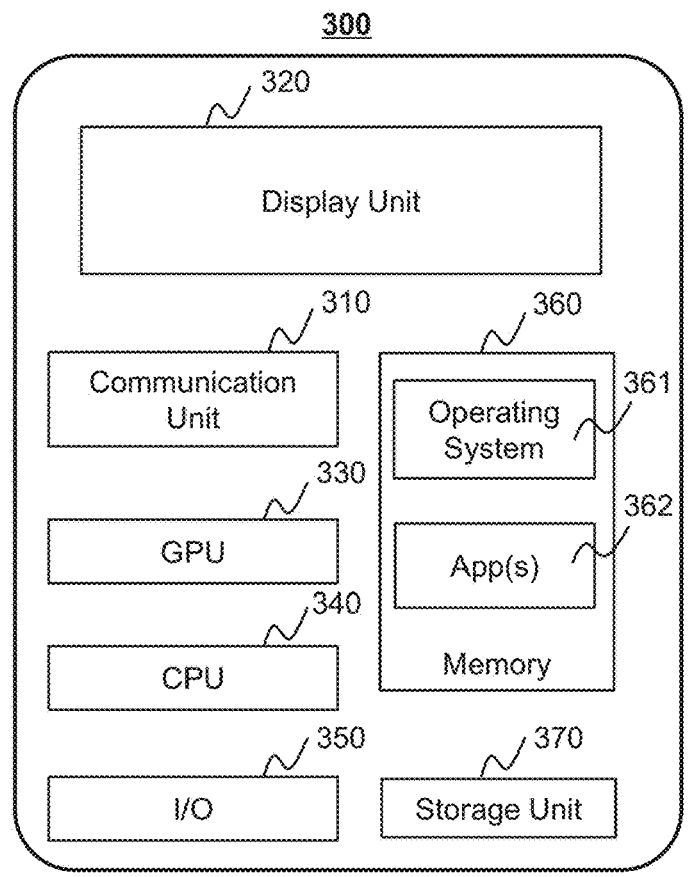
FIG. 3 is a block diagram illustrating an exemplary mobile device on which the terminal(s) may be implemented according to some embodiments of the present disclosure.

FIG. 3 is a block diagram illustrating an exemplary mobile device on which the terminal(s) 130 may be implemented according to some embodiments of the present disclosure.

As shown in FIG. 3, the mobile device 300 may include a communication unit 310, a display unit 320, a graphics processing unit (GPU) 330, a central processing unit (CPU) 340, an I/O 350, a memory 360, a storage unit 370, etc. In some embodiments, any other suitable component, including but not limited to a system bus or a controller (not shown), may also be included in the mobile device 300. In some embodiments, an operating system 361 (e.g., iOS™, Android™, Windows Phone™, etc.) and one or more applications (apps) 362 may be loaded into the memory 360 from the storage unit 370 in order to be executed by the CPU 340. The application(s) 362 may include a browser or any other suitable mobile apps for receiving and rendering information relating to imaging, image processing, or other information from the image processing system 100 (e.g., the processing device 140). User interactions with the information stream may be achieved via the I/O 350 and provided to the processing device 140 and/or other components of the image processing system 100 via the network 120. In some embodiments, a user may input parameters to the image processing system 100, via the mobile device 300.

In order to implement various modules, units and their functions described above, a computer hardware platform may be used as hardware platforms of one or more elements (e.g., the processing device 140 and/or other components of the image processing system 100 described in FIG. 1). Since these hardware elements, operating systems and program languages are common; it may be assumed that persons skilled in the art may be familiar with these techniques and they may be able to provide information needed in the imaging and assessing according to the techniques described in the present disclosure. A computer with the user interface may be used as a personal computer (PC), or other types of workstations or terminal devices. After being properly programmed, a computer with the user interface may be used as a server. It may be considered that those skilled in the art may also be familiar with such structures, programs, or general operations of this type of computing device.

Figure 4:
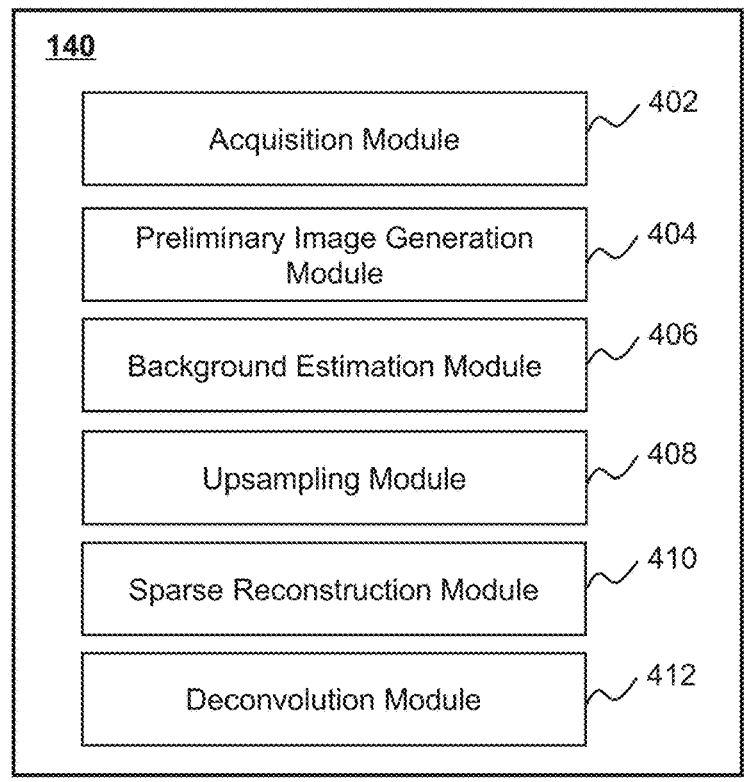
FIG. 4 is schematic diagrams illustrating an exemplary processing device according to some embodiments of the present disclosure.

FIG. 4 is schematic diagrams illustrating an exemplary processing device according to some embodiments of the present disclosure. As shown in FIG. 4, the processing device 140 may include an acquisition module 402, a preliminary image generation module 404, a background estimation module 406, an upsampling module 408, a sparse reconstruction module 410, and a deconvolution module 412.

The acquisition module 402 may be configured to obtain information and/data from one or more components of the image processing system 100. In some embodiments, the acquisition module 402 may obtain image data from the storage device 150 or the image acquisition device 110. As used herein, the image data may refer to raw data (e.g., one or more raw images) collected by the image acquisition device 110. More descriptions regarding obtaining the image data may be found elsewhere in the present disclosure (e.g., operation 502 in FIG. 5).

The preliminary image generation module 404 may be configured to generate a preliminary image. In some embodiments, the preliminary image generation module 404 may determine the preliminary image by performing a filtering operation on the image data. Merely by way example, the preliminary image generation module 404 may determine the preliminary image by performing Wiener filtering on one or more raw images. More descriptions regarding generating the preliminary image may be found elsewhere in the present disclosure (e.g., operation 504 in FIG. 5).

The background estimation module 406 may be configured to generate an estimated background image based on the preliminary image. In some embodiments, the background estimation module 406 may generate the estimated background image by performing an iterative wavelet transformation operation on the preliminary image. For example, the background estimation module 406 may decompose the preliminary images into one or more bands in the frequency domain using a wavelet filter. Exemplary wavelet filters may include Daubechies wavelet filters, Biorthogonal wavelet filters, Morlet wavelet filters, Gaussian wavelet filters, Marr wavelet filters, Meyer wavelet filters, Shannon wavelet filters, Battle-Lemarie wavelet filters, or the like, or any combination thereof. The background estimation module 406 may extract the lowest band in the frequency domain (e.g., the lowest frequency wavelet band) from one or more bands in the frequency domain. The background estimation module 406 may generate an estimated image based on the lowest frequency wavelet band. If the estimated image satisfies a first termination condition, the background estimation module 406 may determine the estimated image as the estimated background image. Alternatively, if the estimated image does not satisfy the first termination condition, the background estimation module 406 may extract the lowest frequency wavelet band from the estimated image to determine an updated estimated image until the first termination condition is satisfied. More descriptions regarding generating the estimated background image may be found elsewhere in the present disclosure (e.g., operation 506 in FIG. 5, operations in FIG. 6 and the descriptions thereof).

The upsampling module 408 may be configured to perform an upsampling operation. In some embodiments, the upsampling module 408 may determine a residual image corresponding to the preliminary image. For example, the upsampling module 408 may extract the estimated background image from the preliminary image to determine the residual image. The upsampling module 408 may generate an upsampled image by performing an upsampling operation on the residual image, e.g., performing a Fourier interpolation on the residual image. In some embodiments, the upsampled image may have a greater size than the residual image. More descriptions regarding generating the upsampled image based on the preliminary image may be found elsewhere in the present disclosure (e.g., operation 508 in FIG. 5 and the description thereof).

The sparse reconstruction module 410 may be configured to perform a sparse reconstruction operation. In some embodiments, the sparse reconstruction module 410 may generate an intermediate image by performing, based on a first objective function, a first iterative operation on the preliminary image. The first objective function may include a first term (also referred to as a fidelity term), a second term (also referred to as a continuity term) and a third term (also referred to as a sparsity term). The first term may be associated with a first difference between the intermediate image and the preliminary image. The second term may be associated with continuity of the intermediate image. The third term may be associated with sparsity of the intermediate image. In some embodiments, the sparse reconstruction module 410 may determine an initial estimated intermediate image based on the preliminary image. If the upsampling operation is omitted, the initial estimated intermediate image may refer to the residual image determined based on the preliminary image. Alternatively, if the upsampling operation is required, the initial estimated intermediate image may refer to the upsampled image determined based on the residual image. The sparse reconstruction module 410 may update an estimated intermediate image by performing, based on the initial estimated intermediate image, a plurality of iterations of the first object function. In each of the plurality of iterations, the sparse reconstruction module 410 may determine whether a second termination condition is satisfied. In response to determining that the second termination condition is satisfied, the sparse reconstruction module 410 may finalize the intermediate image and designate the estimated intermediate image in the iteration as the intermediate image. In response to determining that the second termination condition is not satisfied, the sparse reconstruction module 410 may determine an updated estimated intermediate image in the iteration. Further, the sparse reconstruction module 410 may perform a next iteration of the first object function based on the updated estimated intermediate image. More descriptions regarding generating the intermediate image based on the preliminary image may be found elsewhere in the present disclosure (e.g., operation 510 in FIG. 5 and the description thereof).

The deconvolution module 412 may be configured to perform a deconvolution operation on the intermediate image to determine a target image. In some embodiments, the deconvolution module 412 may generate the target image by performing, based on a second objective function, a second iterative operation on the intermediate image. The second objective function may be associated with a system matrix of the image acquisition device 110 and a second difference between the intermediate image and the target image. The second difference may include a third difference between the intermediate image and the target image multiplied by the system matrix. In some embodiments, the second iterative operation may include an iterative deconvolution using a Landweber (LW) deconvolution algorithm, a Richardson Lucy (RL)-based deconvolution algorithm, or the like, or any combination thereof. More descriptions regarding generating the target image may be found elsewhere in the present disclosure (e.g., operation 512 in FIG. 5 and the descriptions thereof).

It should be noted that the above description of modules of the processing device 140 is merely provided for the purposes of illustration, and not intended to limit the present disclosure. For persons having ordinary skills in the art, the modules may be combined in various ways or connected with other modules as sub-systems under the teaching of the present disclosure and without departing from the principle of the present disclosure. In some embodiments, one or more modules may be added or omitted in the processing device 140. For example, the preliminary image generation module 404 may be omitted and the acquisition module 402 may directly obtain the preliminary image from one or more components of the image processing system 100 (e.g., the image acquisition device 110, the storage device 150, etc.). In some embodiments, one or more modules in the processing device 140 may be integrated into a single module to perform functions of the one or more modules. For example, the modules 406-410 may be integrated into a single module.

In some embodiments, image formation of an aberration-free optical imaging system may be governed by simple propagation models of electromagnetic waves interacting with geometrically ideal surfaces of lenses and mirrors of the optical imaging system. Under such conditions, the process may be described as a two-dimensional Fourier transformation in Equation (1):

$$G(u,v)=H(u,v)F(u,v), \quad (1)$$

where G represents the two-dimensional Fourier transform of the recorded image, F represents the transformation of the intensity distribution of the object associated with the image, and H represents the spatial frequency transfer function (i.e., the OTF) of the optical imaging system. Because the total amount of light energy entering any optical imaging system is limited by a physically limiting pupil or aperture, the OTF may be controlled by the aperture function under aberration-free conditions. Therefore, the OTF H(u, v) may be calculated from the aperture function a(x, y) by $$H(u,v)=\int_{-\infty}^{\infty}\int_{-\infty}^{\infty} a(x,y)a(x+u,y+v)dxdy. \quad (2)$$

Accordingly, the OTF may be the autocorrelation of the aperture function, and x and y denote coordinates in the spatial domain, while u and v represent coordinates in the spatial frequency domain. The transmission of electromagnetic waves within the aperture may be perfect, with a(x, y)=1, while outside of the aperture, no wave may propagate and a(x, y)=0. Therefore, the OTF may change to zero outside of a boundary defined by the autocorrelation of the aperture function. Because no spatial frequency information from the object outside of the OTF support is transmitted to the recording device, the optical imaging system itself may always be bandwidth limited.

In some embodiments, to recover the information of the original object from the recorded image, Equation (1) can be rearranged into the following form:

$$F(u,v)=G(u,v)/H(u,v) \quad (3)$$

In the preceding equation, the retrieved object spatial frequency may exist only where H(u, v)≠0. Outside of the region of OTF support, the object spatial frequency may be ambiguous, and any finite value for F(u, v) may be consistent with both Equations (1) and (3). Therefore, there may be infinite numbers of invisible small objects whose Fourier transforms are zeros inside the OTF of the optical imaging system and thus are detected. This is why diffraction limits the image resolution and causes the general belief that the information lost due to the cut-off of system OTF is not retrieved by mathematical inversion or deconvolution processes.

In some embodiments, in optics, the spatial bandwidth of the optical imaging system may have traditionally been regarded as invariant. However, analogous to communication systems, in which the channel capacity may be constant, but the temporal bandwidth may be not constant. In some embodiments, it may be proposed that only the degrees of freedom (DOF) of an optical imaging system is invariant. Acting as a communication channel that transmits information from the object plane to the image plane, the ultimate limit may be set by the DOF that the optical imaging system can transmit.

The DOF of any optical field may be a minimal number of independent variables needed to describe an optical signal. According to Huygens' principle, if there is no absorption, the two-dimensional information carried by the light wave may remain invariant during propagation. Therefore, the information capacity of a two-dimensional optical imaging system may be analyzed based on Shannon's information theory, followed by later inclusion of the temporal bandwidth term and the final addition of the z-direction, DC, noise, and polarization terms.

The total information capacity of an optical imaging system may be described as follows:

$$N = (2L_xB_x + 1)(2L_yB_y + 1)(2L_zB_z + 1)\times (2TB_T + 1)\left(\log_2\left(1 + \frac{s}{n}\right)\right), \quad (4)$$

where $B_x$, $B_y$, and $B_z$ represent the spatial bandwidths, and $L_x$, $L_y$, $L_z$ represent the dimensions of the field of view in the x, y, and z-axes, respectively. For any given observation time T, $B_t$ denotes the temporal bandwidth of the system. In Equation (4), s represents the average power of the detected signal while n represents the additive noise power. The factor 2 accounts for the two polarization states.

Exemplary current hardware-based SR techniques, including SIM, STED, and PALM/STORM, may rely on the assumption that the object does not vary during the formation of an SR image. From Equation (4), it is apparent that the super-resolved spatial information may be encoded within the temporal sequence of multiple exposures. In this sense, because the increased spatial resolution comes at the price of reduced temporal resolution, the information capacity of the optical imaging system may remain unaltered.

In some embodiments, mathematical bandwidth extrapolation may be performed and may operate under a different principle than the optics. In some embodiments, the fundamental principle may include that the two-dimensional Fourier transform of a spatially bound function is an analytic function in the spatial frequency domain. If an analytic function in the spatial frequency domain is known exactly over a finite interval, it may be proven that the entire function can be found uniquely by means of analytic continuation. For an optical imaging system, it follows that if an object has a finite size, then a unique analytic function may exist that coincides inside G(u, v). By extrapolating the observed spectrum using algorithms such as the Gerchberg algorithm, it may be possible in principle to reconstruct the object with arbitrary precision.

Therefore, if the object is assumed to be analytic, there may be a possibility of recovering information from outside the diffraction limit. Thus, analytic continuation may represent one key feature of mathematical SR (e.g., the addition of a priori information about the object for use in its SR reconstruction). In light of Equation (4), adding more information about the object may increase the total information capacity of the system, which theoretically may be diverted to improve the spatial resolution.

The validity of this theory may be proven possible using SR under specific conditions by iterative deconvolution operations. The basic algorithmic computation may be given by the following equation:

$$f^{n+1}(x, y) = f^n(x, y)\left[\left(\frac{g(x, y)}{h(x, y)\times f^n(x,y)}\right)\odot h(x, y)\right]. \quad (5)$$

For image data g(x, y) and the point spread function (PSF) h(x, y), the object at $(n+1)^{th}$ iteration may be calculated from its estimation at $n^{th}$ iteration. Different from direct inversion in the spatial frequency domain by Equation (3), this computational process may be conducted in the spatial domain, avoiding the problem of division by null outside of the region of OTF support. Thus, extension beyond the diffraction limit may be possible and may occur for two reasons: the nonlinearity of the product of $f^n$ with the other quantities in the square brackets and the prior information of nonnegative values of the object.

Despite the theoretical feasibility of mathematical SR, out-of-band extrapolation may be usually unstable due to small variations in the image data. The noise that exists in actual experiments may not be an analytic function, thus allowing no solution to the bandwidth extrapolation based on analytic continuation. Alternatively, even under conditions where a possible solution exists, there may be many analytic functions that reproduce the data well within the OTF but that result in completely different frequency components outside of OTF.

From the perspective of information capacity, bandwidth extrapolation based on analytic continuation may extend the spatial bandwidth at the price of the SNR. For object fields containing large space-bandwidth products, even a small extension of spatial bandwidth may lead to greatly amplified noise in the final reconstruction. For object fields with small space-bandwidth products, a meaningful increase in resolution may be attainable by analytic continuation in combination with the addition of more object information. Despite all these theoretical possibilities, because reconstruction by bandwidth extrapolation is prone to noise and strongly depends on the assumed a priori knowledge, it may be concluded that the Rayleigh diffraction limit represents a practical frontier that cannot be overcome with a conventional imaging system.

In some embodiments, compressive sensing (CS), which is performed based on the sparsity feature of discrete signals, may have been applied successfully in many different fields of signal processing. CS may be a family of approaches by which accurate signal reconstruction is possible with fewer measurements than that required by the Nyquist-Shannon sampling theorem. CS theory may assume that a discrete signal has a sparse representation on some basis. If the measurement is conducted using a basis that is uncorrelated or incoherent with the signal basis, it may be possible to reconstruct the signal with a sampling rate less than twice the maximum frequency of the signal. CS may be combined with point scanning confocal microscopy and may be used in pointillist SR techniques such as PALM and STORM. In some embodiments, applying CS techniques to these imaging technologies may reduce the image acquisition time and increases the frame rate.

In addition to applying CS for interpolation within the bandwidth, it may be proposed using sparsity prior for bandwidth extrapolation and mathematical SR. Because the spatial and frequency domains are maximally uncorrelated bases and the object is measured in the spatial domain, the band-limited frequency information may be extended under the assumption of sparse signals in the spatial domain. It may be demonstrated that the bandwidth may be extrapolated under the CS framework and more accurate reconstructions may be generated from raw images with some noise than using the Gerchberg algorithm. This may provide a proof-of-principle where the object is very sparse and no subwavelength resolution is shown. In some embodiments, because noise in the raw images is significantly amplified during the reconstruction, the subwavelength modes may be shown to be typically unstable unless the measurement is conducted in the near field. Likewise, the resolution may be inversely proportional to the SNR, which limits the possible application of the CS technique.

In some embodiments, the above mentioned SR technologies based on the CS technique (e.g., using the sparsity prior) may be combined with the continuity prior for image processing, which may keep a balance between the resolution and the SNR to improve the resolution of image data. Details regarding a mathematical SR technology in combination with the continuity prior and the sparsity prior may be described as follows (e.g., FIGS. 5-6 and the descriptions thereof).

FIG. 5 is a flowchart illustrating an exemplary process for image processing according to some embodiments of the present disclosure. In some embodiments, process 500 may be executed by the image processing system 100. For example, the process 500 may be implemented as a set of instructions (e.g., an application) stored in a storage device (e.g., the storage device 150, the storage 220, and/or the storage unit 370). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 5 and described below is not intended to be limiting.

In some embodiments, two criteria may need to be met to increase the resolution mathematically. First, a priori assumption may add information to the otherwise invariant total information carried by the optical imaging system. In this sense, the sparsity prior may be more general than the assumption of object compactness, and the incorporation of more available information regarding the object in the reconstruction algorithm may lead to greater bandwidth extension. Second, a mathematical SR image reconstruction may increase spatial resolution at the price of a reduction in the SNR following a logarithmic relationship, hinting at the crucial importance of starting with high-SNR images before the bandwidth extrapolation procedure.

To address these issues, a three-step procedure may be provided in the present disclosure. In the first step, the SR spatial frequency encoded within structured illuminated (grids or pinholes) in the spatial frequency domain may be estimated, extracted, and reassembled and an inverse filter (e.g., the conventional Wiener inverse filter) may be used to obtain SR images. The first step may boost the SNR of the high-frequency components within the bandwidth determined by the optics. The background in the SR images may also be estimated and the SR images may be removed with background fluorescence originating from out-of-focus planes from the SR images, which may be critical for the high-fidelity reconstruction of objects inside the cell. In the second step, the continuity prior information may be used to further enhance the image SNR and the sparsity prior information may be used to extend the bandwidth to regions out of the OTF. The application of stringent requirements on sparsity to obtain more accurate reconstruction may lead to the removal of weak bona fide signals. Therefore, in contrast to classical bandwidth extrapolation techniques that tried to reveal all the details of an object based on the analytic continuation or CS priori information, the image reconstruction may be framed as an iterative process constrained by the a priori information.

Because of the logarithmic relationship between the resolution increase and the image SNR, the extrapolated spatial frequency may usually have low contrast. Therefore, in a third step, an iterative deconvolution procedure may be used to boost the contrast of the newly extended spatial frequency outside of the OTF. The incorporation of the nonnegative priors and the nonlinearity of the deconvolution procedure may also contribute to the resolution increase to some extent. More descriptions regarding the three-step procedure may be found in one or more operations (e.g., operations 506, 510 and 512) in process 500.

In 502, the processing device 140 (e.g., the acquisition module 402) may obtain image data.

In some embodiments, the image data herein may refer to raw data (e.g., one or more raw images) collected by the image acquisition device 110. As used herein, a raw image may refer to an image that has a relatively low signal to noise ratio (SNR), or is partially damaged, or the like. Merely by way of example, for a SIM system, the image data may include one or more sets of raw images collected by the SIM system. The one or more sets of raw images may be arranged in a time sequence. Each set of raw images may include a plurality of raw images (e.g., 9 raw images, 15 raw images) with different phases and/or directions. That is, the plurality of raw images may be collected by the SIM system at the different phases and/or directions.

In some embodiments, the processing device 140 may obtain the image data from one or more components of the image processing system 100. For example, the image acquisition device 110 may collect and/or generate the image data and store the image data in the storage device 150. The processing device 140 may retrieve and/or obtain the image data from the storage device 150. As another example, the processing device 140 may directly obtain the image data from the image acquisition device 110.

In 504, the processing device 140 (e.g., the preliminary image generation module 404) may generate a preliminary image based on the image data.

In some embodiments, the processing device 140 may determine the preliminary image (e.g., the SR image) by filtering the image data. Exemplary filtering operations may include Wiener filtering, inverse filtering, least-squares filtering, or the like, or any combination thereof. For example, for each set of raw images of the image data, the processing device 140 may generate an image stack (i.e., the preliminary image) by performing Wiener filtering on the plurality of raw images in the set of raw images. Specifically, if each set of raw images includes 9 raw images, the processing device 140 may combine the 9 raw images in the set of raw images into the preliminary image. The preliminary image may include information in each of the 9 raw images and have a higher resolution than each of the 9 raw images. In some embodiments, the filtering operation may be omitted. For example, for a camera phone system, the image data may include only one raw image, and the processing device 140 may designate the only one raw image as the preliminary image.

In 506, the processing device 140 (e.g., the background estimation module 406) may generate an estimated background image based on the preliminary image. As used herein, the estimated background image may refer to an image including an estimated background (e.g., noise in low-frequency) of the preliminary image. For example, if objects in the preliminary image are live cells, the liquid around the live cells in the preliminary image may be regarded as a noise in the preliminary image. The processing device 140 may generate the estimated background image by estimating the noise in the preliminary image. As another example, for a 2D-SIM system, the preliminary image may contain a strong background fluorescence signal originating from out-of-focus emissions and cellular autofluorescence, which may be regarded as a noise in the preliminary image. The processing device 140 may predict the noise in the estimated background image.

In some embodiments, the processing device 140 may generate the estimated background image by performing an iterative wavelet transformation operation on the preliminary image. For example, the processing device 140 may decompose the preliminary images into one or more bands in the frequency domain using a wavelet filter. Exemplary wavelet filters may include Daubechies wavelet filters, Biorthogonal wavelet filters, Morlet wavelet filters, Gaussian wavelet filters, Marr wavelet filters, Meyer wavelet filters, Shannon wavelet filters, Battle-Lemarie wavelet filters, or the like, or any combination thereof. The processing device 140 may extract the lowest band in the frequency domain (e.g., the lowest frequency wavelet band) from one or more bands in the frequency domain. The processing device 140 may generate an estimated image based on the lowest frequency wavelet band. If the estimated image satisfies a first termination condition, the processing device 140 may determine the estimated image as the estimated background image. Alternatively, if the estimated image does not satisfy the first termination condition, the processing device 140 may extract the lowest frequency wavelet band from the estimated image to determine an updated estimated image until the first termination condition is satisfied. More descriptions regarding generating the estimated background image may be found elsewhere in the present disclosure (e.g., FIG. 6 and the description thereof).

In some embodiments, in a specific condition (e.g., under conditions of ultrafast or long-term 2D-SIM imaging) where the background noise in the preliminary image is low, the processing device 140 may directly designate pixel values in the estimated background image as zero.

In 508, the processing device 140 (e.g., the upsampling module 408) may generate an upsampled image based on the preliminary image.

In some embodiments, the processing device 140 may determine a residual image corresponding to the preliminary image. For example, the processing device 140 may determine the residual image by subtracting the estimated background image from the preliminary image. As another example, when the preliminary image (e.g., the preliminary image in an SD-SIM system) exhibits a low and stable noise-like distribution of background fluorescence only, the processing device 140 may determine a mean value of total pixel values in the preliminary image. The processing device 140 may determine the residual image by designating pixel values in the preliminary image that is less than the mean value as zero. Further, the processing device 140 may generate the upsampled image by performing an upsampling operation on the residual image, e.g., performing a Fourier interpolation on the residual image (e.g., pad zeros out of the OTF of the image acquisition device 110). For example, the processing device 140 may pad zeros around one or more pixels (e.g., each pixel, or pixels on the edge) in the residual image in the spatial domain to determine the upsampled image. As another example, the processing device 140 may pad zeros in the residual image in the frequency domain to determine the upsampled image. As still another example, for the 2D-SIM system, the processing device 140 may use the Fourier interpolation (e.g., pad the zeros out of SIM OTF) to upsample the residual image. As further another example, for the SD-SIM system, the processing device 140 may choose a spatial oversampling manner (e.g., pad zeros around each pixel in the residual image), which is less sensitive to the SNR and less prone to snowflake artifacts.

In some embodiments, the upsampled image may include a larger size than the preliminary image. For example, the preliminary image may include a size of 256×256, and the upsampled image may include a size of 512×512.

In some embodiments, the pixel size may be a factor that limits SR image reconstruction/processing. For example, the pixel size of a 2D-SIM system may be 32.5 nm and theoretically be extended to substantially 60 nm, which may confer an undersampling problem that limits the spatial resolution. Likewise, when an EMCCD camera is used for the SD-SIM system, the pixel size may be 94 nm, which may limit the resolution that may be achieved by the sparse deconvolution algorithm (to substantially 90 nm). To address the potential problem of undersampling, an oversampling operation (i.e., the upsampling operation) may be provided in the image reconstruction process. In some embodiments, the upsampling operation may be omitted and the residual image may be directly used for image reconstruction.

In 510, the processing device 140 (e.g., the sparse reconstruction module 410) may generate an intermediate image by performing, based on a first objective function, a first iterative operation on the preliminary image. The intermediate image may be regarded as an image recovered from the preliminary image, such that the intermediate image may also be referred to as a recovered image. The first iterative operation may also be referred to as sparse reconstruction or sparse deconvolution.

In some embodiments, the processing device 140 may determine an initial estimated intermediate image based on the preliminary image. If the upsampling operation is omitted, the initial estimated intermediate image may refer to the residual image as described in operation 508. Alternatively, if the upsampling operation is required, the initial estimated intermediate image may refer to the upsampled image as described in operation 508. The processing device 140 may update an estimated intermediate image by performing, based on the initial estimated intermediate image, a plurality of iterations of the first object function. In each of the plurality of iterations, the processing device 140 may determine whether a second termination condition is satisfied.

In response to determining that the second termination condition is satisfied, the processing device 140 may finalize the intermediate image and designate the estimated intermediate image in the iteration as the intermediate image. In response to determining that the second termination condition is not satisfied, the processing device 140 may determine an updated estimated intermediate image in the iteration. The processing device 140 may perform a next iteration of the first object function based on the updated estimated intermediate image.

In some embodiments, the second termination condition may relate to a value of the first object function. For example, the second termination condition may be satisfied if the value of the first object function is minimal or smaller than a threshold (e.g., a constant). As another example, the second termination condition may be satisfied if the value of the first object function converges. In some embodiments, convergence may be deemed to have occurred if the variation of the values of the first object function in two or more consecutive iterations is equal to or smaller than a threshold (e.g., a constant). In some embodiments, convergence may be deemed to have occurred if a difference between the value of the first object function (e.g., the value of the first object function) and a target value is equal to or smaller than a threshold (e.g., a constant). In some embodiments, the second termination condition may relate to an iterative number (count) of the first object function. For example, the second termination condition may be satisfied when a specified iterative number (or count) is performed in the first iterative operation. In some embodiments, the second termination condition may relate to an iterative time of the first object function (e.g., a time length that the first iterative operation is performed). For example, the termination condition may be satisfied if the iterative time of the first object function is greater than a threshold (e.g., a constant).

In some embodiments, the first objective function may include a first term (also referred to as a fidelity term), a second term (also referred to as a continuity term) and a third term (also referred to as a sparsity term). The first term may be associated with a first difference between the intermediate image and the preliminary image. The second term may be associated with continuity of the intermediate image. The third term may be associated with sparsity of the intermediate image. In some embodiments, for the preliminary image determined without the upsampling operation, the first objective function may be expressed as a loss function as shown in Equation (6):

$$\arg\min_g \left\{ \frac{\lambda}{2} \|f - b - g\|_2^2 + R_{Hessian}(g) + \lambda_{L1} \|g\|_1 \right\}, \quad (6)$$

where $$\frac{\lambda}{2} \|f - b - g\|_2^2$$

represents the first term, $R_{Hessian}(g)$ represents the second term, $\lambda_{L1}\|g\|_1$ represents the third term. In the first term, f represents the preliminary image (also referred to as image f for brevity), b represents the estimated background image (also referred to as image b for brevity), g represents the intermediate image (also referred to as image g or variable g for brevity), $\|\cdot\|_1$ represents a $l_1$ norm (i.e., an L–1 norm), and A represents a first weight factor relating to image fidelity of the intermediate image. In the second term, $R_{Hessian}(g)$ represents a Hessian matrix of the intermediate image. In the third term, $\|\cdot\|_2$ represents a $l_2$ norm (i.e., an L–2 norm), and $\lambda_{L1}$ represents a second weight factor relating to sparsity of the intermediate image. $\lambda$ and $\lambda_{L1}$ may balance image fidelity with sparsity.

In some embodiments, the second term may be associated with a structural continuity along xy-t(z) axes of the intermediate image, i.e, continuity along the x-axis associated with a dimension of the width of the intermediate image, continuity along the y-axis associated with a dimension of the height of the intermediate image, and continuity along the t-axis (or z-axis) associated with a time dimension of the intermediate image. For example, the second term (i.e., the $R_{Hessian}(g)$) may be defined as Equation (7):

$$R_{Hessian}(g) = \left\| \begin{matrix} g_{xx} & g_{xy} & \sqrt{\lambda_t} g_{xt} \\ g_{yx} & g_{yy} & \sqrt{\lambda_t} g_{yt} \\ \sqrt{\lambda_t} g_{tx} & \sqrt{\lambda_t} g_{ty} & \lambda_t g_{tt} \end{matrix} \right\|_1, \quad (7)$$
$$= \|g_{xx}\|_1 + \|g_{yy}\|_1 + \lambda_t \|g_{tt}\|_1 + 2\|g_{xy}\|_1 + 2\sqrt{\lambda_t}\|g_{xt}\|_1 + 2\sqrt{\lambda_t}\|g_{yt}\|_1$$

where $g_{xx}$ represents gray values of two-order difference of pixels of the image g along the x-axis, $g_{xy}$ represents gray values of two-order difference of pixels of the image g along the x-axis and the y-axis, $g_{xt}$ represents gray values of two-order difference of pixels of the image g along the x-axis and the t-axis, $g_{yx}$ represents gray values of two-order difference of pixels of the image g along the y-axis and the x-axis, $g_{yy}$ represents gray values of two-order difference of pixels of the image g along the y-axis, $g_{yt}$ represents gray values of two-order difference of pixels of the image g along the y-axis and the t-axis, $g_{tx}$ represents gray values of two-order difference of pixels of the image g along the t-axis and the x-axis, $g_{ty}$ represents gray values of two-order difference of pixels of the image g along the t-axis and the y-axis, $g_{tt}$ represents gray values of two-order difference of pixels of the image g along the t-axis, $\lambda_t$ represents a regularization parameter that presents the continuity along the t-axis (which may be turned off after imaging mobile objects at high speed), and $\|\cdot\|_1$ represents the L–1 norm.

In some embodiments, searching for the best solution to the loss function in Equation (6) (i.e., the termination condition of the loss function) may be translated into a convex optimization problem (COP). For example, a split Bregman algorithm (also referred to as Bregman splitting) may be adopted due to its fast convergence speed. Using Bregman splitting, the variable g may be replaced with an intermediate variable u. Then, the loss function in Equation (6) may be transformed into a constrained minimization problem as Equation (8):

$$\min_{g,u}\left\{\frac{\lambda}{2}\|f-b-g\|_2^2+\varphi(u)\right\} = \min_{g,u}\left\{\begin{array}{l}\frac{\lambda}{2}\|f-b-g\|_2^2+\|u_{xx}\|_1+\|u_{yy}\|_1+\|u_{tt}\|_1+\\ \|u_{xy}\|_1+\|u_{xt}\|_1+\|u_{yt}\|_1+\|u\|_1\end{array}\right\}, \quad (8)$$

where $$u_{xx}=g_{xx}, u_{yy}=g_{yy}, u_{tt}=\lambda_t \cdot g_{zz}, u_{xy}=2\cdot g_{xy}, u_{xt}=2\sqrt{\lambda_t}\cdot g_{xt}, u_{ty}=2\sqrt{\lambda_t}g_{yt}, u=\lambda_{L1}g.$$

In some embodiments, by using a Lagrange multiplier algorithm to weakly enforce the constraints, an unconstrained problem as Equation (9) may be obtained:

$$\min_{g,u}\left\{\frac{\lambda}{2}\|f-b-g\|_2^2+\varphi(u)+\frac{\mu}{2}\cdot\left[\begin{array}{l}\|u_{xx}-g_{xx}\|_2^2+\|u_{yy}-g_{yy}\|_2^2+\|u_{tt}-\lambda_t\cdot g_{tt}\|_2^2+\|u_{xy}-2\cdot g_{xy}\|_2^2+\\ \left\|u_{xt}-2\sqrt{\lambda_t}\cdot g_{xt}\right\|_2^2+\left\|u_{yt}-2\sqrt{\lambda_t}\cdot g_{yt}\right\|_2^2+\|u-\lambda_{L1}\cdot g\|_2^2\end{array}\right]\right\}, \quad (9)$$

where μ represents the Lagrange multiplier. Finally, the constraints may be strictly enforced by applying a simplified Bregman iteration according to Equation (10):

$$\min_{g,u}\left\{\begin{array}{l}\frac{\lambda}{2}\|f-b-g\|_2^2+\varphi(u)+\\ \frac{\mu}{2}\cdot\left[\begin{array}{l}\|u_{xx}-g_{xx}-v_{xx}\|_2^2+\|u_{yy}-g_{yy}-v_{yy}\|_2^2+\|u_{tt}-\lambda_t\cdot g_{tt}-v_{tt}\|_2^2+\\ \|u_{xy}-2\cdot g_{xy}-v_{xy}\|_2^2+\left\|u_{xt}-2\sqrt{\lambda_t}\cdot g_{xt}-v_{xt}\right\|_2^2+\\ \left\|u_{yt}-2\sqrt{\lambda_t}\cdot g_{yt}-v_{yt}\right\|_2^2+\|u-\lambda_{L1}\cdot g-v\|_2^2\end{array}\right]\end{array}\right\}, \quad (10)$$

where v is used to reduce the computational complexity in the first iterative operation.

In some embodiments, the iterative minimization procedure may be given as follows:

$$g^{k+1}=\min_g\left\{\begin{array}{l}\frac{\lambda}{2}\|f-b-g\|_2^2+\\ \frac{\mu}{2}\cdot\left[\begin{array}{l}\|u_{xx}-g_{xx}-v_{xx}\|_2^2+\|u_{yy}-g_{yy}-v_{yy}\|_2^2+\|u_{tt}-\lambda_t\cdot g_{tt}-v_{tt}\|_2^2+\\ \|u_{xy}-2\cdot g_{xy}-v_{xy}\|_2^2+\left\|u_{xt}-2\sqrt{\lambda_t}\cdot g_{xt}-v_{xt}\right\|_2^2+\\ \left\|u_{yt}-2\sqrt{\lambda_t}\cdot g_{yt}-v_{yt}\right\|_2^2+\|u-\lambda_{L1}\cdot g-v\|_2^2\end{array}\right]\end{array}\right\}, \quad (11)$$

$$u_{xx}^{k+1}=\min_{u_{xx}}\left\{\|u_{xx}\|_1+\frac{\mu}{2}\cdot\left\|u_{xx}-g_{xx}^{k+1}-v_{xx}^k\right\|_2^2\right\} \quad (12)$$

$$u_{yy}^{k+1}=\min_{u_{yy}}\left\{\|u_{yy}\|_1+\frac{\mu}{2}\cdot\left\|u_{yy}-g_{yy}^{k+1}-v_{yy}^k\right\|_2^2\right\}$$

$$u_{tt}^{k+1}=\min_{u_{tt}}\left\{\|u_{tt}\|_1+\frac{\mu}{2}\cdot\left\|u_{tt}-\lambda_t\cdot g_{tt}^{k+1}-v_{tt}^k\right\|_2^2\right\}$$

$$u_{xy}^{k+1}=\min_{u_{xy}}\left\{\|u_{xy}\|_1+\frac{\mu}{2}\cdot\left\|u_{xy}-\lambda_z\cdot g_{xy}^{k+1}-v_{xy}^k\right\|_2^2\right\} ,$$

$$u_{xt}^{k+1}=\min_{u_{xt}}\left\{\|u_{xt}\|_1+\frac{\mu}{2}\cdot\left\|u_{xt}-2\sqrt{\lambda_t}\cdot g_{xt}^{k+1}-v_{xt}^k\right\|_2^2\right\}$$

$$u_{yt}^{k+1}=\min_{u_{yt}}\left\{\|u_{yt}\|_1+\frac{\mu}{2}\cdot\left\|u_{yt}-2\sqrt{\lambda_t}\cdot g_{yt}^{k+1}-v_{yt}^k\right\|_2^2\right\}$$

$$u^{k+1}=\min_u\left\{\|u\|_1+\frac{\mu}{2}\cdot\left\|u-\lambda_{L1}\cdot g^{k+1}-v^k\right\|_2^2\right\}$$

$$\begin{aligned}v_{xx}^{k+1}&=v_{xx}^k+g_{xx}^k-u_{xx}^k\\ v_{yy}^{k+1}&=v_{yy}^k+g_{yy}^k-u_{yy}^k\\ v_{tt}^{k+1}&=v_{tt}^k+\lambda_t\cdot g_{tt}^k-u_{tt}^k\\ v_{xy}^{k+1}&=v_{xy}^k+2\cdot g_{xy}^k-u_{xy}^k\\ v_{xt}^{k+1}&=v_{xt}^k+2\sqrt{\lambda_t}\cdot g_{xt}^k-u_{xt}^k\\ v_{yt}^{k+1}&=v_{yt}^k+2\sqrt{\lambda_t}\cdot g_{yt}^k-u_{yt}^k\\ v^{k+1}&=v^k+\lambda_{L1}\cdot g^k-u^k\end{aligned} \quad (13)$$

Using Equations (11-13), the COP may be split into three steps (smooth convex). Then, the final first iterative operation may be expressed as follows:

$$g^{k+1}=\frac{\left(L_{sHe}^k+\frac{\lambda}{\mu}\cdot(f-b)\right)}{\left|\nabla_{xx}^2+\nabla_{yy}^2+\lambda_t\cdot\nabla_{tt}^2+2\cdot\nabla_{xy}^2+2\sqrt{\lambda_t}\cdot\nabla_{xt}^2+2\sqrt{\lambda_t}\cdot\nabla_{yt}^2\right|^2+\lambda_{L1}^2+\frac{\lambda}{\mu}} \quad (14)$$

$$L_{sHe}^k=\left\{\begin{array}{l}(\nabla_{xx}^2)^T(u_{xx}^k-v_{xx}^k)+(\nabla_{yy}^2)^T(u_{yy}^k-v_{yy}^k)+\lambda_z\cdot(\nabla_{tt}^2)^T(u_{tt}^k-v_{tt}^k)+2\cdot(\nabla_{xy}^2)^T(u_{xy}^k-v_{xy}^k)+\\ 2\sqrt{\lambda_t}\cdot(\nabla_{xt}^2)^T(u_{xt}^k-v_{xt}^k)+2\sqrt{\lambda_t}\cdot(\nabla_{yt}^2)^T(u_{yt}^k-v_{yt}^k)+\lambda_{L1}(u^k-v^k)\end{array}\right\},$$

where $g^{k+1}$ represents the intermediate image finally determined in the last iteration, $\nabla_{xx}$ represents a two-order derivation operator in the x-axis direction (e.g., $\nabla_{xx}=[1,-2,1]$), and $\nabla_{yy}$, $\nabla_{tt}$, $\nabla_{xy}$, $\nabla_{xt}$, $\nabla_{yt}$ may be similarly defined as $\nabla_{xx}$. A relationship between $u^{k+1}$ and $g^{k+1}$ may be represented as Equation (15):

$$u_{xx}^{k+1} = \begin{cases} g_{xx}^{k+1} + v_{xx}^k - \frac{1}{\mu}, & g_{xx}^{k+1} + v_{xx}^k \in \left(\frac{1}{\mu}, \infty\right) \\ 0, & g_{xx}^{k+1} + v_{xx}^k \in \left(-\frac{1}{\mu}, \frac{1}{\mu}\right) \\ g_{xx}^{k+1} + v_{xx}^k + \frac{1}{\mu}, & g_{xx}^{k+1} + v_{xx}^k \in \left(-\infty, -\frac{1}{\mu}\right) \end{cases}$$
$$= \mathrm{shrink}\left(g_{xx}^{k+1} + v_{xx}^k, \frac{1}{\mu}\right)$$
$$u_{yy}^{k+1} = \mathrm{shrink}\left(g_{yy}^{k+1} + v_{yy}^k, \frac{1}{\mu}\right)$$
$$u_{tt}^{k+1} = \mathrm{shrink}\left(\lambda_t \cdot g_{tt}^{k+1} + v_{tt}^k, \frac{1}{\mu}\right)$$
$$u_{xy}^{k+1} = \mathrm{shrink}\left(2 \cdot g_{xy}^{k+1} + v_{xy}^k, \frac{1}{\mu}\right)$$
$$u_{xt}^{k+1} = \mathrm{shrink}\left(2\sqrt{\lambda_t} \cdot g_{xt}^{k+1} + v_{xt}^k, \frac{1}{\mu}\right)$$
$$u_{yt}^{k+1} = \mathrm{shrink}\left(2\sqrt{\lambda_t} \cdot g_{yt}^{k+1} + v_{yt}^k, \frac{1}{\mu}\right)$$
$$u^{k+1} = \mathrm{shrink}\left(\lambda_{L1} \cdot g^{k+1} + v^k, \frac{1}{\mu}\right)$$

where $u^{k+1}$ represents the intermediate variable u finally determined in the last iteration. Using Equations. (13-15), the COP may be easily resolved.

In some embodiments, for the preliminary image determined by the upsampling operation, the loss function (6) may be rewritten as follows:

$$\arg\min_g\left\{\frac{\lambda}{2}\|f - b - Dg\|_2^2 + R_{Hessian}(g) + \lambda_{L1}\|g\|_1\right\}, \quad (16)$$

where D represents a downsampling matrix.

In 512, the processing device 140 (e.g., the deconvolution module 412) may generate a target image by performing, based on a second objective function, a second iterative operation on the intermediate image.

In some embodiments, the intermediate image determined by the first iterative operation may have low contrast in extrapolated spatial frequency largely due to the convolution of the real object with the PSF of the image acquisition device 110 (e.g., 2D-SIM/SD-SIM) and the extension of bandwidth due to the sparsity and continuity constraints. The second iterative operation may be used to further boost the acquired bandwidth of the intermediate image beyond that set by the image acquisition device 110, e.g., eliminate the blur of the intermediate image caused by the image acquisition device 110 itself.

In some embodiments, the processing device 140 may determine an initial estimated target image based on the intermediate image. The processing device 140 may update an estimated target image by performing, based on the initial estimated target image, a plurality of iterations of the second object function. In each of the plurality of iterations, the processing device 140 may determine whether a third termination condition is satisfied. In response to determining that the third termination condition is satisfied, the processing device 140 may finalize the target image and designate the estimated target image in the iteration as the target image. In response to determining that the third termination condition is not satisfied, the processing device 140 may determine an updated estimated target image in the iteration.

The processing device 140 may perform a next iteration of the first object function based on the updated estimated target image. The third condition may be similar to the second condition, and not repeated here.

In some embodiments, the second objective function may be associated with a system matrix of the image acquisition device 110 and a second difference between the intermediate image and the target image. The second difference may include a third difference between the intermediate image and the target image multiplied by the system matrix. For example, the second objective function may be expressed as a loss function as follows:

$$\arg\min_x\{\|g - Ax\|_2^2\}, \quad (17)$$

where g represents the intermediate image, A represents the system matrix, x represents the target image, Ax represents the target image multiplied by the system matrix, g−Ax represents the third difference, and $\|\bullet\|_2$ represents the L-2 norm.

In some embodiments, the second iterative operation may include an iterative deconvolution using a Landweber (LW) deconvolution algorithm, a Richardson Lucy (RL)-based deconvolution algorithm, or the like, or any combination thereof. For example, for the intermediate image with a relatively high SNR (e.g., the intermediate image in the 2D-SIM system) the processing device 140 may apply the Landweber (LW) deconvolution to process the intermediate image, in which a gradient descent algorithm with Nesterov momentum acceleration may be used as follows:

$$\begin{aligned} y^{(j+1)} &= x^{(j+1)} + \beta_k(x^{(j)} - x^{(j-1)}) \\ x^{(j+1)} &= y^{(j+1)} + A^T(g^N - Ay^{(j+1)}) \\ \gamma^j &= \frac{1}{2}(4\gamma_{j-1}^2 + \gamma_{j-1}^4)^{\frac{1}{2}} - \gamma_{j-1}^2 \\ \beta_j &= 1 - \gamma_{j-1}^{-1} \end{aligned} \quad (18)$$

where $g^N$ represents the image after sparse reconstruction (i.e., the intermediate image) and $x^{j+1}$ represents the target image after j+1 iterations. In some embodiments, to attain reliable image fidelity, the second iterative operation may be terminated at an early stage to constrain the target image. The numbers of deconvolution iterations (i.e., an iterative number of the second objective function) may be listed in a parameter table in a Software User Manual.

As another example, for the intermediate image with a relatively low SNR (e.g., the intermediate image in the SD-SIM system), the processing device 140 may apply the Richardson Lucy (RL)-based deconvolution algorithm to process the intermediate image, which is corrupted with excessive noise. The RL-based deconvolution algorithm may be accelerated expressed as follows:

$$\begin{aligned} y^{j+1} &= x^j \cdot \left(h^T \cdot \frac{g^N}{h \cdot x^j}\right) \\ v^j &= x^{j+1} - y^j \\ \alpha^{j+1} &= \frac{\sum v^j \cdot v^{j-1}}{\sum v^{j-1} \cdot v^{j-1}} \\ x^{j+1} &= y^{j+1} + \alpha^{j+1} \cdot (y^{j+1} - y^j) \end{aligned} \quad (19)$$

where $g^N$ represents the image after sparse reconstruction (i.e., the intermediate image), $x^{j+1}$ represents the target image after j+1 iterations, and α denotes an adaptive acceleration factor representing a computational iteration step length, which may be estimated directly from experimental results. In some embodiments, taking advantage of the stable convergence performance, the required number of iterations in the accelerated RL algorithm may be reduced by substantially 10 times compared to the classical RL algorithm.

In some embodiments, as Equation (17) does not consider the effects of Poisson distributed noise, the RL-deconvolution algorithm described in Equation (19) may not be the ideal model for sparse deconvolution; nonetheless, it may exhibit superior performance when processing real data (e.g., the intermediate image). This may occur because the original data g, as seen in the first term of Equation (19), acts to constrain the iterative deconvolution procedure, permitting relatively high-fidelity restoration without introducing unexpected artifacts under low SNR conditions.

In some embodiments, the target image may have an improved spatial resolution in comparison with a reference image generated based on a third objective function. The third objective function may include the first term and the second term of the first objective without the third term of the first objective function. For example, the processing device 140 may determine a second intermediate image by performing, based on the third objective function, a fourth iterative operation (which is similar to the first iterative operation) on the preliminary image. The processing device 140 may generate the reference image by performing, based on the second objective function, a fifth iterative operation (which is similar to the second iterative operation) on the second intermediate image. A first spatial resolution of the target image may be improved by 50%-100% with respect to a second spatial resolution of the reference image.

It should be noted that the above description of the process 500 is merely provided for purposes of illustration, and not intended to limit the scope of the present disclosure. It should be understood that, after understanding the principle of the operations, persons having ordinary skills in the art may arbitrarily combine any operations, add or delete any operations, or apply the principle of the operations to other image processing process, without departing from the principle. In some embodiments, process 500 may include one or more additional operations. For example, an additional operation may be added after operation 512 for displaying the target image. As another example, an additional operation may be added after operation 504 for pre-processing the preliminary image. In some embodiments, one or more operations in the process 500 may be omitted. For example, operation 502, operation 506 and/or operation 508 may be omitted. In some embodiments, two or more operations in the process 500 may be integrated into one operation. For example, operations 502 and 504 may be integrated into one operation. As another example, operations 506-510 may be integrated into one operation. In some embodiments, operations 510 and 512 may be collectively referred to as a sparse deconvolution operation (or algorithm).

Figure 6:
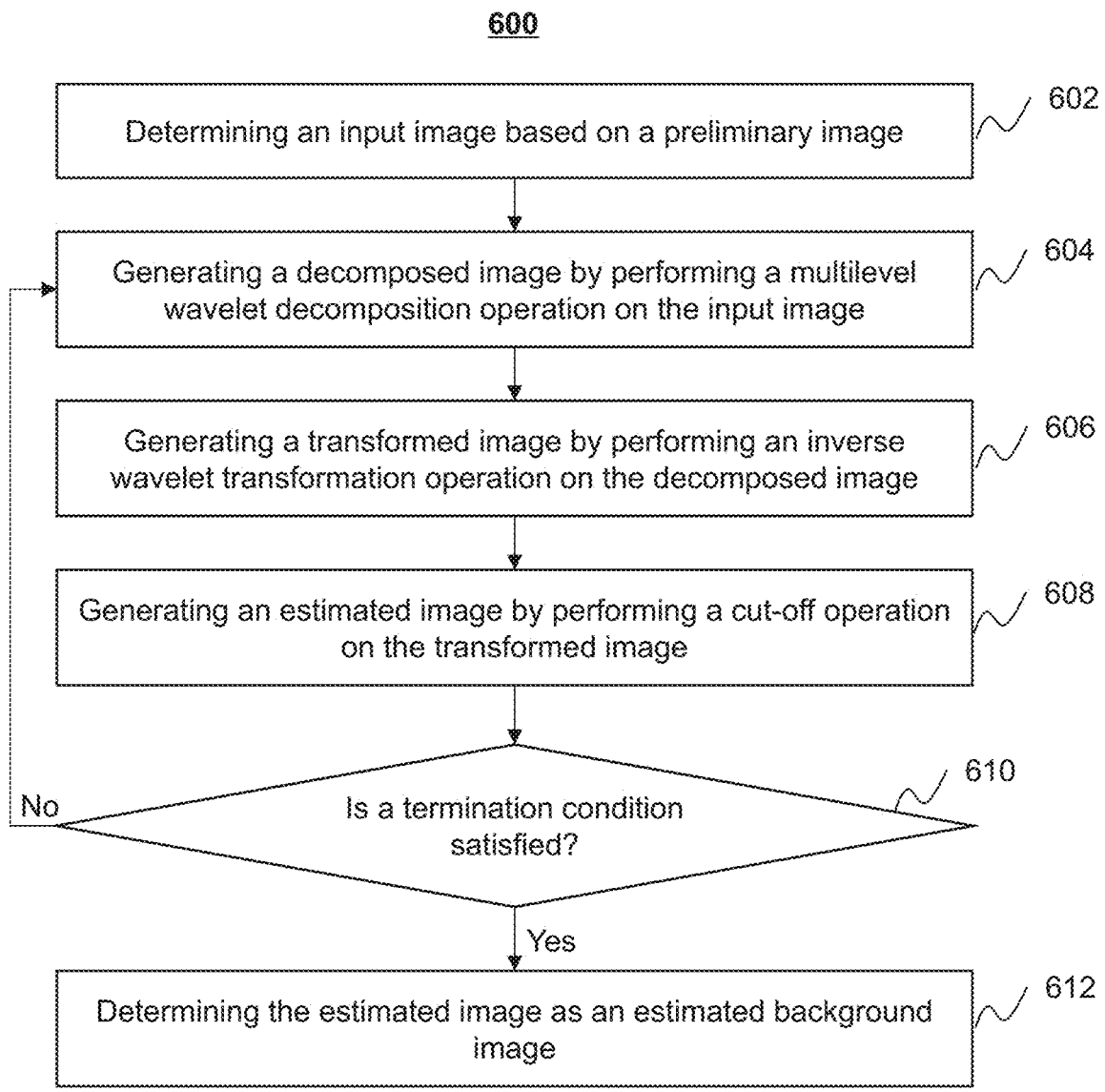
FIG. 6 is a flowchart illustrating an exemplary process for background estimation according to some embodiments of the present disclosure.

FIG. 6 is a flowchart illustrating an exemplary process for background estimation according to some embodiments of the present disclosure. In some embodiments, process 600 may be executed by the image processing system 100. For example, the process 600 may be implemented as a set of instructions (e.g., an application) stored in a storage device (e.g., the storage device 150, the storage 220, and/or the storage unit 370). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 6 and described below is not intended to be limiting. In some embodiments, one or more operations of the process 600 may be performed to achieve operation 506 as described in connection with FIG. 5.

In 602, the processing device 140 (e.g., the background estimation module 406) may determine an input image based on a preliminary image.

In some embodiments, the processing device 140 may directly designate the preliminary image as the input image. In some embodiments, the processing device 140 may pre-process the preliminary image and designate the pre-processed preliminary image as the input image. For example, the processing device 140 may determine the input image by designating pixel values in the preliminary image that is less than the mean value of pixels in the preliminary image as zero. As another example, the processing device 140 may determine the input image by correcting the preliminary image.

In 604, the processing device 140 (e.g., the background estimation module 406) may generate a decomposed image by performing a multilevel wavelet decomposition operation on the input image. As used herein, the decomposed image may refer to an image in the frequency domain.

In some embodiments, the processing device 140 may perform the multilevel wavelet decomposition operation on the input image using one or more wavelet filters as described in operation 506 in FIG. 5. After the multilevel wavelet decomposition operation, the processing device 140 may decompose the input image into a plurality of levels of frequency bands in the frequency domain. The processing device 140 may extract the lowest frequency band from the plurality of levels of frequency bands. Further, the processing device 140 may generate the decomposed image based on the lowest frequency band. For example, for the 2D-SIM system, the processing device 140 may use a 2D Daubechies-6 wavelet filter to decompose the preliminary image up to the $7^{th}$ level in the frequency domain, i.e., the preliminary image may be decomposed into 7 levels of frequency bands. The processing device 140 may determine the decomposed image based on the lowest frequency band among the 7 levels of frequency bands.

In 606, the processing device 140 (e.g., the background estimation module 406) may generate a transformed image by performing an inverse wavelet transformation operation on the decomposed image. As used herein, the transformed image may refer to an image in the spatial domain. The inverse wavelet transformation operation may refer to an operation that can transform information from the frequency domain to the spatial domain, e.g., an inverse Fourier transformation operation. In some embodiments, operation 606 may be used to remove high-intensity pixels resulting from inaccurate estimation.

In some embodiments, to prevent accidental removal of minor useful information (or signals), the inverse wavelet transformation operation may be performed on the decomposed image (i.e., the lowest frequency band) to generate the transformed image in the spatial domain. For example, the processing device 140 may perform the inverse wavelet transformation operation on the decomposed image to generate an intermediate transformed image. The processing device 140 may merge the intermediate image and half of the square root of the input image by keeping the minimum values at each pixel to determine the transformed image. That is, the processing device 140 may compare a value of each pixel in the intermediate transformed image with half of the square root of a value of a corresponding pixel in the input image. As used herein, a relative position of the corresponding pixel in the input image with respect to the input image may be the same as a relative position of the each pixel in the intermediate transformed image. If the value of a specific pixel in the intermediate transformed image is greater than half of the square root of the value of a corresponding pixel in the input image, the processing device 140 may determine the transformed image by replacing the value of the specific pixel in the intermediate transformed image by the square root of the value of the corresponding pixel in the input image. If the value of the specific pixel in the intermediate transformed image is less than half of the square root of the value of the corresponding pixel in the input image, the processing device 140 may determine the transformed image by keeping the value of the specific pixel in the intermediate transformed image. Additionally or alternatively, if the value of the specific pixel in the intermediate transformed image is equal to half of the square root of the value of the corresponding pixel in the input image, the processing device 140 may determine the transformed image by keeping the value of the specific pixel in the intermediate transformed image or replacing the value of the specific pixel in the intermediate transformed image by the square root of the value of the corresponding pixel in the input image.

In 608, the processing device 140 (e.g., the background estimation module 406) may generate an estimated image by performing a cut-off operation on the transformed image. In some embodiments, the estimated image may also be referred to as a low peak background estimation.

After the cut-off operation, amplitude values of the transformed image may be cut off in a certain percentage in the frequency domain. That is, amplitude values of the estimated image in the frequency domain may be the certain percentage of the amplitude values of the transformed image. For example, the processing device 140 may perform a 50% cut-off operation on the transformed image. The amplitude values of the estimated image may be 50% of the amplitude values of the transformed image. As another example, the processing device 140 may perform a 40% cut-off operation on the transformed image. The amplitude values of the estimated image may be 40% of the amplitude values of the transformed image.

In 610, the processing device 140 (e.g., the background estimation module 406) may determine whether a termination condition (i.e., the first termination condition in FIG. 5) is satisfied. In response to determining that the first termination condition is satisfied, the processing device 140 may proceed to operation 612. In response to determining that the first termination condition is not satisfied, the processing device 140 may designate the estimated image determined in operation 608 as a new input image for iteratively performing operations 604-608.

In some embodiments, the first termination condition may be associated with an iterative number (count) of operations 604-608. For example, the first termination condition may be satisfied if the iterative number is equal to a threshold count (e.g., 3). In some embodiments, the first termination condition may be associated with a difference between two estimated images determined in two consecutive iterations. For example, the first termination condition may be satisfied if the difference between two estimated images determined in two consecutive iterations is less than a threshold. In some embodiments, the first termination condition may be associated with the iterative time of total iterations. For example, the first termination condition may be satisfied if the iterative time of all iterations is less than a threshold.

In 612, the processing device 140 (e.g., the background estimation module 406) may determine the estimated image as an estimated background image of the preliminary image. Further, the processing device 140 may generate a residual image by extracting the estimated background image from the preliminary image for sparse deconvolution as described in operations 508-512.

It should be noted that the above description of the process 600 is merely provided for purposes of illustration, and not intended to limit the scope of the present disclosure. It should be understood that, after understanding the principle of the operations, persons having ordinary skills in the art may arbitrarily combine any operations, add or delete any operations, or apply the principle of the operations to other image processing process, without departing from the principle. In some embodiments, one or more operations may be added or omitted in the process 600. For example, an additional operation may be added for storing the estimated background image.

In some embodiments, fluorescence microscopy may achieve high resolution and contrast by labeling designated structures such as actin, microtubules, and vesicles, which may often be sparse in the spatial domain in terms of the existence of a fraction of nonzero value. However, equivalent to the filtering of high-frequency information by the OTF of the microscope, the final captured fluorescence images (e.g., the raw images, or SR images) may be blurred by the point spread function (PSF) and exhibit an increase in nonzero values. In this regard, enhanced spatial resolution may mean accepting sparsity increases in SR images. However, previous attempts to recover SR information using prior knowledge of sparsity may suffer from typically unstable one-step reconstruction, which depends logarithmically on the image signal-to-noise ratio (SNR).

Figure 7:
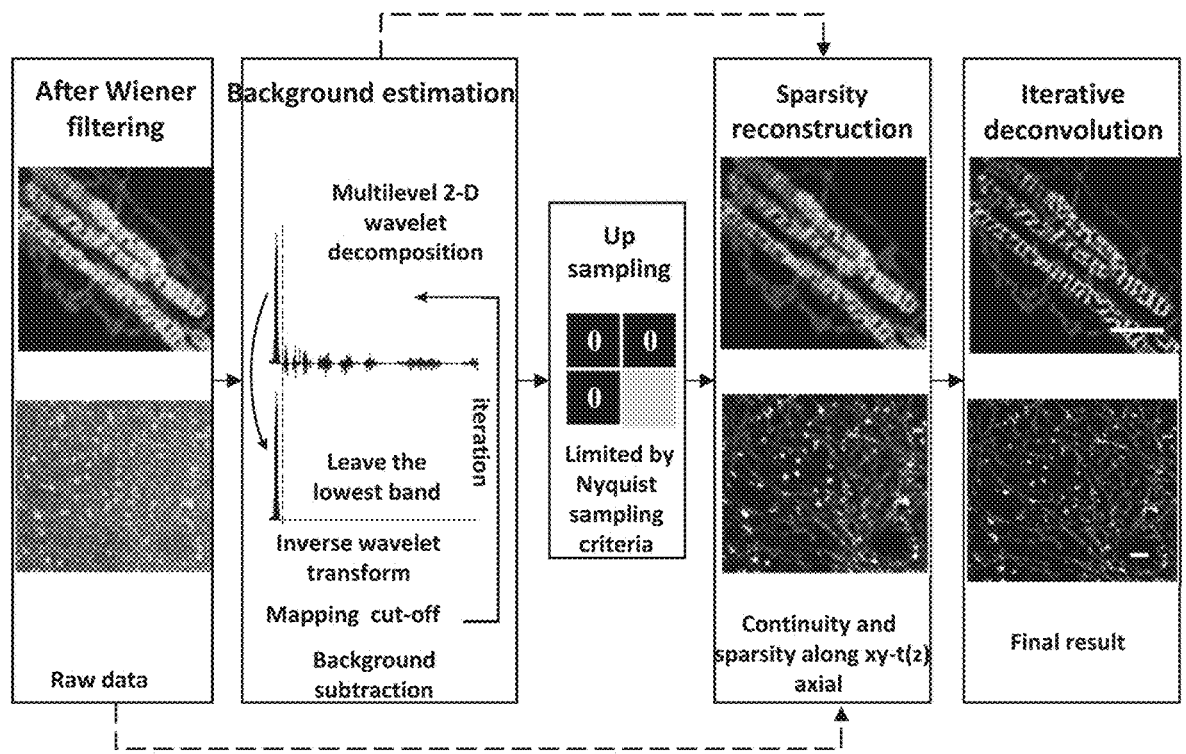
FIG. 7 illustrates exemplary results indicating a flowchart of the sparse deconvolution algorithm according to some embodiments of the present disclosure.
Figure 12:
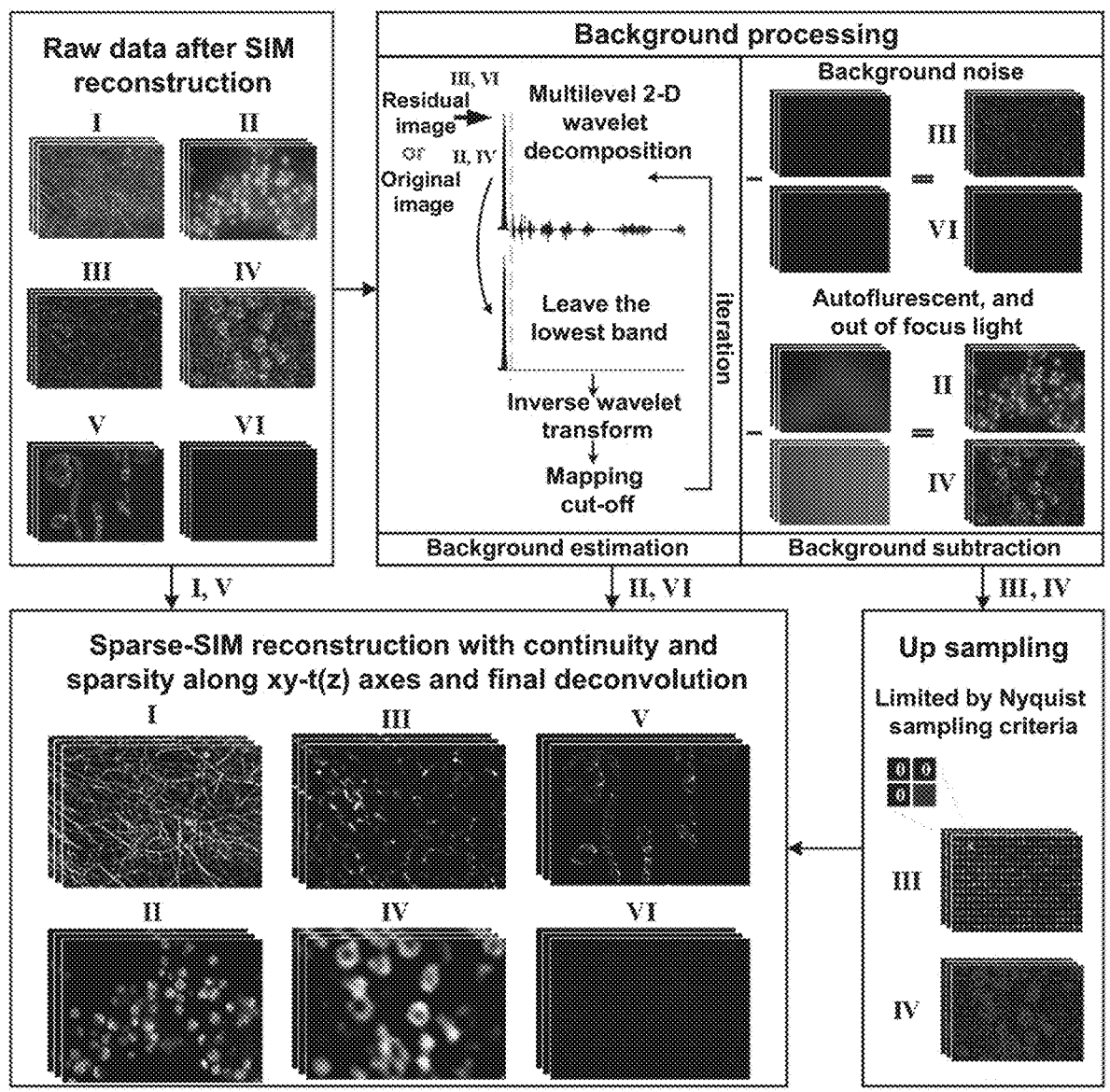
FIG. 12 illustrates exemplary results indicating the detailed workflow of the sparse deconvolution according to some embodiments of the present disclosure.

In the present disclosure, a three-step procedure that both boosts resolution and maintains the fidelity of the SR information is provided as outlined in FIG. 7 and FIG. 12. First, the raw images may be inversely filtered with the conventional Wiener algorithm to maximally boost the SNR of the SR components within the assembled OTF as determined by the image acquisition device 110 (e.g., as described in operation 504 in FIG. 5) and removed background fluorescence originating from out-of-focus planes (e.g., as described in operation 506 in FIG. 5 or operations in FIG. 6). For images (e.g., the residual image) that did not meet the Nyquist sampling criteria, a manual upsampling step (e.g., as described in operation 508) may be added.

Second, to enhance reconstruction fidelity, the Hessian penalty on the continuity along the xy-t axes may be combined with the sparsity term (the $l$ norm of the sum of the absolute values of each element) to iteratively approximate the SR information that extends beyond the OTF (e.g., as described in operation 510 in FIG. 5). The sparse reconstruction/deconvolution may use constrained optimization to generate an optimized image g (i.e., the intermediate image) from Wiener-filtered original SIM image f (i.e., the preliminary image). The image (i.e., the preliminary image) may be first corrected for background b (detailed procedures may be presented in operation 506 in FIG. 5 or operations in FIG. 6). Then, g may be generated by iteratively minimizing the following loss function:

$$\underset{g}{\operatorname{argmin}}\left\{\frac{\lambda}{2}\|f-b-g\|_2^2 + R_{Hessian}(g) + \lambda_{L1}\|g\|_1\right\}, \quad (6)$$

where the first term represents the conventional squared deviation of the reconstructed image (i.e., the intermediate image) from the background-corrected filtered data (i.e., the residual image), the second term represents the continuity constraint as a penalty for high second spatial derivatives (Hessian curvature) of the resulting image (i.e., the intermediate image), and the third term represents the sparsity constraint as a penalty for excessive nonzero values. $\|\cdot\|_1$ and $\|\cdot\|_2$ respectively represent the $l_1$ and $l_2$ norms, and $\lambda$ and $\lambda_{L1}$ respectively represent the weighting factors that balance the fidelity and sparsity of the images. The loss function may form a convex optimization problem solvable using the split Bregman algorithm (detailed equations and procedures are shown in operation 510 in FIG. 5). While the sparsity term (the summation of the absolute values from all pixels within the image stack) permits some extrapolations of bandwidth limited by the image acquisition device 110 (FIGS. 13, 14, 15, 16, and 17), the fidelity term (the Hessian penalty on the continuity along the xy-taxes) may ensure a reconstruction with a robust SNR against artifacts (FIGS. 14 and 17).

Finally, another iterative deconvolution step (e.g., as described in operation 512 in FIG. 5) may be applied based on maximum a posteriori estimation (MAP) to further enhance the contrast of the high-frequency components that extends beyond the image acquisition device 110-determined OTF (detailed procedures being presented in operation 512 in FIG. 5).

The present disclosure is further described according to the following examples, which should not be construed as limiting the scope of the present disclosure.

EXAMPLES

Materials and Methods

Cell Maintenance and Preparation.

INS-1 cells were cultured in RPMI 1640 medium (GIBCO, 11835-030) supplemented with 10% FBS (GIBCO), 1% 100 mM sodium pyruvate solution, and 0.1% 55 mM 2-mercaptoethanol (GIBCO, 21985023) in an incubator at 37° C. with 5% $CO_2$ until ~75% confluency was reached. COS-7 cells and HeLa cells were cultured in high-glucose DMEM (GIBCO, 21063029) supplemented with 10% fetal bovine serum (FBS) (GIBCO) and 1% 100 mM sodium pyruvate solution (Sigma-Aldrich, S8636) in an incubator at 37° C. with 5% $CO_2$ until ~75% confluency was reached. For the 2D-SIM imaging experiments, cells were seeded onto coverslips (H-LAF 10L glass, reflection index: 1.788, diameter: 26 mm, thickness: 0.15 mm, customized). For the SD-SIM imaging experiments, 25-mm coverslips (Fisherbrand, 12-545-102) were coated with 0.01% Poly-L-lysine solution (SIGMA) for ~24 hours before seeding transfected cells.

For the 2D-SIM experiments, to label LEs/LYs, COS-7 cells were incubated with 1×LysoView™ 488 (Biotium, 70067-T) in complete cell culture medium at 37° C. for 15-30 min and protected from light, without being washed and imaged. To label LEs/Lys in the SD-SIM experiments, COS-7 cells were incubated in 50 nM LysoTracker Deep Red (Thermo Fisher Scientific, L12492) for 45 min and washed them 3 times in PBS before imaging. To label LDs, COS-7 cells were incubated with 1×LipidSpot™ 488 (Biotium, 70065-T) in complete cell culture medium at 37° C. for 30 min and protected from light before being washed and imaged. To label mitochondria, COS-7 cells were incubated with 250 nM MitoTracker™ Green FM (Thermo Fisher Scientific, M7514) and 250 nM MitoTracker® Deep Red FM (Thermo Fisher Scientific, M22426) in HBSS containing $Ca^{2+}$ and $Mg^{2+}$ but no phenol red (Thermo Fisher Scientific, 14025076) at 37° C. for 15 min before being washed three times before imaging. To perform nuclear staining, COS-7 cells were incubated with 10 µg/ml Hoechst (Thermo Fisher Scientific, H1399) in PBS for ~5 mins and washed 3 times in PBS.

To label cells with genetic indicators, Cos-7 cells were transfected with caveolin-EGFP/LifeAct-EGFP/LAMP1-EGFP/LAMP1-mChery/Tom20-mScarlet/Tom20-mCherry/Sec61β-Cherry/Sec61β-EGFP/clathrin-EGFP/clathrin-DsRed. HeLa cells were transfected with Tubulin-EGFP/Pex11a-BFP/LAMP1-mChery. INS-1 cells were transfected with Vamp2-pHluorin. The transfections were executed using Lipofectamine™ 2000 (Thermo Fisher Scientific, 11668019) according to the manufacturer's instructions. After transfection, cells were plated in precoated coverslips. Live cells were imaged in complete cell culture medium containing no phenol red in a 37° C. live cell imaging system. For the experiments conducted with INS-1 cells, the cells were stimulated with a solution containing 70 mM KCl and 20 mM glucose and vesicle fusion events were observed under a TIRF-SIM microscope.

The interference-based SIM setup.

The schematic illustration of the system is based on a commercial inverted fluorescence microscope (IX83, Olympus) equipped with a TIRF objective (Apo N 1000×/1.7 HI Oil, Olympus), a wide-field objective (100×/1.45 Oil, ApoN, Olympus) and a multiband dichroic mirror (DM, ZT405/488/561/640-phase R; Chroma). In short, laser light with wavelengths of 488 nm (Sapphire 488LP-200) and 561 nm (Sapphire 561 LP-200, Coherent) and acoustic optical tunable filters (AOTF, AA Opto-Electronic, France) were used to combine, switch, and adjust the illumination power of the lasers. A collimating lens (focal length: 10 mm, Lightpath) was used to couple the lasers to a polarization-maintaining single-mode fiber (QPMJ-3AF3S, Oz Optics). The output lasers were then collimated by an objective lens (CFI Plan Apochromat Lambda 2×NA 0.10, Nikon) and diffracted by the pure phase grating that consisted of a polarizing beam splitter (PBS), a half wave plate and the SLM (3DM-SXGA, ForthDD). The diffraction beams were then focused by another achromatic lens (AC508-250, Thorlabs) onto the intermediate pupil plane, where a carefully designed stop mask was placed to block the zero-order beam and other stray light and to permit passage of ±1 ordered beam pairs only. To maximally modulate the illumination pattern while eliminating the switching time between different excitation polarizations, a home-made polarization rotator was placed after the stop mask (18). Next, the light passed through another lens (AC254-125, Thorlabs) and a tube lens (ITL200, Thorlabs) to focus on the back focal plane of the objective lens, which interfered with the image plane after passing through the objective lens. Emitted fluorescence collected by the same objective passed through a dichroic mirror (DM), an emission filter and another tube lens. Finally, the emitted fluorescence was split by an image splitter (W-VIEW GEMINI, Hamamatsu, Japan) before being captured by an sCMOS (Flash 4.0 V3, Hamamatsu, Japan).

The SD-SIM setup.

The SD-SIM is a commercial system based on an inverted fluorescence microscope (IX81, Olympus) equipped with a 100×, 1.3 NA) oil objective and a scanning confocal system (CSU-X1, Yokogawa). Four laser beams of 405 nm, 488 nm, 561 nm, and 647 nm were combined with the SD-SIM. The Live-SR module (GATACA systems, France) was equipped with the SD-SIM. The images were captured either by an sCMOS (C14440-20UP, Hamamatsu, Japan) or an EMCCD (iXon3 897, Andor) as mentioned in FIG. 10 or FIG. 11.

FRC Resolution Map.

To analyze the imaging capability of SR microscopes, FRC resolution may be implemented to describe the effective resolution. To visualize the FRC resolution more clearly, the blockwise FRC resolution mapping may be applied to evaluate the (Sparse) SIM and (Sparse) SD-SIM images. More specifically, each image may be divided into independent blocks, and the local FRC value may be calculated individually. If the FRC estimations in a block are sufficiently correlated, this region may be color coded in the FRC resolution map. Otherwise, the region may be color coded according to its neighbor interpolation. It should be noted that before calculating the FRC resolution map of SD-SIM raw images in FIGS. 10A, 10H and 11A, a wavelet denoise algorithm may be applied in advance to images to avoid the ultralow SNR of SD-SIM raw images influencing the FRC calculation.

FWHM and Rayleigh Criterion Analysis.

All the datasets extracted from the full width at half-maxima (FWHM) and two peak fitting may be processed using the multiple peaks fit in OriginPro with Gaussian functions. To avoid the influence of large beads on the bead resolution estimation, a bead-size correction factor may be included in the FWHM resolution calibration for (Sparse) SD-SIM (FIG. 18). Therefore, the exact resolution value may be calculated using the following equation:

$$FWHM_r = \sqrt{FWHM_m^2 d^2}, \quad (20)$$

where $FWHM_m$ denotes the FWHM estimated directly from a single point in the image, $FWHM_r$ denotes the corrected resolution of (Sparse) SD-SIM, and d represents the bead diameter, which is 100 nm in FIG. 18.

Mesh Pore Diameters of Actin Networks.

The mesh pore diameters (FIG. 8H) of actin networks may be analyzed.

Considering the low SNR condition and high background in 2D-SIM and SD-SIM images, the pre-transform may be replaced with the pre-filter. Specifically, a Gaussian filter and an unsharp mask filter may be used successively to denoise the raw image and remove its background. The pores may be extracted by Meyer watershed segmentation. Then, the pore sizes may be calculated by the number of enclosed pixels from inverted binary images multiplied by the physical pixel size. In some embodiments, the Sparse-SIM and Sparse SD-SIM images (i.e., target SIM and SD-SIM images determined by sparse reconstruction) may be segmented directly using hard thresholds due to their extremely clear backgrounds.

CCP Diameters.

Figure 10A:
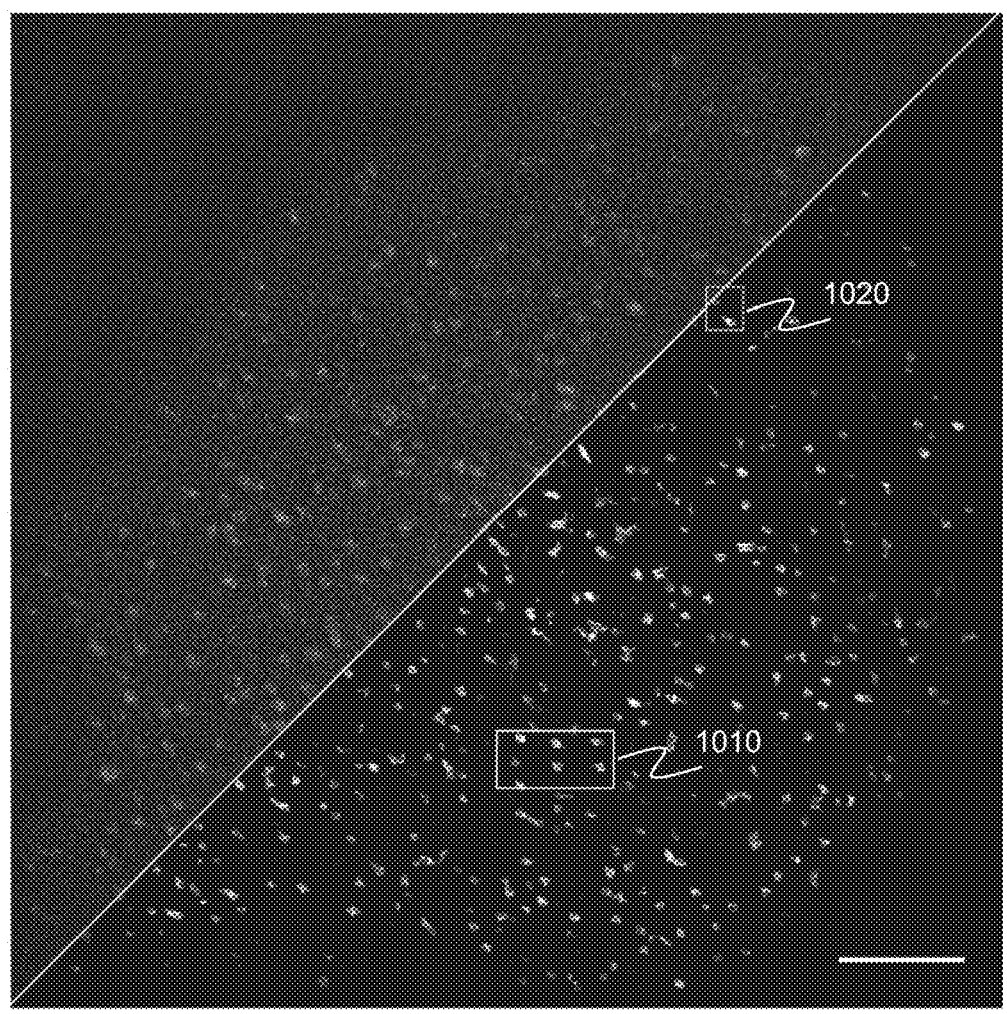
FIGS. 10A-10L illustrate exemplary results indicating sparse SD-SIM enables three-dimensional, multicolor and sub-90-nm resolution for live cell SR imaging according to some embodiments of the present disclosure.

Two main procedures may be involved before calculating the CCP diameters in FIG. 10A. First, the image in FIG. 10A may be segmented with the locally adaptive threshold to segment the ring structures in the image. Second, the resulting binary images may be processed by the Meyer watershed after distance transform to separate touching CCPs, and the goal may be to generate a boundary as far as possible from the center of the overlapping CCPs. Subsequently, the CCP diameters may be calculated in the same manner as the mesh pore diameters.

Image Rendering and Processing.

Figure 8A:
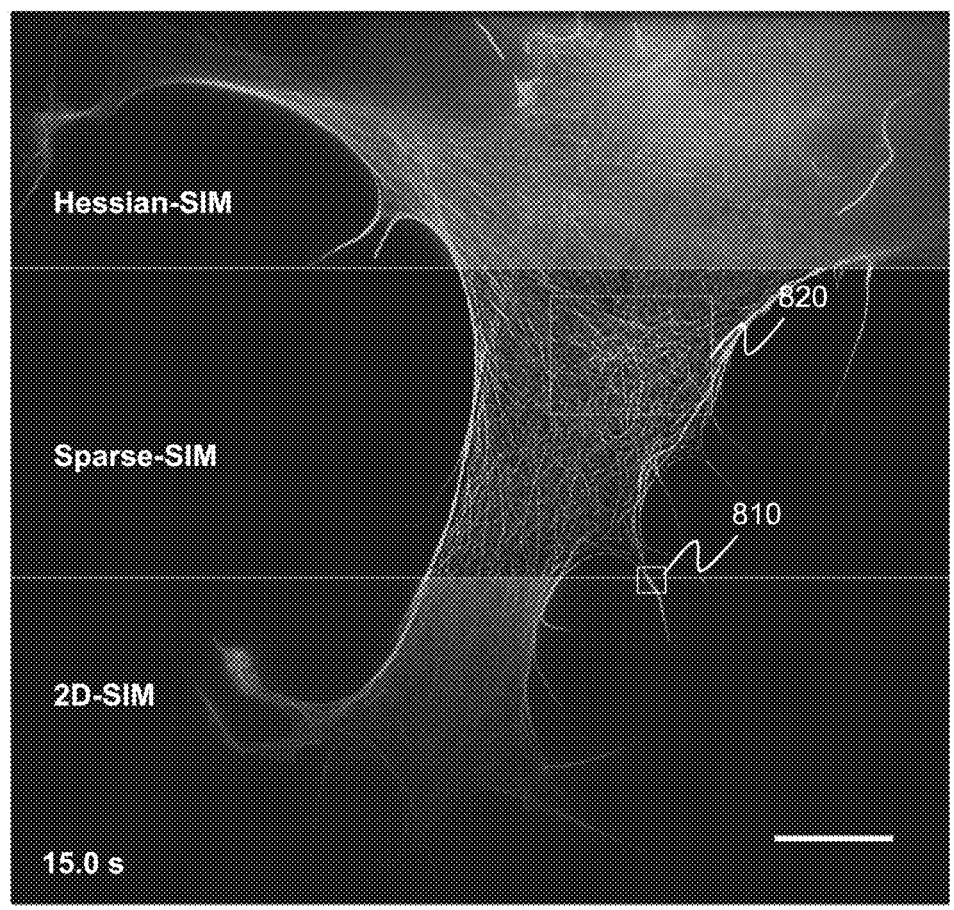
FIGS. 8A-8Q illustrate exemplary results indicating sparse-SIM may achieve substantially 60 nm and millisecond spatiotemporal resolution in live cells according to some embodiments of the present disclosure.
Figure 8B:
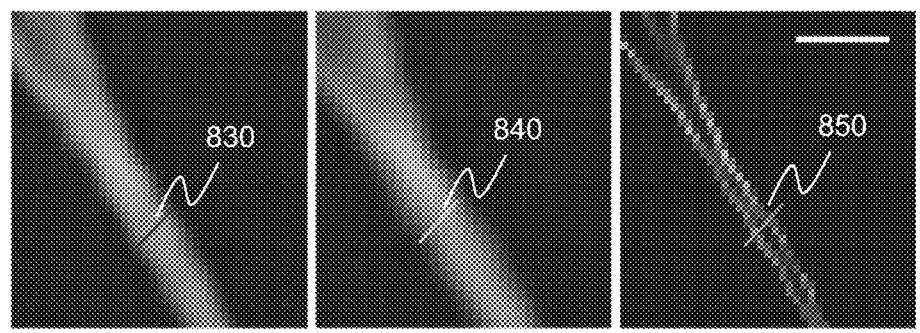
Figure 8C:
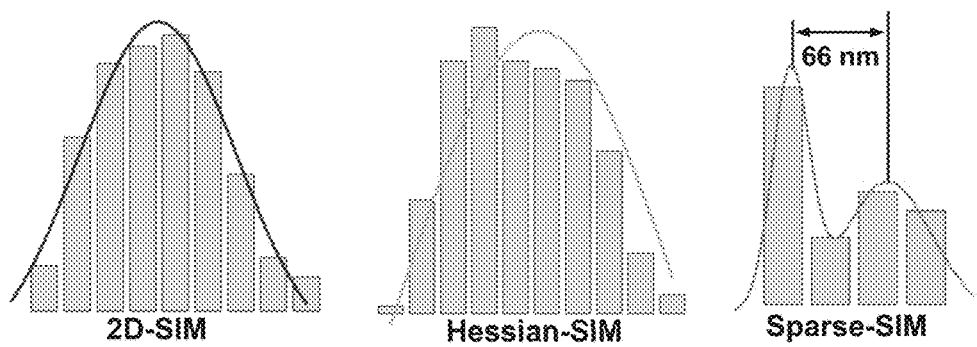
Figure 8D:
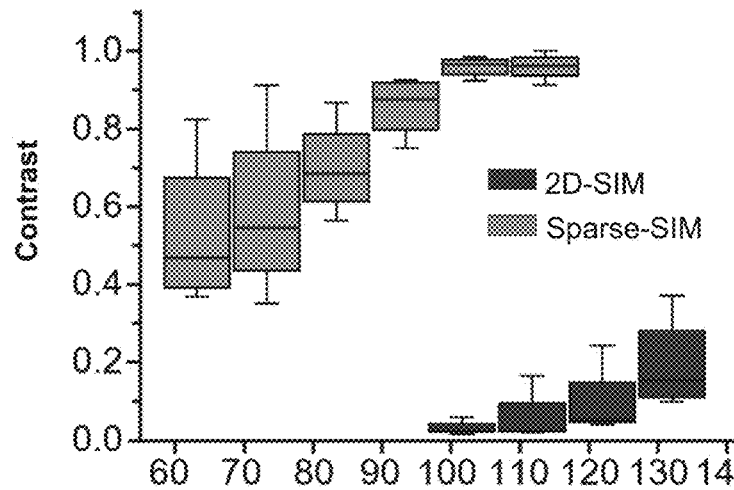
Figure 8E:
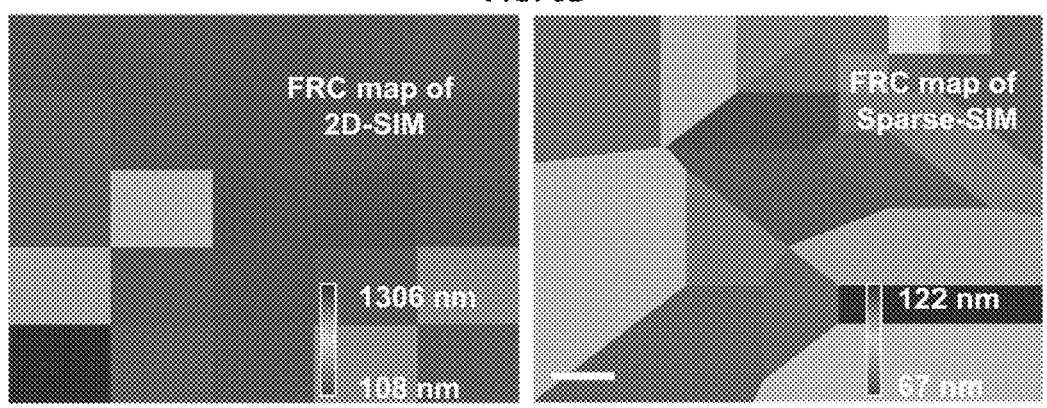

The color map SQUIRREL-FRC associated with ImageJ may be used to present the FRC map in FIG. 8E. The color map Morgenstemning may be applied to exhibit the lysosome in FIG. 10H and the Fourier transform results in FIG. 11D. A 16-color projection may be used to show the depth in FIG. 10K, and jet projection may be used to show the depth in FIG. 11K and its time series in FIG. 10G. The volume in FIG. 11H may be rendered by ClearVolume. All data processing may be achieved using MATLAB and ImageJ. All the Figures may be prepared with MATLAB, ImageJ, Microsoft Visio, and OriginPro, and videos may all be produced with a self-written MATLAB library, which is available at https://github.com/WeisongZhao/img2vid.

Adaptive Filter for SD-SIM.

Confocal type images may often exhibit isolated pixels (1×1~5×5) with extremely bright values caused by voltage instability or dead/hot camera pixels. The magnitudes of these pixels may be approximately 5 to 100 times higher than the normal intensity amplitudes of the biostructure. These isolated pixels may be ill-suited for the sparse reconstruction. An adaptive median filter may be created to remove these improper pixels. More specifically, instead of the normal median filter, which replaces each pixel with the median of the neighboring pixels in the window, a threshold for the developed adaptive median filter may be set. If the pixel intensity is larger than threshold×median in the window, the pixel may be replaced by the median; otherwise, the window may move to the next pixel. By using this algorithm, the isolated pixels may be filtered without blurring the images. The related algorithm may be written as an ImageJ plug-in, and may be found at https://github.com/WeisongZhao/AdaptiveMedian.imagej.

Software and GPU Acceleration.

Sparse-SIM may be implemented in MATLAB using a CPU (Intel i9-7900X, 3.3 GHz, 10 cores, 20 threads, and 128 GB memory), the NVIDIA CUDA fast Fourier transform library (cuFFT), and a GPU (TITAN RTX, 4608 CUDA cores and 24 GB memory). The FFT may be utilized to accelerate the high-content and multidimensional matrix convolution operation in Sparse-SIM. Under the premise that the GPU memory is sufficient for the input data, the effect of acceleration may become more obvious as the size of the data increases. In most circumstances, a 60-fold improvement may be achieved with GPU acceleration compared to CPU processing. For example, the image dataset of 1536×1536×20 in FIG. 8A required substantially 90 s to process with the GPU, far less than 46 mins needed for processing with the CPU. The version of Sparse-SIM software used in the present disclosure (accompanied with the example data, and user manual) may be available as Supplementary Software. The updated version of Sparse-SIM software may be found at https://github.com/WeisongZhao/Sparse-SIM.

Example 1 Validation of Resolution Extension by Sparse Deconvolution

Figure 13A:
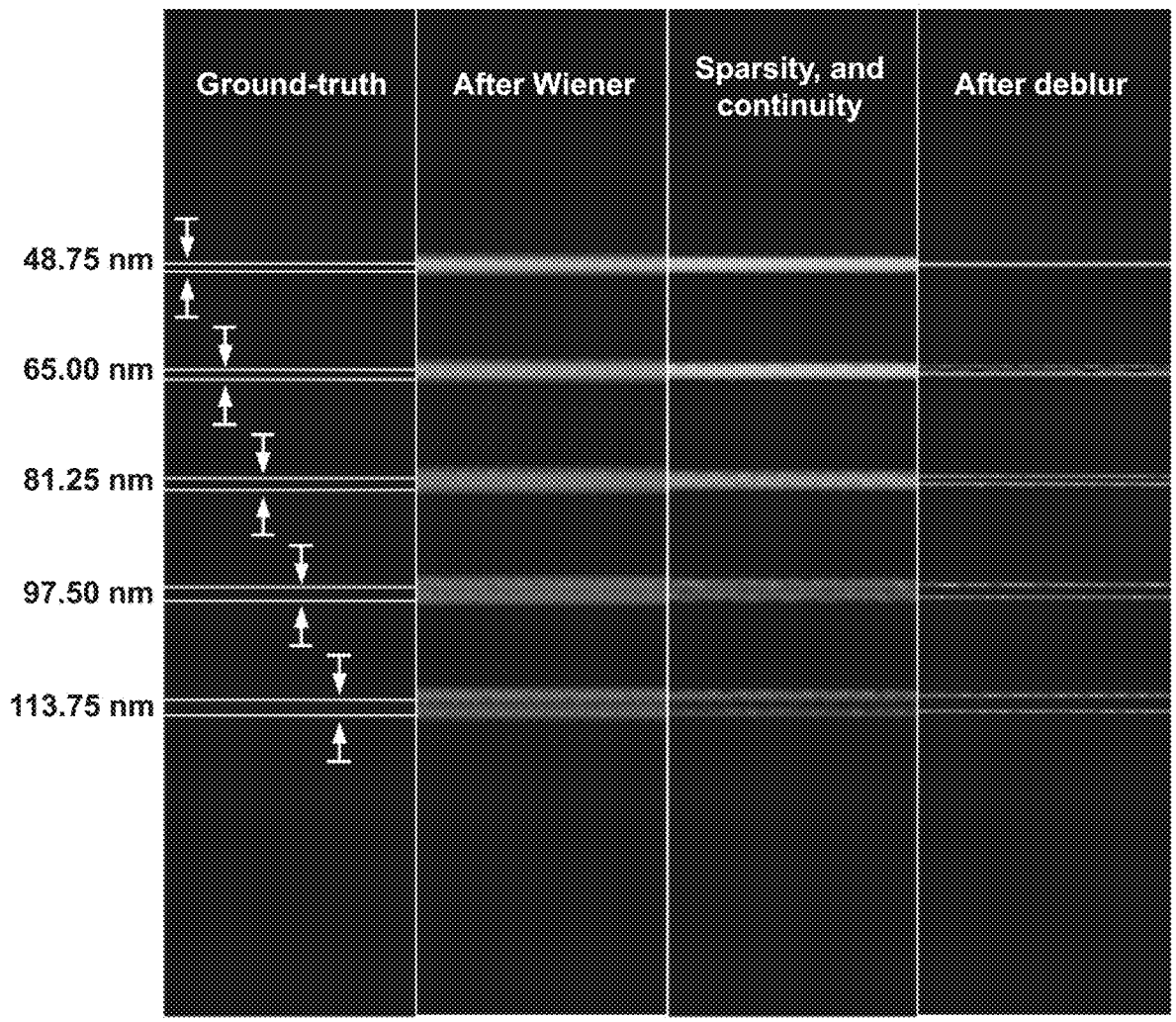
FIGS. 13A-13D illustrate exemplary results indicating benchmark of spatial resolution at different steps of sparse deconvolution according to the synthetic image according to some embodiments of the present disclosure.
Figure 13B:
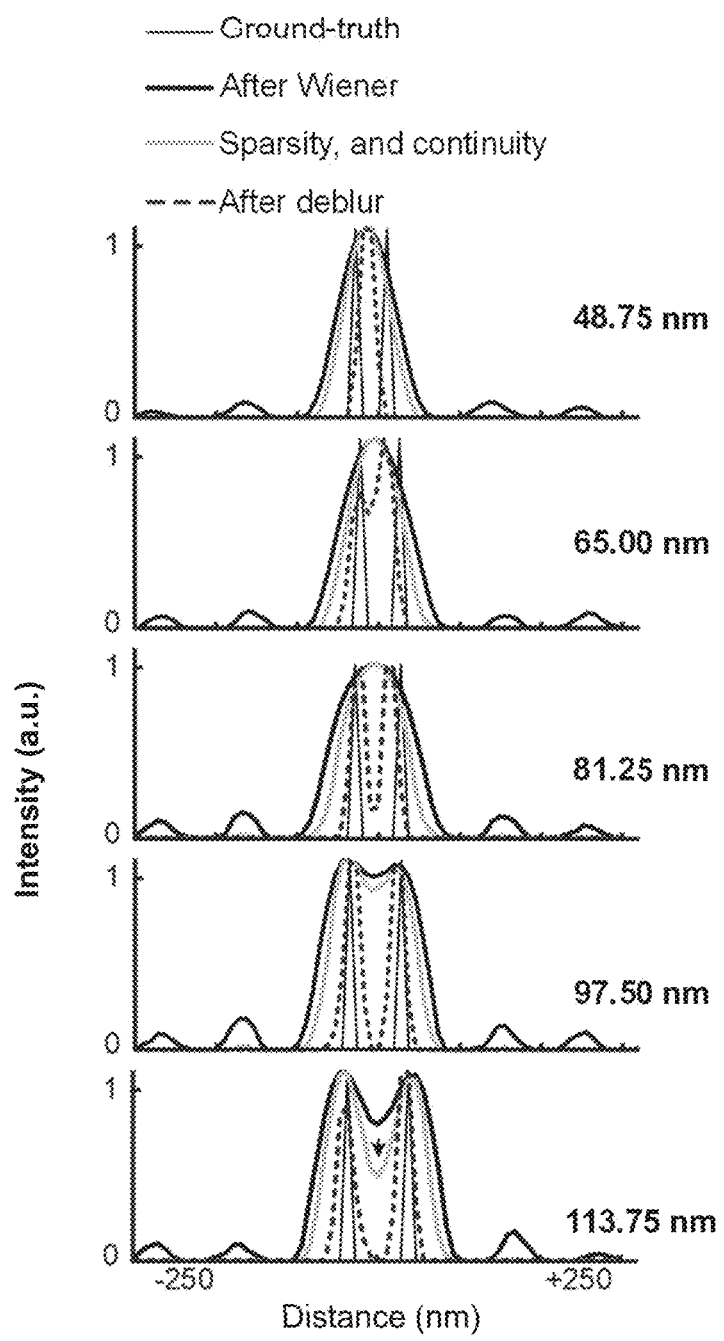
Figures 13C, 13D:
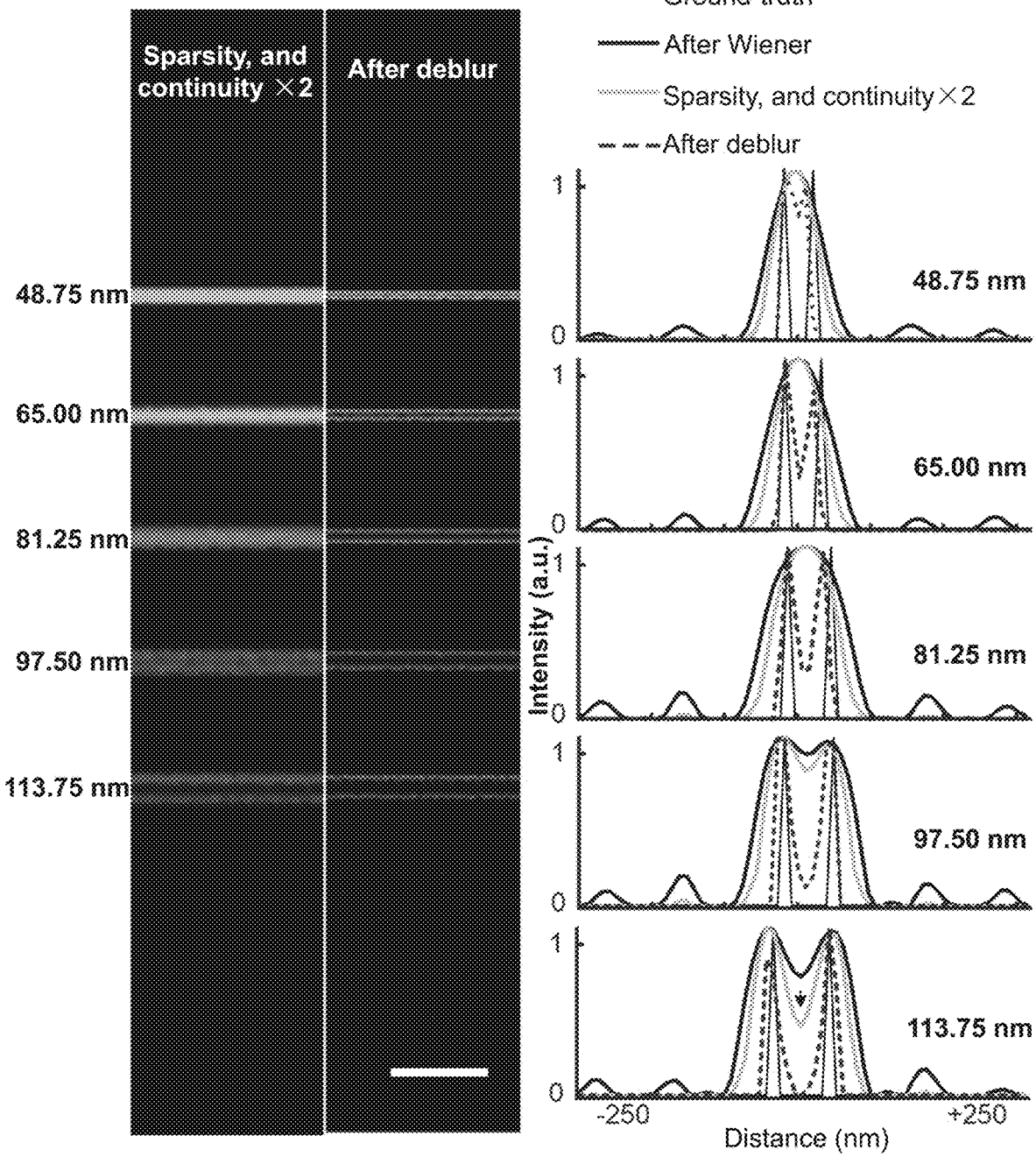

First, the extension of spatial resolution may be tested by the deconvolution algorithm on synthetic filaments with known ground truth. As shown in FIG. 13, two filaments substantially 110 nm apart may be separated after Wiener inverse filtering, while filaments closer than substantially 100 nm may hardly be resolved. Iterative image reconstruction with the sparsity prior may create only a small difference in fluorescence of the middle part between the two filaments, while the deconvolution resulted in the clear separation of two filaments up to substantially 81 nm apart (FIGS. 13A and 13B). However, the contrast for two filaments substantially 65 nm apart may be low (possibly limited by the pixel size of 32 nm), which may be further improved after the pixel upsampling procedure (FIGS. 13C and 13D). Next, the functionality of different steps in the algorithm may be tested on synthetic filament structures corrupted with different levels of noise. Deconvolution without the addition of the sparsity prior may be unable to retrieve the high-frequency information trimmed off by the SIM OTF, while deconvolution without the addition of the continuity prior may lead to reconstruction artifacts that manifested particularly in raw images with low SNR (FIG. 14). However, the combination of the continuity and sparsity priors may enable robust and high-fidelity extrapolation of the high-frequency information inaccessible to SIM, even under situations with excessive noise (FIG. 14, Tables S1 and S2).

Finally, the ability of sparse deconvolution may be tested to increase the resolution of wide-field microscopy and the fidelity of newly identified biological structures. By convolving the image obtained by the 1.4 NA objective with a synthetic PSF from a 0.8 NA objective, a blurred version of actin filaments (FIGS. 15A and 15B) may be created. Interestingly, two blurry opposing actin filaments under the low NA objective may become clearly separable after sparse deconvolution coupled with an extended Fourier frequency domain (FIGS. 15C and 15D). Likewise, instead of simply shrinking the diameter of actin filaments, two neighboring filaments that are substantially 120 nm apart (confirmed by 2D-SIM) may be resolved by the sparse deconvolution of wide field images (FIG. 15E). In addition, a CCP of ~135 nm in diameter under the TIRF-SIM may manifest as a blurred punctum in wide-field images that may have undergone conventional deconvolution or been deconvolved with the Hessian continuity prior. Only after sparse deconvolution, the ring-shaped structure may emerge (FIG. 15F). All these data may confirm the validity of the extension in spatial resolution, as also demonstrated by the extended OTF obtained under different conditions (FIG. 16).

Figure 8F:
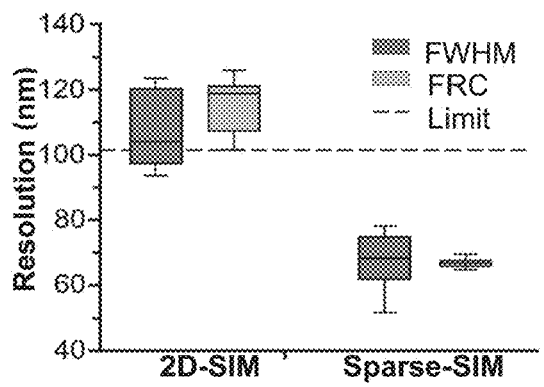
Figure 8G:
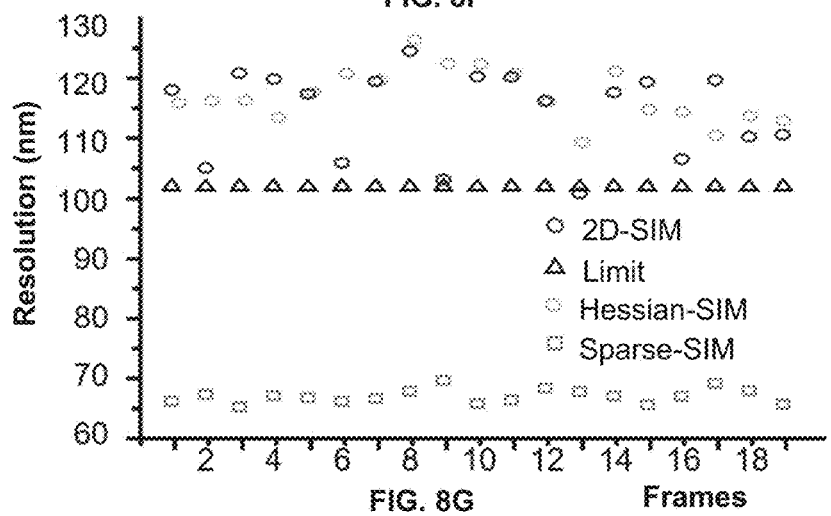

Example 2 Sparse-SIM Achieves 60 nm Resolution Within Millisecond Exposures in Live Cells Actin may be a major cellular cytoskeletal structural building block that constitutes the backbone of the cell membrane and defines the shape and general organization of the cytoplasm. It may be known that concentrated actin may form a gel-like network under the cell cortex and be dynamically regulated during such processes as cell division, migration, and polarization formation. Although actin meshes with pore size, diameters of approximately 50~200 nm may be detected with electron microscopy; however, the dynamic reshaping of these pores may hardly be captured by any live cell SR imaging algorithm due to the lack of sufficient spatiotemporal resolution. Under wide-field illumination, two actin filaments substantially 66 nm apart, which may be indistinguishable with either 2D-SIM or Hessian SIM, may become clearly resolved after deconvolution via the entire algorithm (as shown in FIGS. 8A and 8B) but not when only a subset of the steps is applied (FIG. 17). Better separation of dense actin may mesh results from both the enhanced contrast (as shown in FIG. 8D) and the increased spatial resolution, as shown by both full-width-at-half-maximum (FWHM) analysis of actin filaments and Fourier Ring Correlation (FRC) mapping analysis of SR images (as shown in FIGS. 8E and 8F). During time-lapse SR imaging of actin filament dynamics, the resolution of Sparse-SIM may remain stable, as demonstrated by the relatively consistent values obtained by the FRC-based method (as shown in FIG. 8G). The increase in resolution may be well-demonstrated by the more frequent observations of small pores within the actin mesh. The mean diameter of pores within the cortical actin mesh may be substantially 160 nm from the Sparse-SIM data (as shown in FIG. 8I). An increase in the spatial resolution may also help resolve the ring-shaped caveolae (diameter substantially 60 nm) under TIRF illumination in live COS-7 cells (as shown in FIGS. 8J-8L). Previously, this required nonlinear SIM may come at the expense of additional reconstruction artifacts and limited imaging durations. For fluorescent vesicles such as lysosomes and lipid droplets within the cytosol under wide-field illumination, the sparse deconvolution may eliminate both the background and the reconstruction artifacts due to the low SNR. These data may show that the contrast and resolution may be maintained deep in the cytosol, and the SR images may be sharper than those obtained with conventional SIM or Hessian SIMs (as shown in FIGS. 8M and 8N).

Finally, from raw images captured at a 1,692 Hz frame rate and rolling reconstruction with a temporal resolvability of 564 Hz, sparse deconvolution may be used to provide a clearer view of vesicle fusion events labeled by VAMP2-pHluorin in INS-1 cells. Sparse-SIM may also distinguish open fusion pores as small as substantially 60 nm in diameter (as shown in FIGS. 8O and 8P)—much smaller than those detectable by conventional or Hessian SIM (which is on average substantially 130 nm in diameter, as shown in FIG. 8Q). Likewise, compared with fusion pores detected by the conventional SIM, Sparse-SIM may detect pores occurred much earlier (substantially 40 ms versus substantially 69 ms after the initial opening of the fusion pore) and the images may last for a much longer time during the whole fusion process (substantially 182 ms versus substantially 82 ms, as shown in FIG. 8Q). These data may support a spatiotemporal resolution of Sparse-SIM of substantially 60 nm and 564 Hz, which may have not currently achievable using other existing SR algorithms.

Figure 9A:
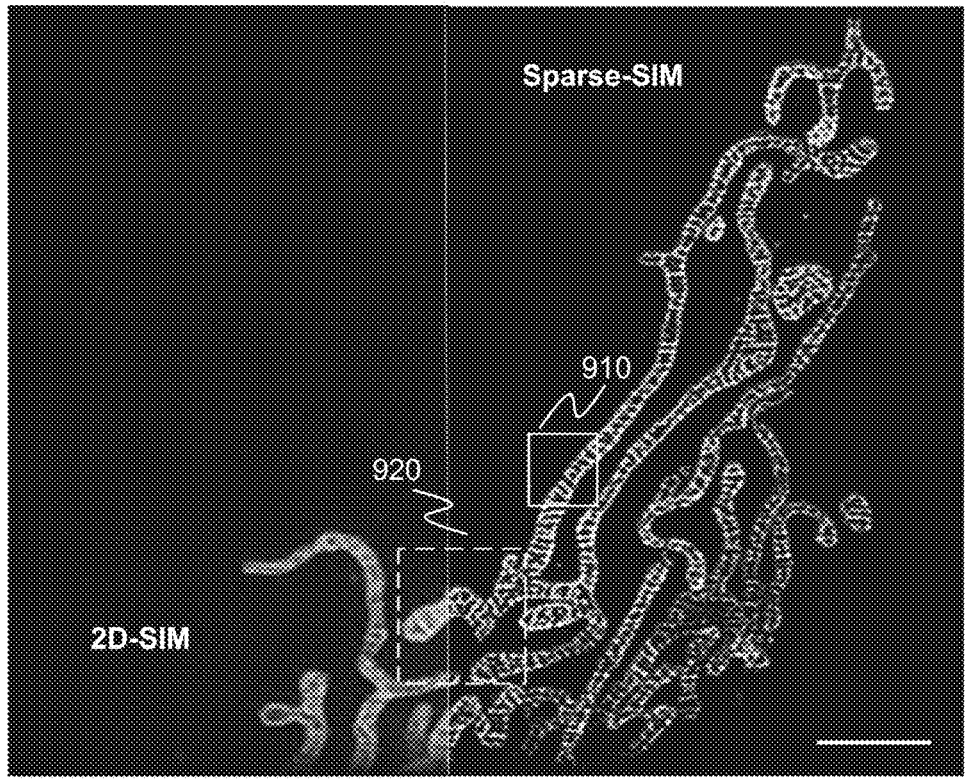
Figure 9B:
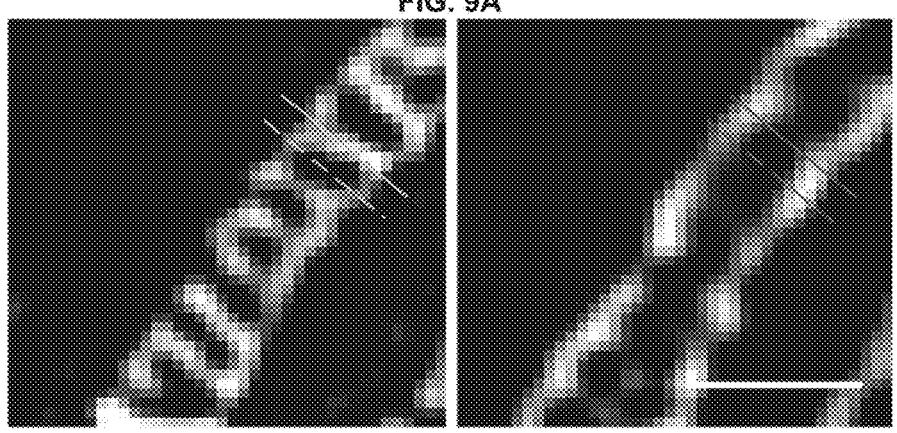

Example 3 Relative Movements Between Suborganellar Structures Observed by Dual-Color Sparse-SIM As a purely mathematical SR technique, Sparse-SIM may be readily used in a dual-color imaging paradigm to improve the resolution at both wavelengths. For example, in cells with both outer and the inner mitochondrial membranes (OMM and IMM) labeled with Tom20-mCherry and Mito-Tracker Green, Sparse-SIM may show sharper cristae structures than the conventional 2D-SIM (as shown in FIG. 9A). In addition, the improved resolution may also permit the detection of small differences between the OMM and the IMM in live mitochondria. At 60~70 nm resolution, Sparse-SIM may readily detect two types of OMM:IMM configurations, e.g., a long crista extended from one side to substantially 142 nm away from the other side of the OMM, and a short crista extended only substantially 44 nm towards the other side of the OMM (as shown in FIGS. 9B-9D). Live cell SR imaging may also reveal rare events, such as the IMM extension not being enclosed within the Tom20-labeled structures in a few frames (as shown in FIG. 9E). This result may be explained by the nonhomogenous distribution of Tom20 protein on the OMM.

Figure 9G:
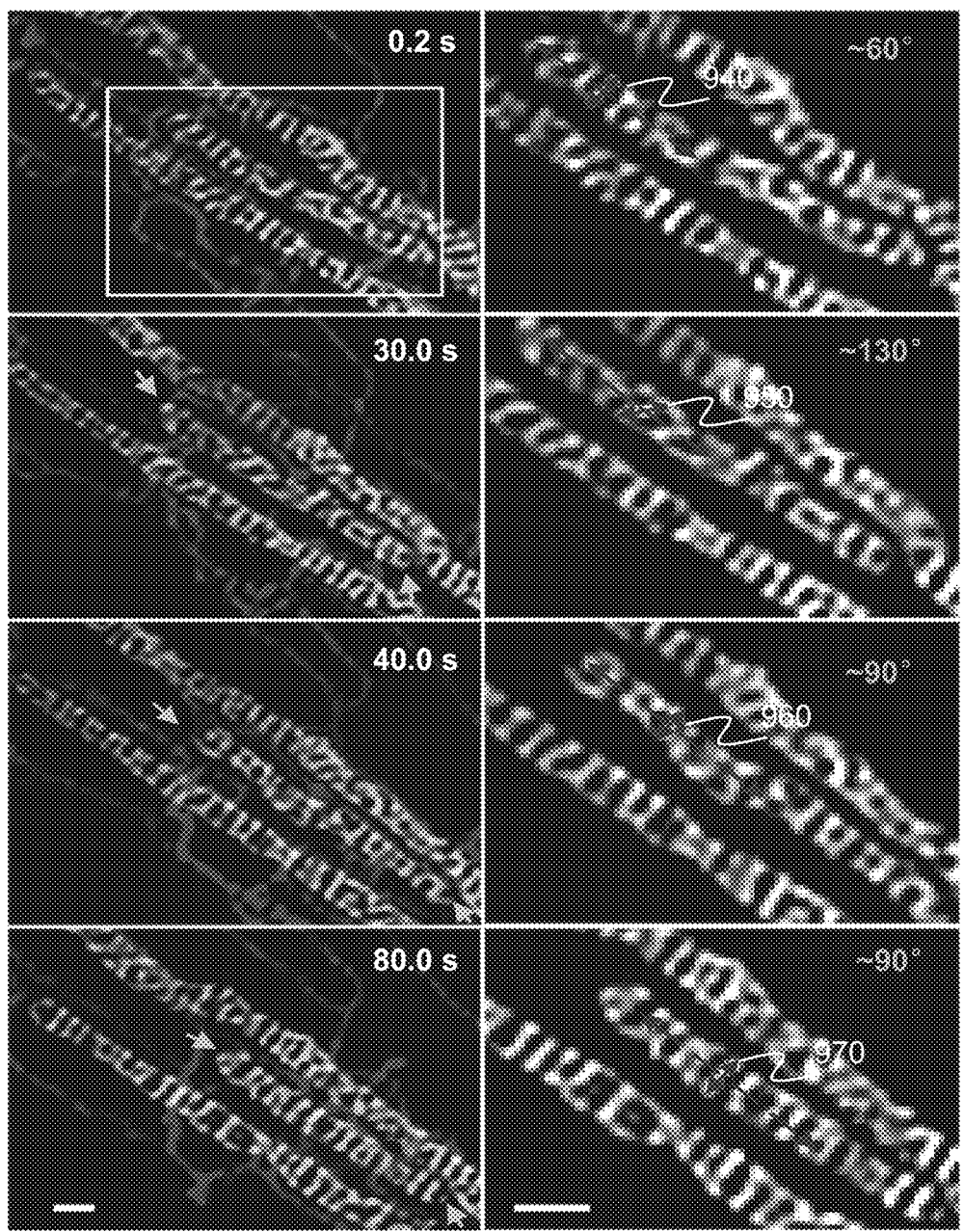

Dual-color Sparse-SIM imaging may also resolve more details regarding organelle contacts, including those formed between the mitochondria and ER. With the better identification of mitochondrial cristae, it may be found that ER tubules (labeled by Sec61β-mCherry) may randomly contact the mitochondria with equal probability at both the cristae regions and the regions between cristae (as shown in FIG. 9F). In addition, the contact between one ER tubule and the top of a mitochondrion may not only correlate with the directional movement of the latter but also the synergistically rearranged orientations of cristae thereafter (as shown in FIG. 9G). Whether such cristae remodeling is causally linked with ER-mitochondrial contacts may remain to be explored in the future, while the ability to visualize these subtle structural changes may lead to new insights into the functional regulation of mitochondria.

Example 4 Sparse Deconvolution May Also be Used to Increase the Three-Dimensional Resolution of Spinning-Disc Confocal-Based SIM (SD-SIM)

Because the continuity and sparseness assumptions are general features of SR fluorescence microscopy, the algorithm may be tested on SR image data obtained by SD-SIM, the pinhole-based SIM known by commercial names such as Airyscan, Live-SR, SpinSR10, Re-Scan Confocal Microscope, etc. Despite a spatial resolution increase of 1.5-1.7-fold over the diffraction limit, SD-SIM may suffer from a low photon budget and poor signal-to-noise ratio (SNR) in live cells because the excitation and emission efficiencies are compromised by the microlens and pinhole arrays. By using the sparse deconvolution on 3D image stacks of fluorescent beads (100 nm) acquired by SD-SIM and correcting for the size effects of fluorescent beads, a lateral resolution of substantially 82 nm and an axial resolution of substantially 266 nm (as shown in FIG. 18) may be obtained, a nearly twofold increase of spatial resolution in all three axes compared to the SD-SIM.

Figure 10B:
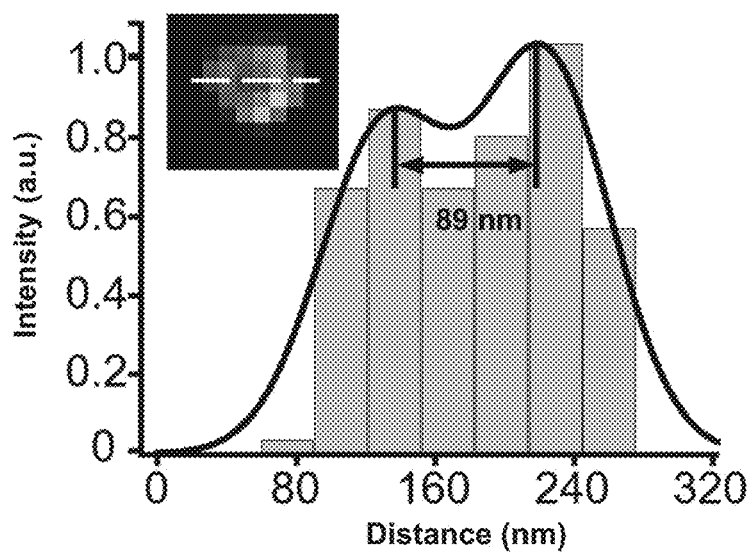
Figure 10C:
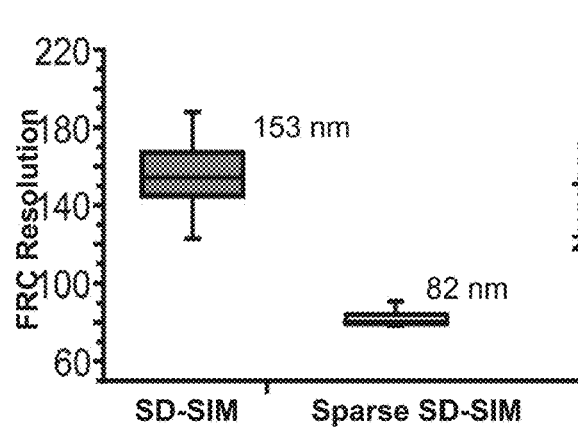
Figure 10D:
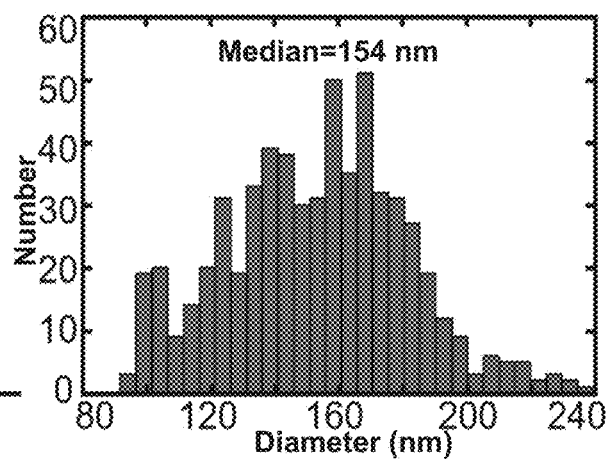
Figure 10E:
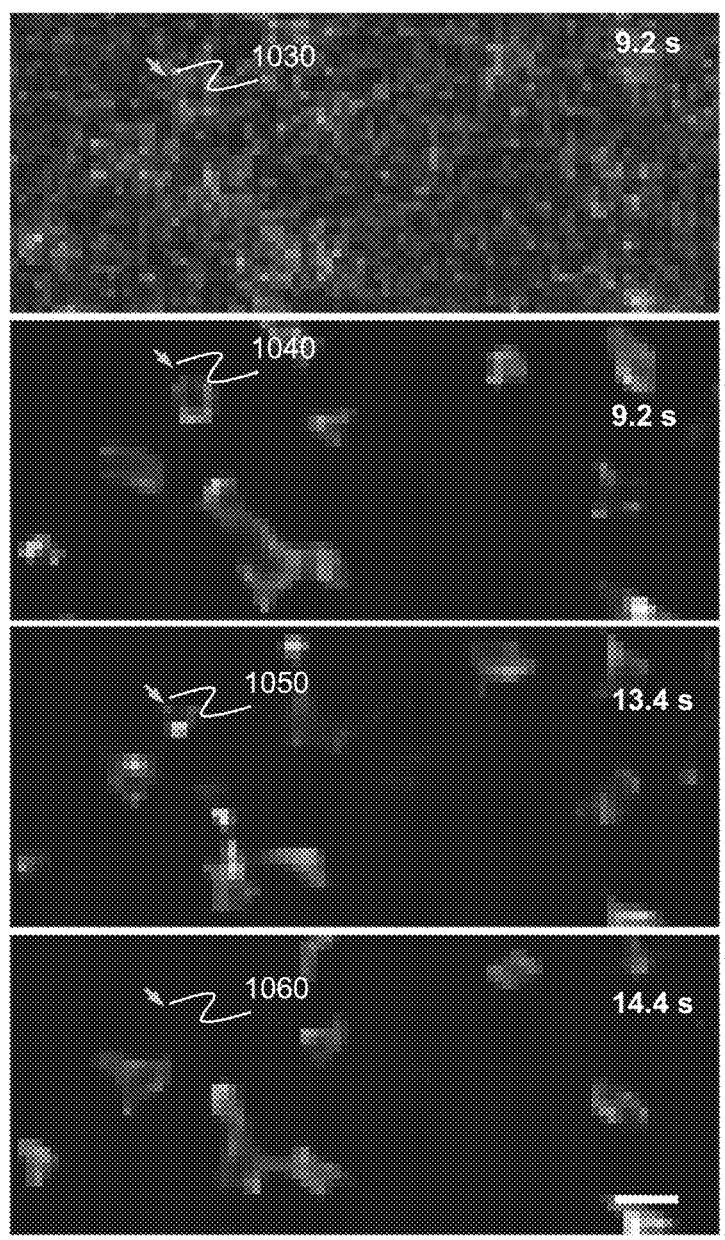
Figure 10F:
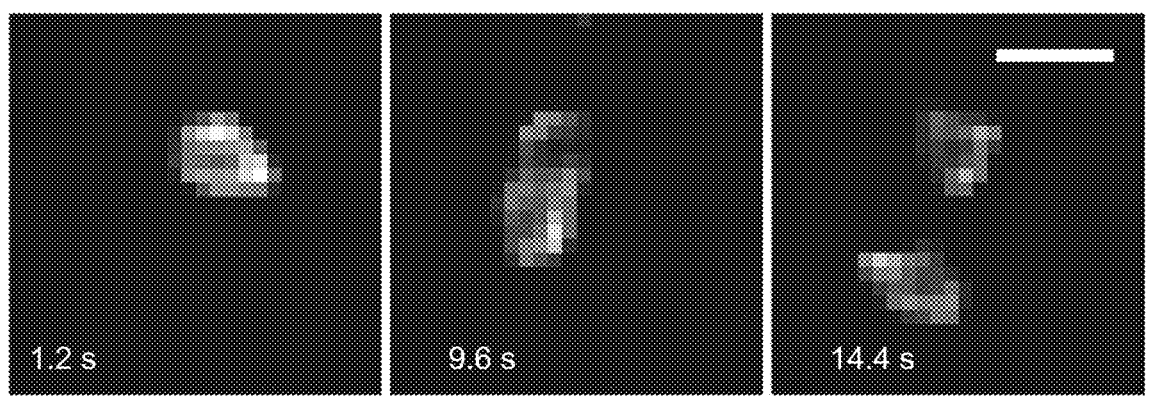
Figure 10G:
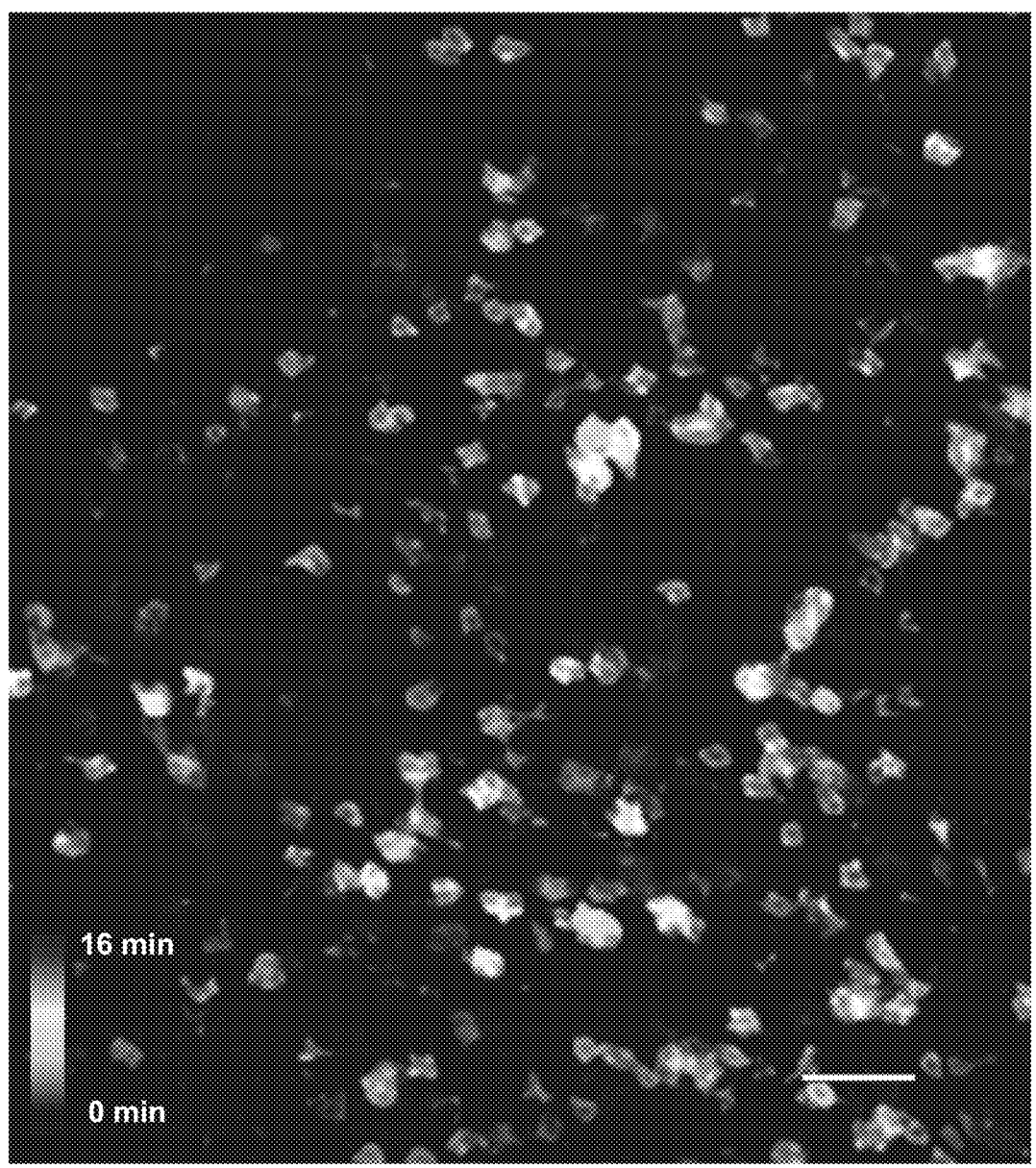

In live COS7-cells labeled with Clathrin-EGFP, Sparse SD-SIM may enable a blurred fluorescent punctum to be resolved as a ring-shaped structure with a diameter of 89 nm (as shown in FIGS. 10A and 10B), which may agree with the resolution measured by the FRC map algorithm (as shown in FIG. 10C). The average diameter of all the ring-shaped CCPs was ~154 nm (as shown in FIG. 10D), the same as previously measured with high NA TIRF-SIM. Events such as the disappearance of a ring-shaped CCP and the disintegration of another CCP into two smaller rings nearby may be seen (as shown in FIGS. 10E and 10F). These rich CCP dynamics may be better interpreted by simultaneously labeling and imaging other molecules, such as actin filaments (labeled by LifeAct-EGFP). Because photon budget allowed by the Sparse SD-SIM could be as small as was substantially 0.9 W/cm$^2$ (Table S3), both actin filaments and CCPs within a large field of view of 44 µm×44 µm may be monitored for more than 15 min at a time interval of 5 s (as shown in FIGS. 10G and 19). Under these conditions, many relative movements between CCPs and filaments may be seen. For example, the de novo appearance and the stable docking of a CCP at the intersection of two actin filaments may be observed, followed by its disappearance from the focal plane as the neighboring filaments may close up and join together (as shown in FIG. 19D), which may be consistent with the role of actin in the endocytosis of CCPs. Similarly, dual-color Sparse SD-SIM may also reveal dynamic interplays between ER tubules and lysosomes, such as the hitchhiking behavior (as shown in FIG. 20).

Figure 8H:
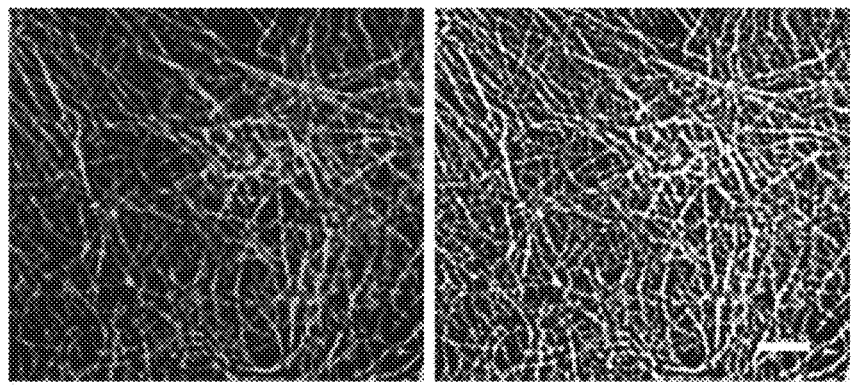
Figure 8I:
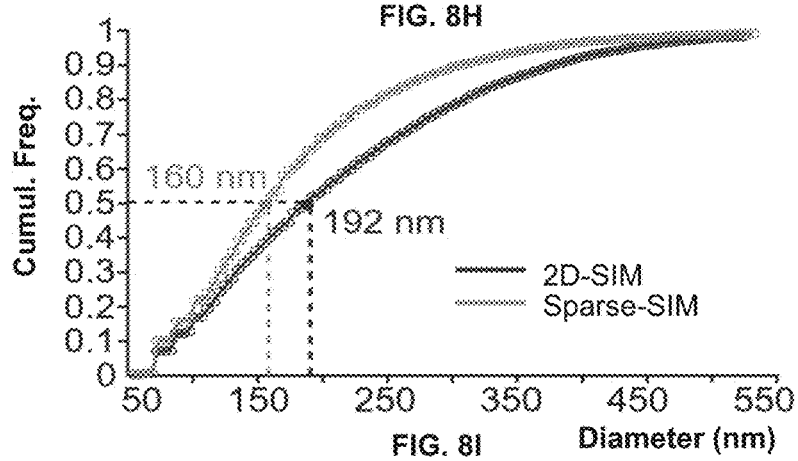
Figure 8J:
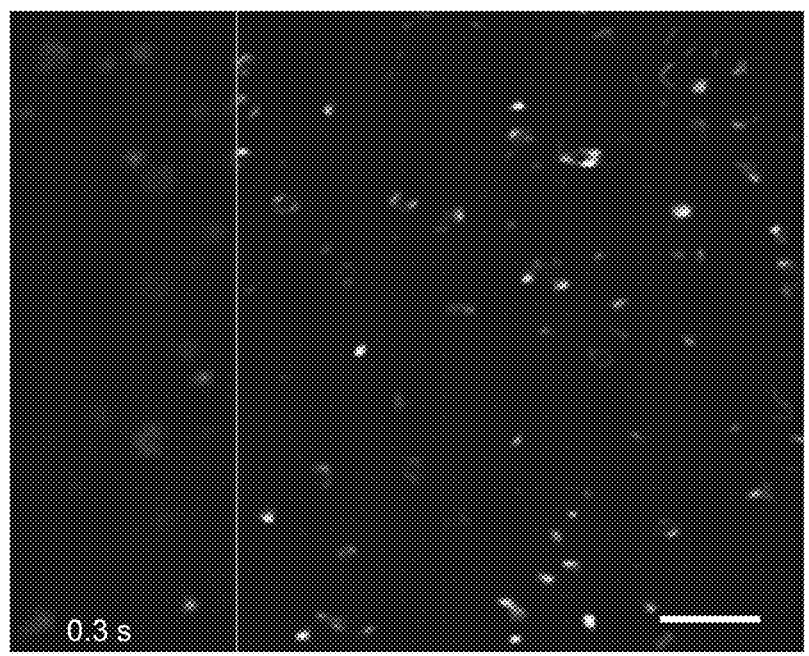
Figure 8K:
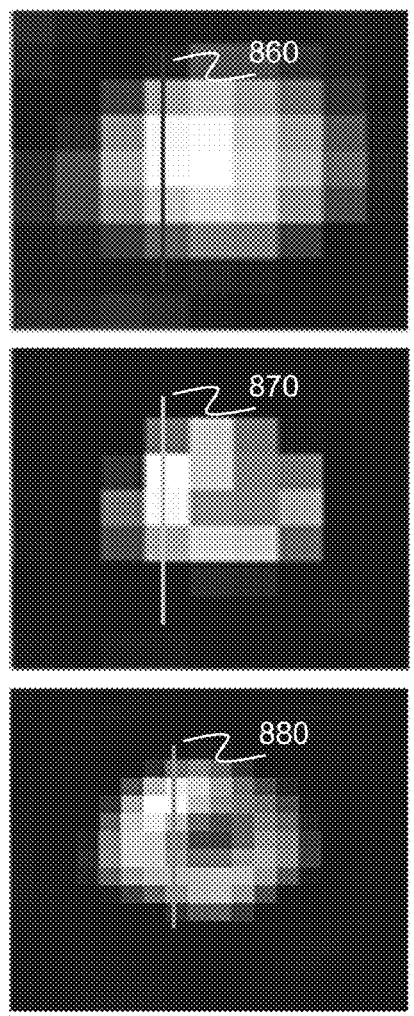
Figure 8L:
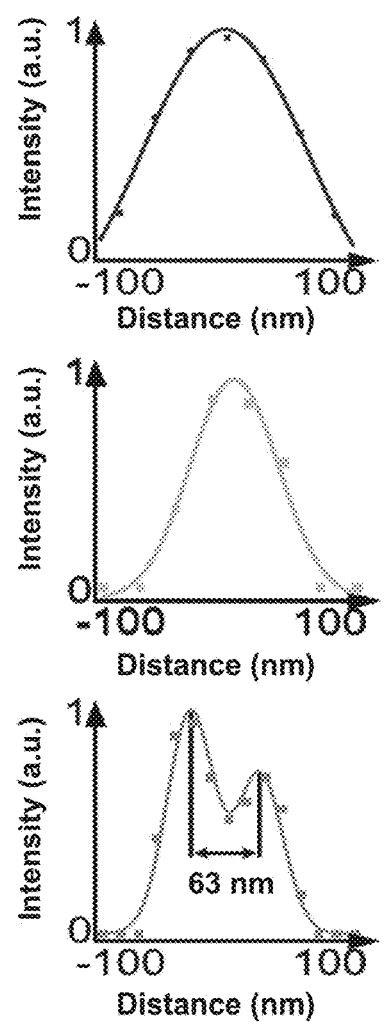
Figure 8M:
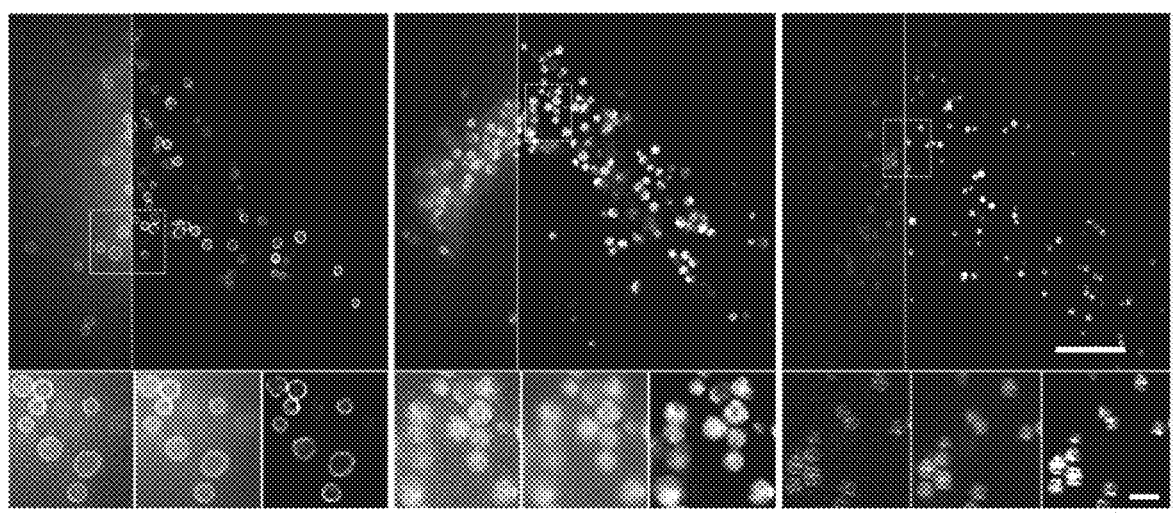
Figure 8N:
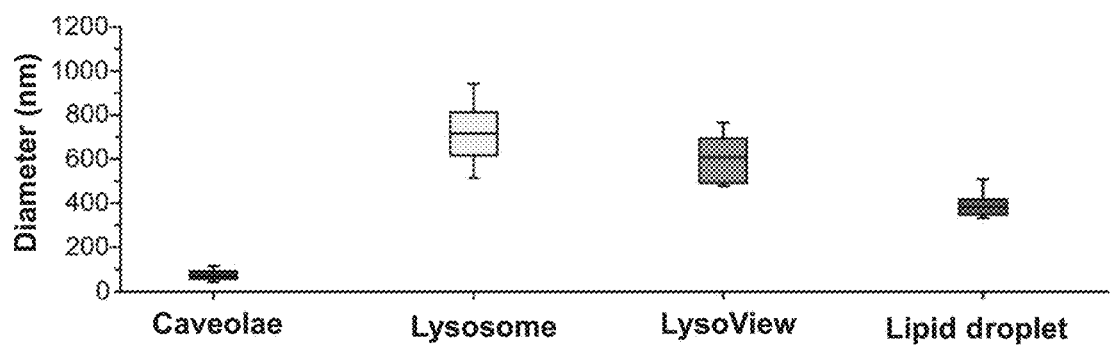
Figure 8O:
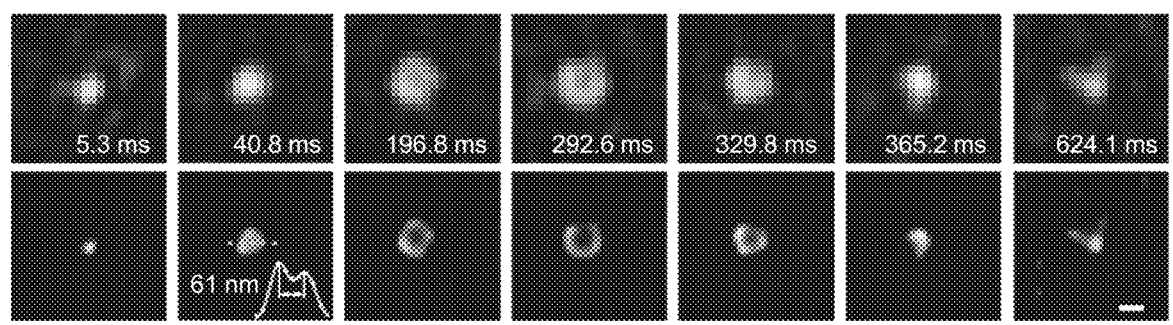
Figure 8P:
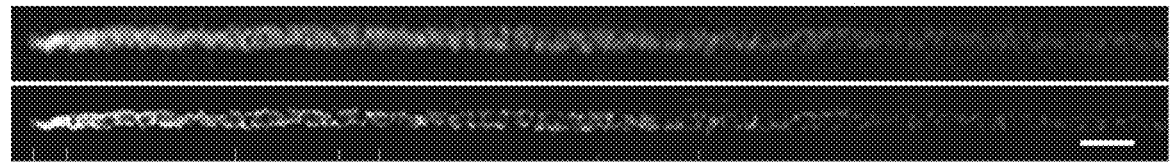
Figure 8Q:
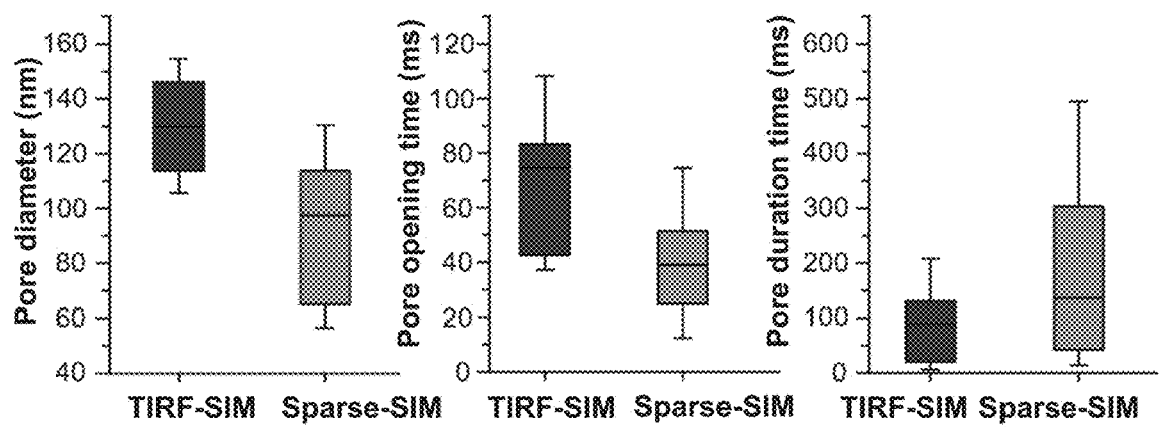

Less likely to be affected by chromatic aberration, Sparse SD-SIM may easily be adapted to four-color SR imaging, allowing the dynamics of lysosomes, mitochondria, microtubules, and nuclei to be monitored in live cells (as shown in FIGS. 8H and 8I) at FRC resolutions as small as 79~90 nm (as shown in FIG. 4J). Benefiting from the absence of out-of-focus fluorescence and the improved axial resolution, Sparse SD-SIM may allow similar structures to be seen at similar contrast levels throughout the cells, such as the mitochondrial outer membrane structures with FWHMs at substantially 280 nm axially (as shown in FIG. 8L) maintained in the live cell that is substantially 7 µm thick (as shown in FIG. 8K).

Figure 11A:
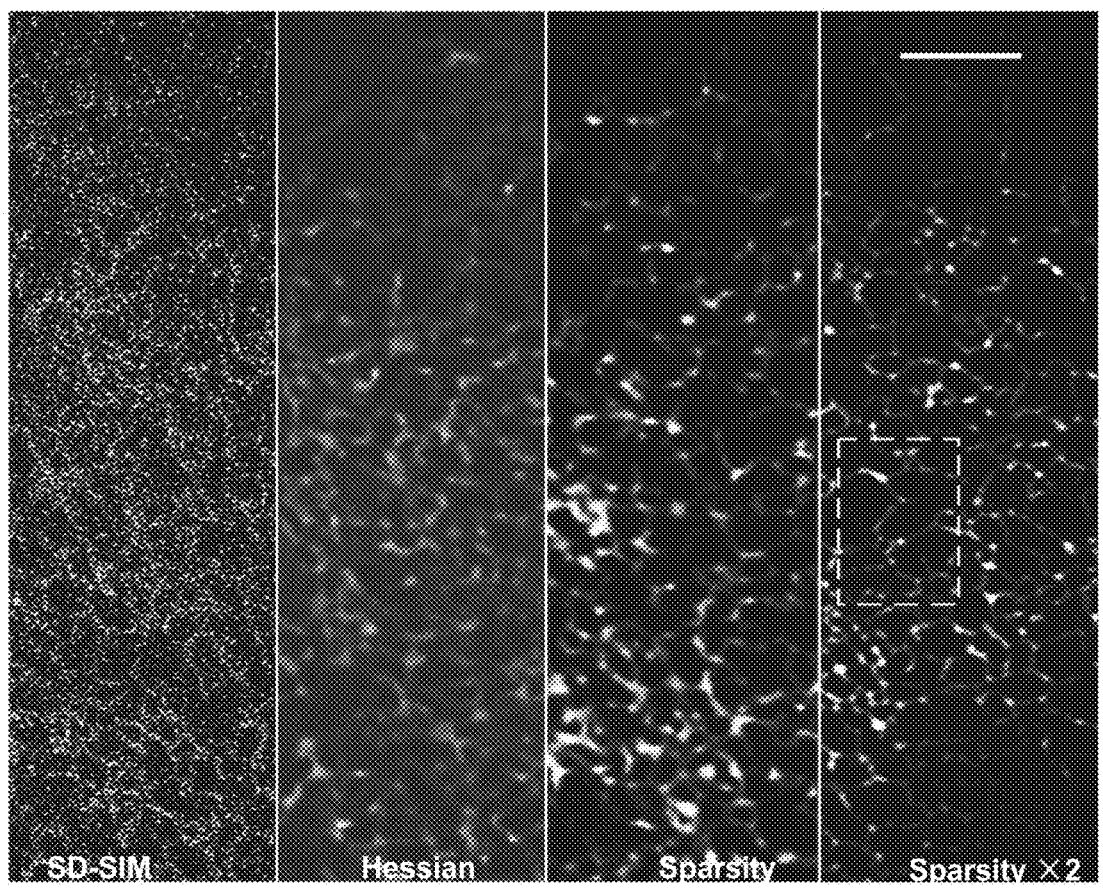
FIGS. 11A-11K illustrate exemplary results indicating that upsampling may enable Sparse SD-SIM to overcome the Nyquist sampling limit to accomplish multicolor 3D SR imaging in live cells according to some embodiments of the present disclosure.
Figure 11B:
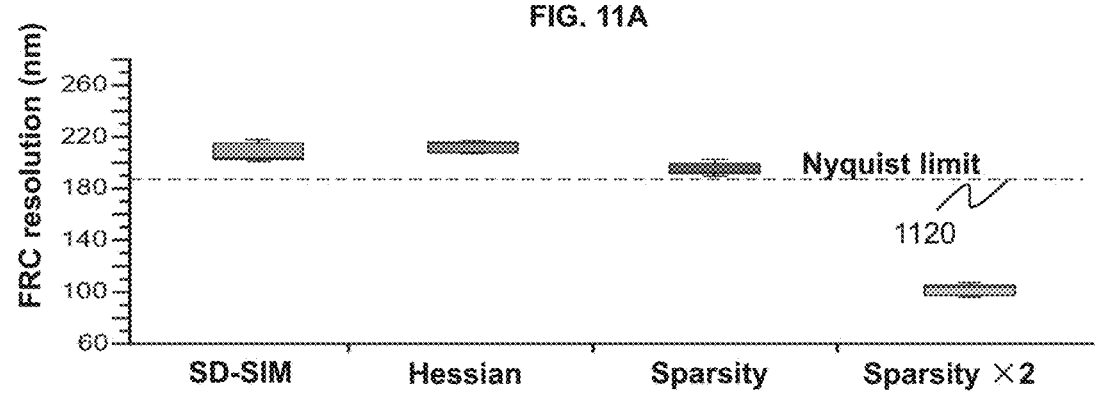

Example 5 Upsampling Helped Sparse Deconvolution Increase Resolution Under Insufficient Nyquist Sampling Regimes Equipped with superior quantum efficiency and electron multiplying capability, EMCCD cameras may be often used in SD-SIM systems, but may limit the system resolution due to their large pixel sizes. For example, when imaging ER tubules under the SD-SIM deconvolve with the sparse algorithm, FRC mapping analysis may yield a resolution of substantially 195 nm, mostly due to the Nyquist limit of the pixel size of substantially 94 nm (as shown in FIGS. 11A-11B). By artificially upsampling the data before deconvolution, previously blurred ring-shaped ER tubules may become distinguishable (as shown in FIG. 115C). The OTF of the microscope may be expanded after upsampling and deconvolution (as shown in FIG. 11D), which may agree with the resolution increase to substantially 102 nm according to the FRC measurements (as shown in FIG. 11B).

Upsampling before sparse deconvolution (Sparsity×2) may also be extended to multicolor Sparse SD-SIM imaging to follow the dynamics among different organelles. Using HeLa cells coexpressing LAMP1-mCherry, Pex11a-BFP, and Tubulin-EGFP, the structures and dynamics of lysosomes, peroxisomes, and microtubules (as shown in FIG. 6E) may follow. Many peroxisomes may encounter lysosomes on microtubules, demonstrated by a lysosome moving along the microtubules and colliding with two peroxisomes stably docked closely to the intersection of two tubulin filaments (as shown in FIG. 11F), or the co-migration of a lysosome and a peroxisome along a microtubule for some time before separation and departure (as shown in FIG. 11G). These contacts may mediate lipid and cholesterol transport, as reported previously.

Finally, it may show that the XZ resolution of SD-SIM may also increase by the Sparsity×2 procedure. In COS-7 cells labeled with Hoechst, MitoTracker Deep Red and Tubulin-EGFP, nuclei, mitochondria and microtubules in a three-dimensional volume spanning substantially 6 µm in the axial axis of a live cell (as shown in FIG. 11H) may be observed. Interestingly, the axial FWHM of a microtubule filament may decrease from substantially 465 nm in the raw dataset to substantially 228 nm after Sparsity×2 processing, again indicative of a twofold increase in the Z-axis (as shown in FIG. 11I). From the volumetric reconstruction, it may be apparent that the continuous, convex nuclear structure may bend inward and become concave at regions in some axial planes that were intruded by extensive microtubule filaments and mitochondria (as shown in FIG. 11J). Such reciprocal changes may suggest that the tubulin network may affect nucleus assembly and morphology. Overall, the combination of sparse deconvolution with SD-SIM enables multicolor, volumetric SR imaging with minimal phototoxicity and aberrations; these images may provide more dynamic insights into cellular processes.

FIG. 7 illustrates exemplary results indicating a flowchart of the sparse deconvolution algorithm according to some embodiments of the present disclosure. Raw images from 2D-SIM or SD-SIM microscopes may be Wiener inverse filtered to generate SR images, which may be background subtracted, upsampled, and reconstructed with the sparsity and the continuity priori information along the xy-t(z) axials before the final iterative deconvolution. Scale bar: 1 μm.

FIGS. 8A-8Q illustrate exemplary results indicating sparse-SIM may achieve substantially 60 nm and millisecond spatiotemporal resolution in live cells according to some embodiments of the present disclosure. FIG. 8A shows a representative COS-7 cell labeled with LifeAct-EGFP observed under 2D-SIM (bottom), Hessian-SIM (top) and Sparse-SIM (middle). FIG. 8B shows enlarged regions enclosed by box 810 in FIG. 8A (left: 2D-SIM; middle: Hessian-SIM; right: Sparse-SIM). FIG. 8C shows the corresponding profiles of lines 830-850 in FIG. 8B. FIG. 8D shows average contrasts of two peaks with different distances under 2D-SIM and Sparse-SIM. The contrast may be calculated following the equation (Imax−Imin)/(Imax+Imin). FIG. 8E shows FRC maps of actin filaments under 2D-SIM and Sparse-SIM. FIG. 8F shows resolutions of 2D-SIM and Sparse-SIM measured as the FWHMs of the narrowest actin filaments and by the FRC techniques. FIG. 8G shows time-dependent changes in minimal FRC resolutions of 2D-SIM images (black hollow circle), Hessian-SIM images (gray hollow circle), and Sparse-SIM images (gray hollow square) against the theoretical limit of 2D-SIM (black hollow triangle). FIG. 8H shows the magnified view of actin filaments in box 810 from FIG. 8A appears on the left, while the segmented filaments are overlaid with relatively thin lines on the right. FIG. 8I shows cumulative distributions of pore sizes within the actin meshes in FIG. 8H measured from 2D-SIM (black) and Sparse-SIM (gray) images. FIG. 8J shows representative example of a COS-7 cell labeled with caveolin-EGFP under TIRF-SIM (left, substantially 98 nm FRC mean resolution) and Sparse-SIM (right, substantially 58 nm FRC mean resolution). As shown in FIG. 8K, from top to bottom may be magnified views of the white box in FIG. 8J reconstructed by TIRF-SIM, Sparse-SIM (pixel size of 32 nm), and Sparse-SIM with 2×upsampling (pixel size of 16 nm). FIG. 8L shows fluorescence profiles of the lines 860-880 in FIG. 8K. In live COS-7 cells, as shown in FIG. 8M, cytosolic lysosomes may be labeled with LAMP1-EGFP (left, yellow) or LysoView (middle, cyan), while lipid droplets may be labeled with LipidSpot (right, magenta). Top: Comparison of the same structures observed under 2D-SIM (left) and Sparse-SIM (right). Bottom: Magnified views reconstructed by 2D-SIM (left), Hessian-SIM (middle), and Sparse-SIM (right). FIG. 8N shows average diameters of caveolin-EGFP-, LAMP1-EGFP-, LysoView- and LipidSpot-labeled structures detected by Sparse-SIM. FIG. 8O shows representative montages of vesicle fusion events observed under TIRF-SIM (top) and Sparse-SIM (bottom) configurations. The INS-1 cells may be labeled with VAMP2-pHluorin, and SR imaging may be conducted at a frame rate of 564 Hz. FIG. 8P shows kymographs from lines in the TIRF-SIM (upper) and Sparse-SIM (lower) images shown in FIG. 8O. FIG. 8Q shows average pore diameters (left), pore opening times (middle), and pore duration times (right) measured under the TIRF-SIM (red) and Sparse-SIM (cyan) configurations. Center line, medians; limits, 75% and 25%; whiskers, maximum and minimum; error bars, s.e.m.; Cumul. Freq., cumulative frequency; scale bars: (FIGS. 8A, 8E, and 8M top) 5 μm; (FIGS. 8B and 8J) 500 nm; (FIGS. 8H and 8M bottom) 1 μm; (FIGS. 8K and 8O) 100 nm; (FIG. 8P) 500 ms.

FIGS. 9A-9G illustrate exemplary results indicating intricate dynamics within the mitochondria and between ER-mitochondria visualized by dual-color Sparse-SIM according to some embodiments of the present disclosure. FIG. 9A shows a representative example of a COS-7 cell in which both the outer (magenta) and the inner (cyan) mitochondrial membrane (OMM and IMM) were labeled with Tom20-mScarlet and MitoTracker Green and observed under 2D-SIM (left) and Sparse-SIM (right). FIG. 9B shows magnified views of the IMM (left) and the OMM (right) from box 910 in FIG. 9A. FIG. 9C shows fluorescence intensity profiles of Tom20-mScarlet (magenta) and MitoTracker Green (cyan) along the continuous and dashed lines in FIG. 9B, which correspond to the two mitochondrial configurations shown in the right-hand schematic diagram (indicated by the black arrows). FIG. 9D shows average minimal resolutions of IMM (cyan) and OMM (magenta) in FIG. 9A observed under 2D-SIM and Sparse-SIM. Twenty images along the t-axis may be used for the FRC analysis. As shown in FIG. 9E, the white dashed box 920 in FIG. 9A may be enlarged and shown at three time points, revealing the nonhomogenous distribution of Tom20 (right) relative to MitoTracker Green (left). FIG. 9F shows a representative example of a COS-7 cell in which both the IMM (cyan) and ER (magenta) were labeled with MitoTracker Green and Sec61β-mCherry and observed under 2D-SIM (upper left) and Sparse-SIM (lower right). Contact sites of ER-mitochondria at mitochondrial cristae or matrix regions may be shown in the left lower inset. FIG. 9G shows magnified views from the white box 930 in FIG. 9F seen under Sparse-SIM, which showed the rearranged orientations (pointed by arrows 940-970) of inner cristae structures due to their dynamic contacts with the ER (shown at left), while regions of rearranged cristae from the white boxes are magnified (shown at right). Center line, medians; limits, 75% and 25%; whiskers, maximum and minimum; error bars, s.e.m; scale bars: (FIGS. 9A and F) 1 μm; (FIG. 9C) axial: 0.2 arbitrary units (a.u.); lateral: 100 nm; (FIGS. 9B, 9E and 9G) 500 nm.

FIGS. 10A-10L illustrate exemplary results indicating sparse SD-SIM enables three-dimensional, multicolor and sub-90-nm resolution for live cell SR imaging according to some embodiments of the present disclosure. FIG. 10A shows a representative snapshot (the third frame, 0.2 s exposure per frame) of a COS-7 cell expressing clathrin-EGFP observed under SD-SIM (left triangle) and Sparse SD-SIM (right triangle) with a sCOMS camera. FIG. 10B shows the fluorescence intensity profile corresponding to the resolved central ring of the CCP (upper left). FIG. 10C shows average minimal resolutions of CCPs observed under SD-SIM and Sparse SD-SIM as evaluated by the FRC technique.

Figure 10H:
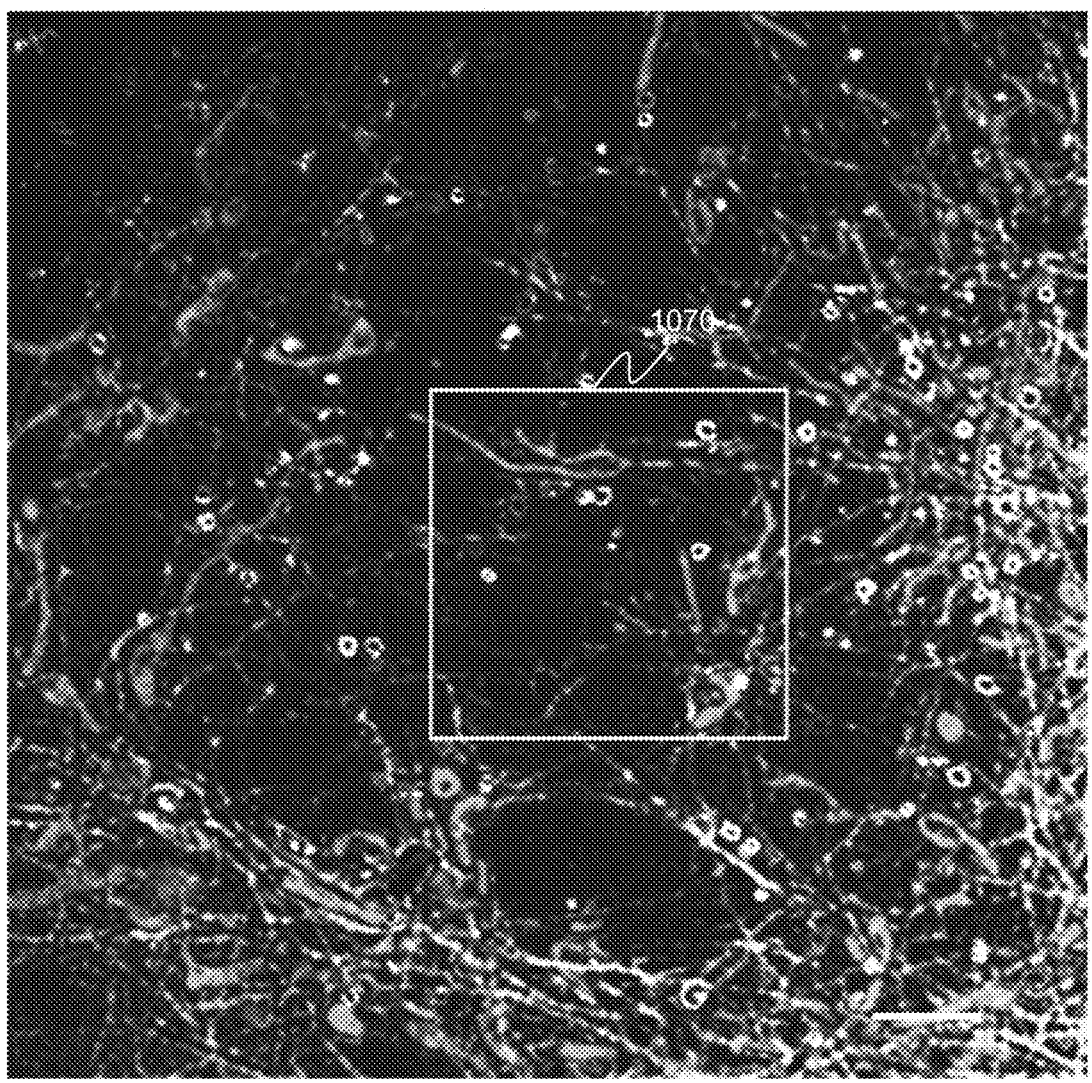
Figure 10I:
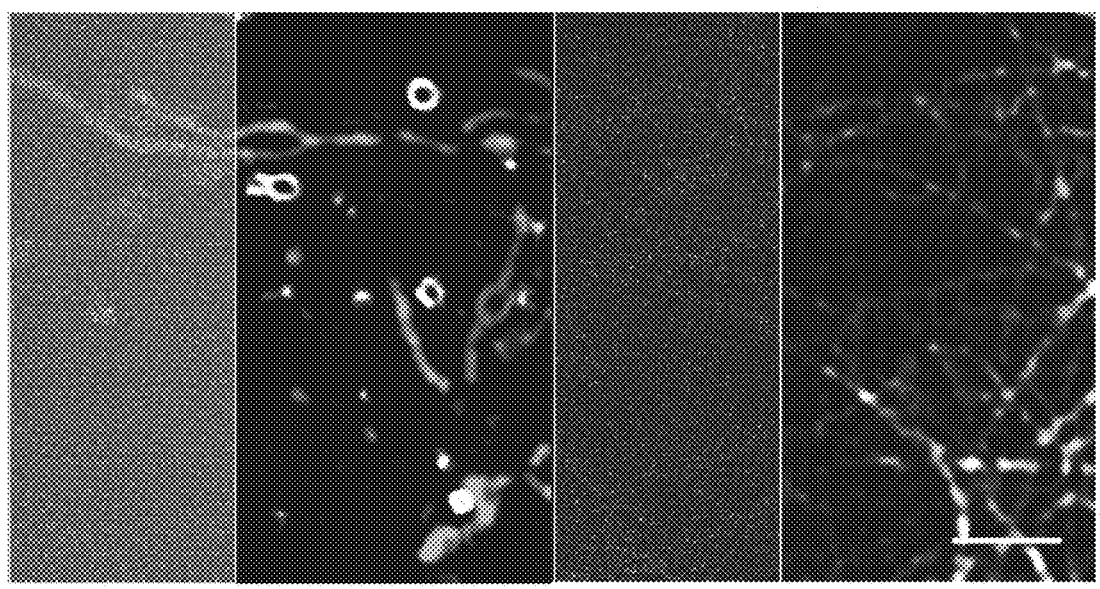
Figure 10J:
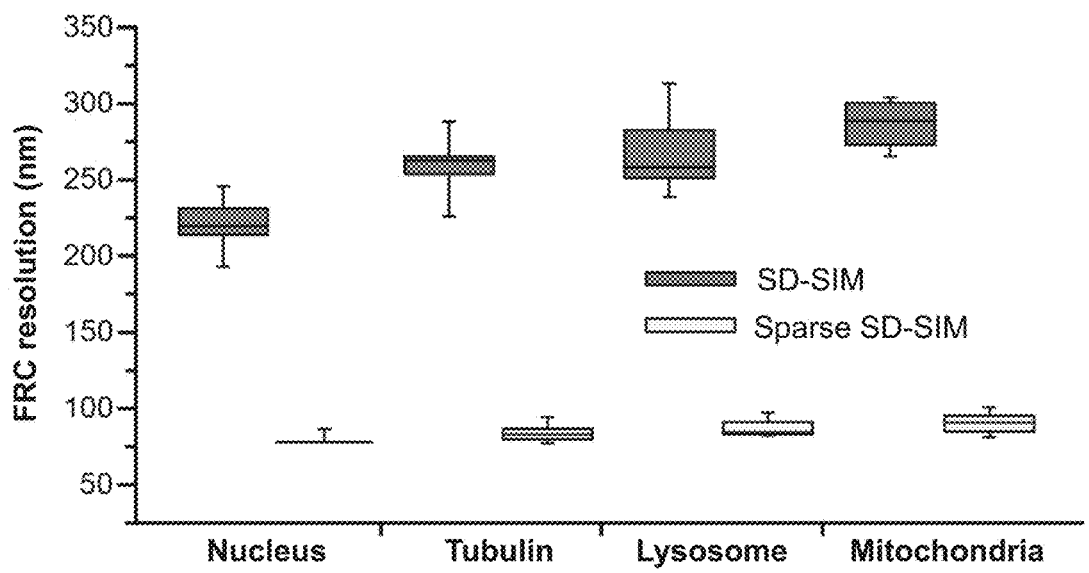
Figure 10K:
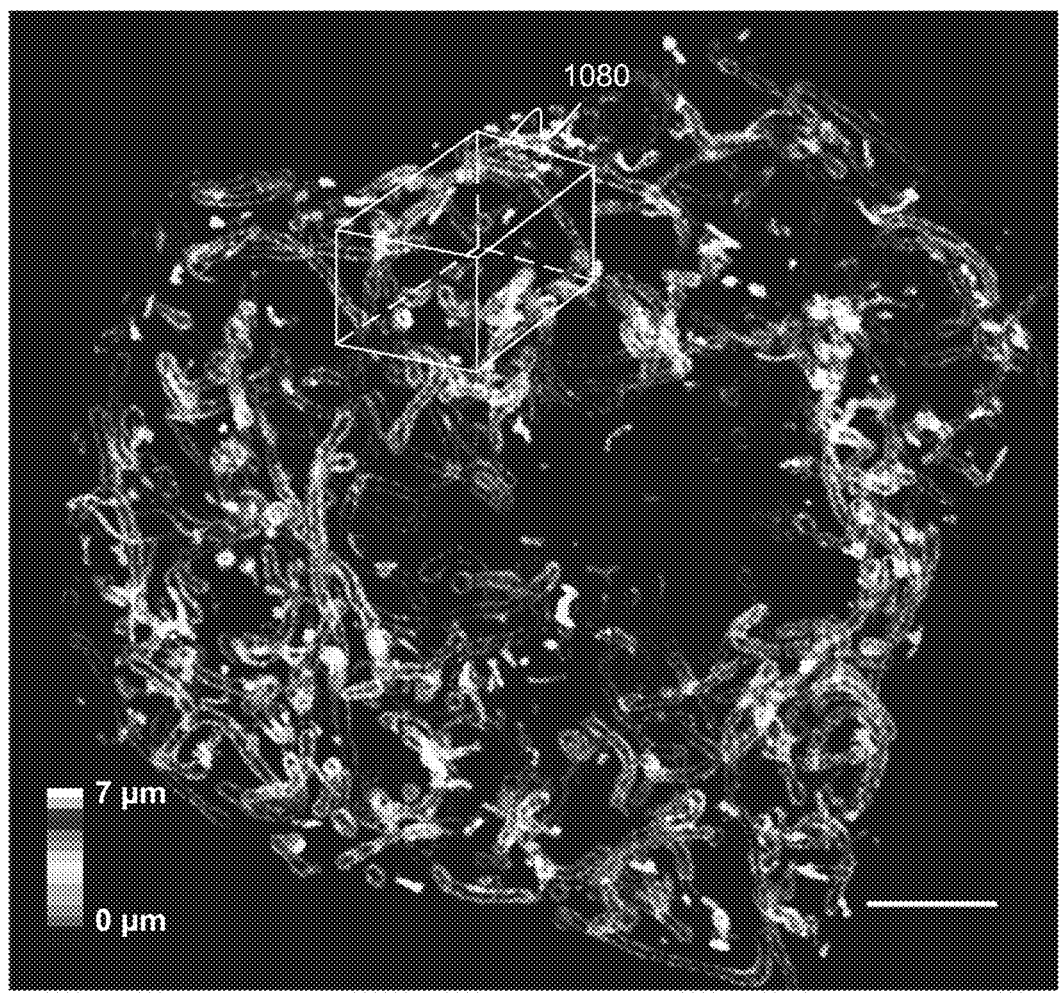
Figure 10L:
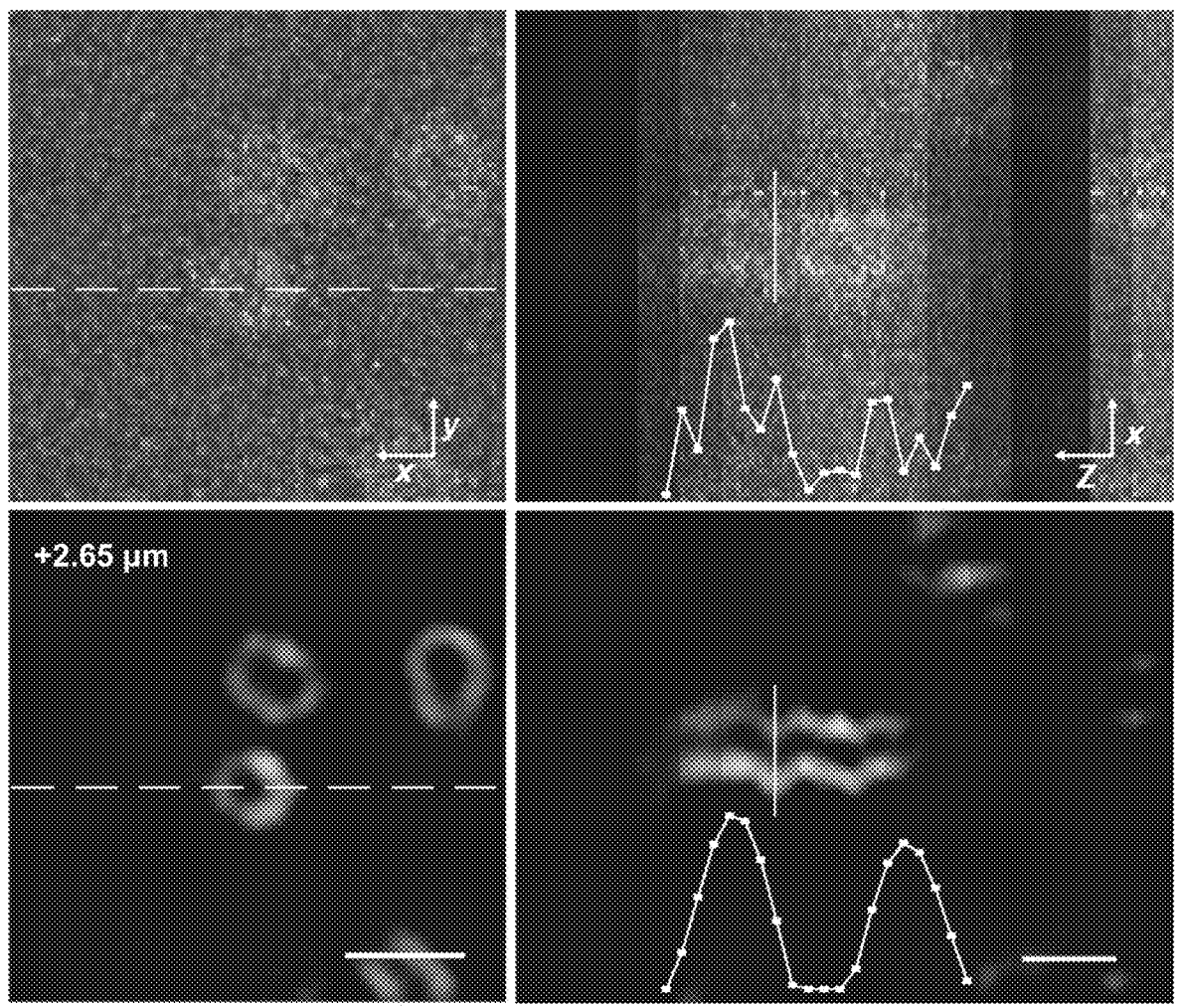

FIG. 10D shows histogram of the diameters of CCPs in live cells. FIG. 10E shows magnified view of the boxed region 1010 in FIG. 10A, which shows the sequential disappearance of a CCP (indicated by the yellow arrows 1030-1060). The top image may be a raw SD-SIM image; the rest may be Sparse-SD-SIM images. FIG. 10F shows magnified view of the boxed region 1020 in FIG. 10A, which shows the disintegration of the CCP into two CCPs. FIG. 10G shows temporal projections of the colors of CCPs during live cell SR imaging for 16.75 minutes. FIG. 10H shows a representative example of four-color, live cell SR imaging by Sparse SD-SIM. The COS-7 cells may be simultaneously labeled with LAMP1-mCherry (yellow), MitoTracker (green), Hoechst (blue), and Tubulin-EGFP (magenta). As shown in FIG. 10I, the magnified view of the boxed region 1070 in FIG. 10H may be separated into two images highlighting mitochondria and lysosomes (left) and nucleus and tubulin (right). Views under the SD-SIM and the Sparse SD-SIM may be shown at the left and right of each image, respectively. FIG. 10J shows average resolutions of organelles labeled with different colors observed under SD-SIM and Sparse SD-SIM and evaluated with the FRC technique. FIG. 10K shows three-dimensional distributions of all mitochondria (labeled with TOM20-mCherry) within a volume of 7 μm in the axial axis of a live COS-7 cell observed with Sparse SD-SIM. Different colors may be used to code the different distances of the plane imaged from the cell surface. FIG. 10L shows color-coded horizontal (left) and vertical sections (right) from the boxed region 1080 in FIG. 10K, in which images obtained with SD-SIM and Sparse SD-SIM may be shown at the top and bottom, respectively. Center line, medians; limits, 75% and 25%; whiskers, maximum and minimum; error bars, s.e.m; scale bars: (FIGS. 10A and 10I) 3 μm; (FIGS. 10E and 10F) 300 nm; (FIGS. 10G and 10L) 1 μm; (FIGS. 10H and 10K) 5 μm.

Figure 11C:
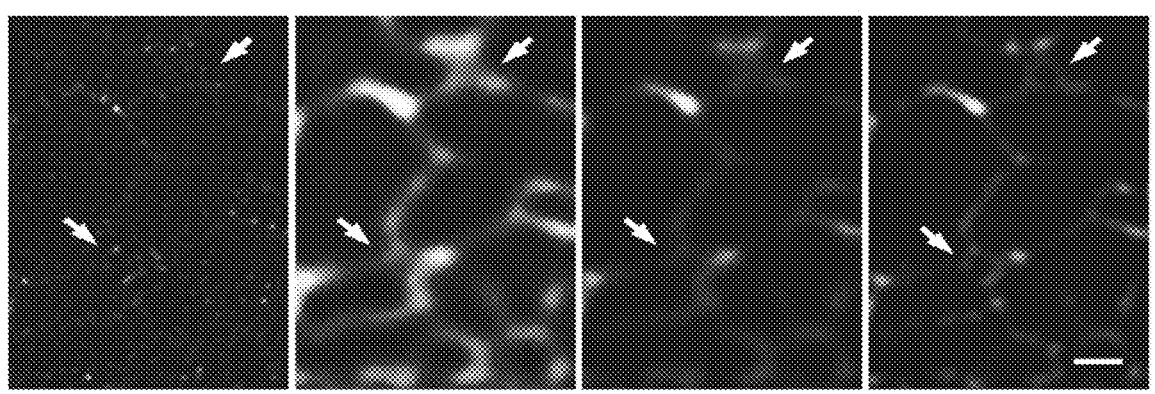
Figure 11D:
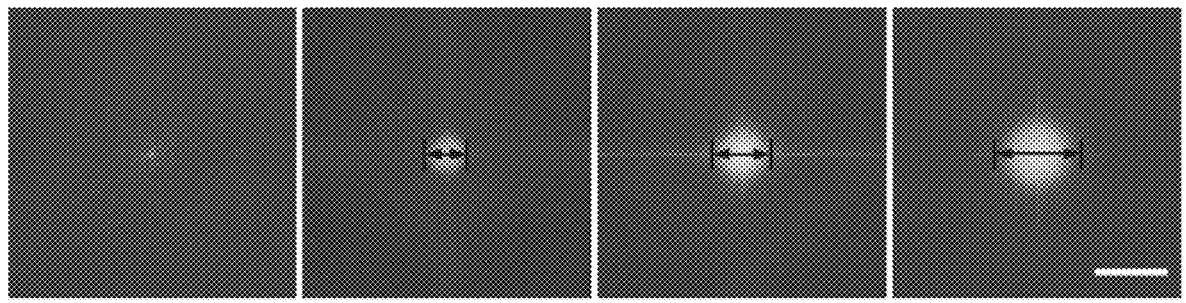
Figure 11E:
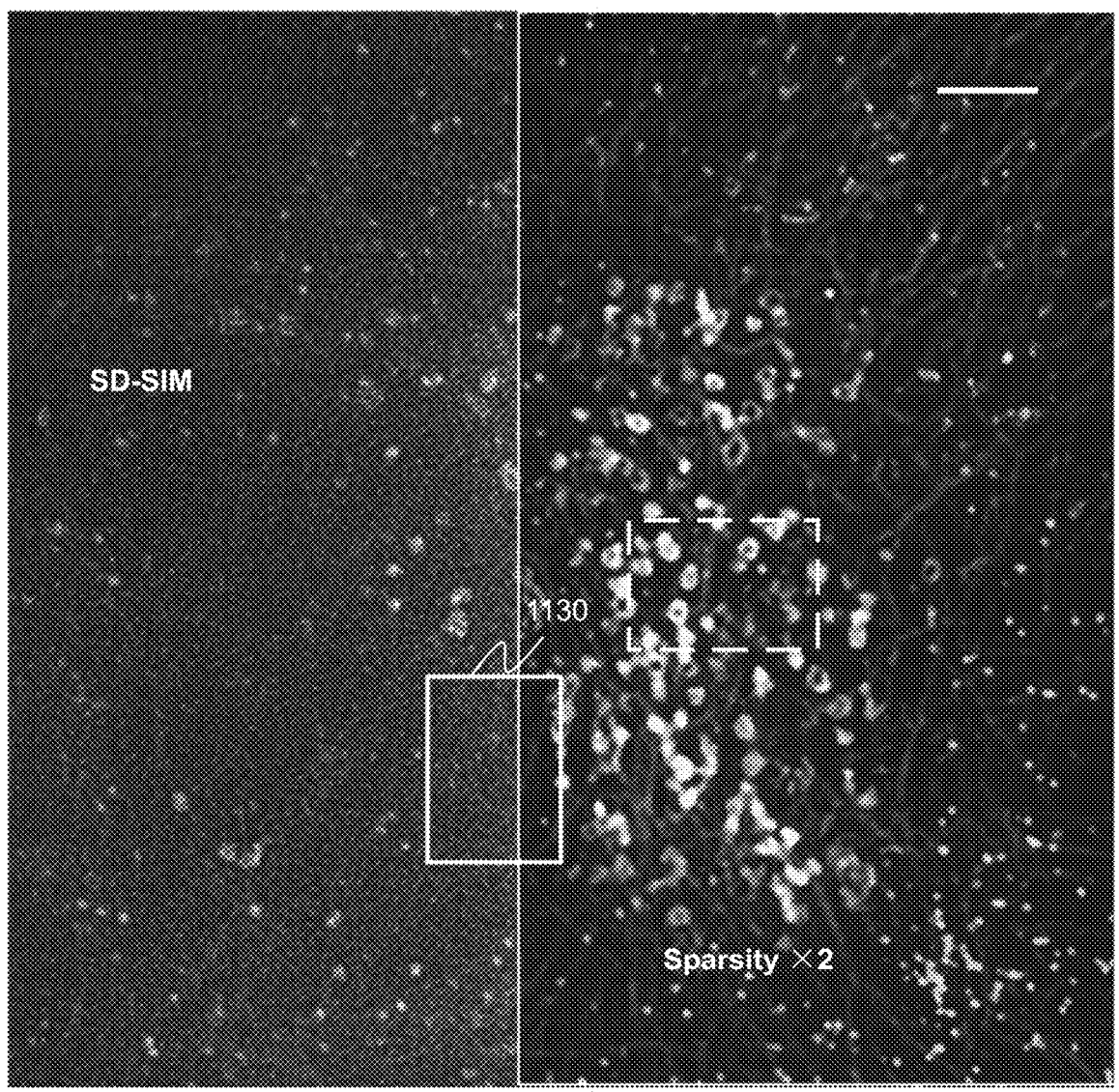
Figure 11F:
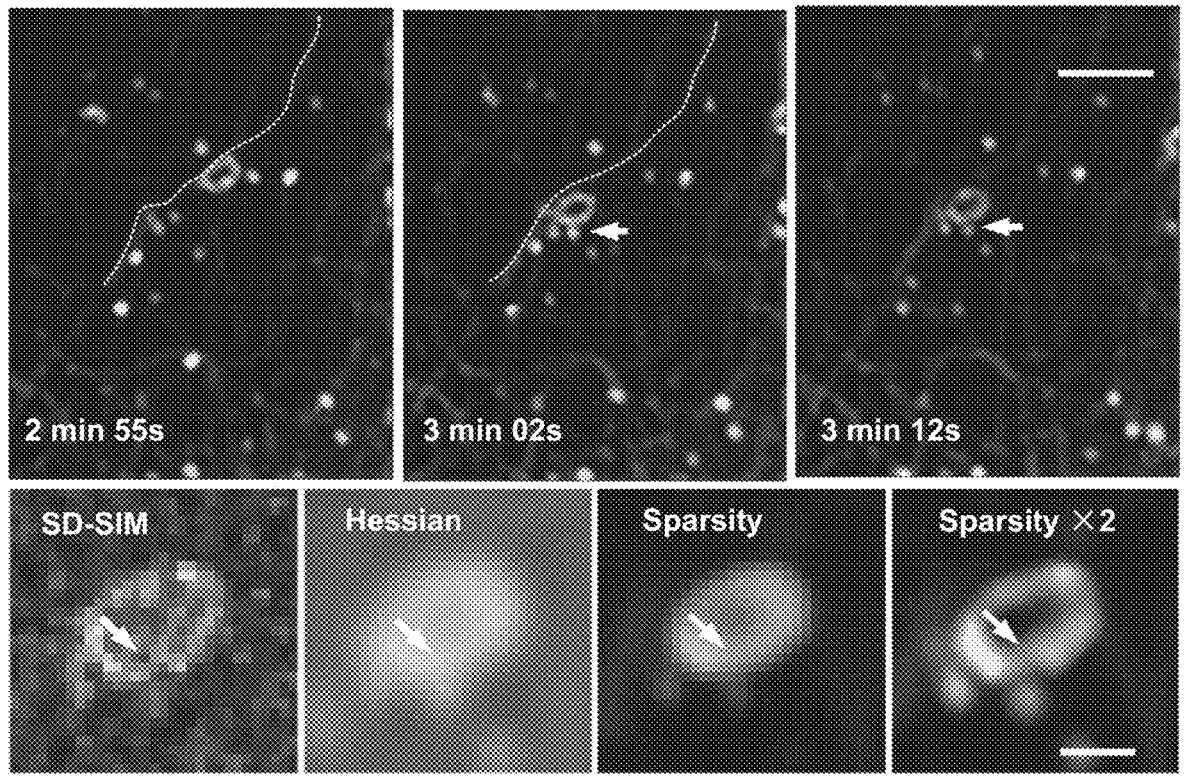
Figure 11G:
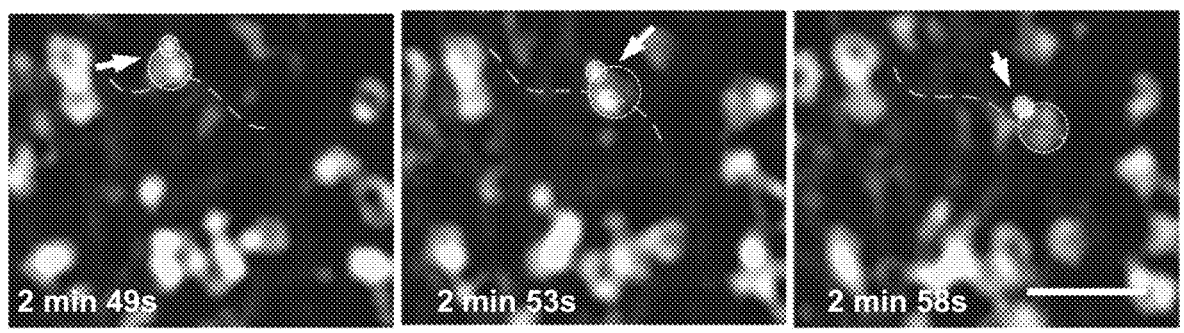
Figure 11H:
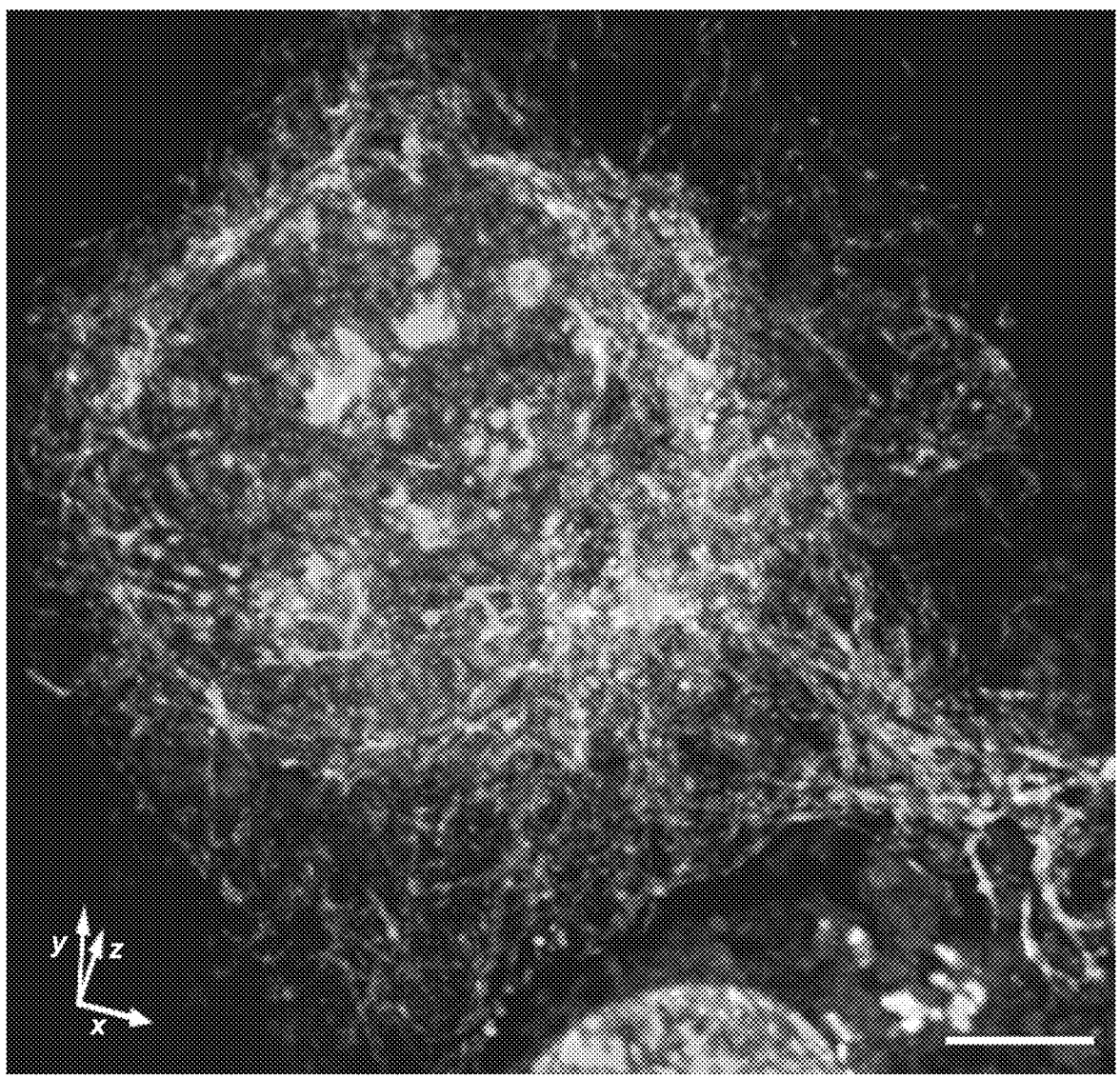
Figure 11I:
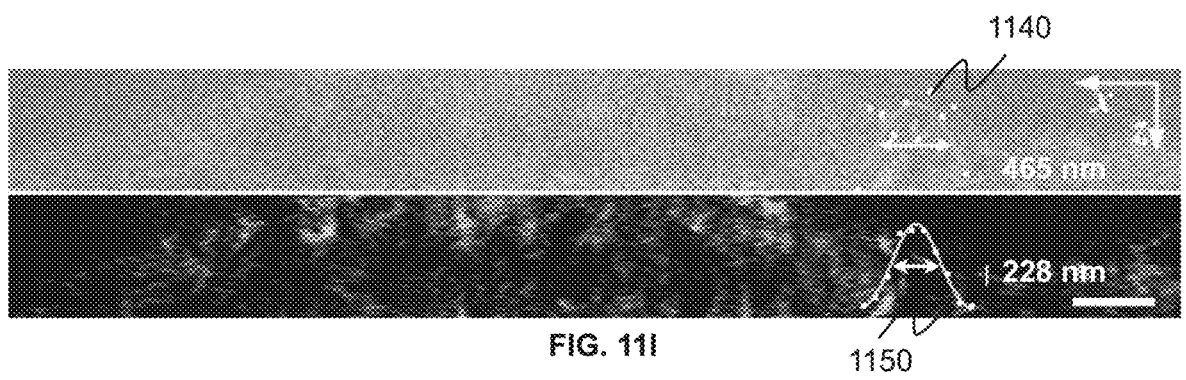
Figure 11J:
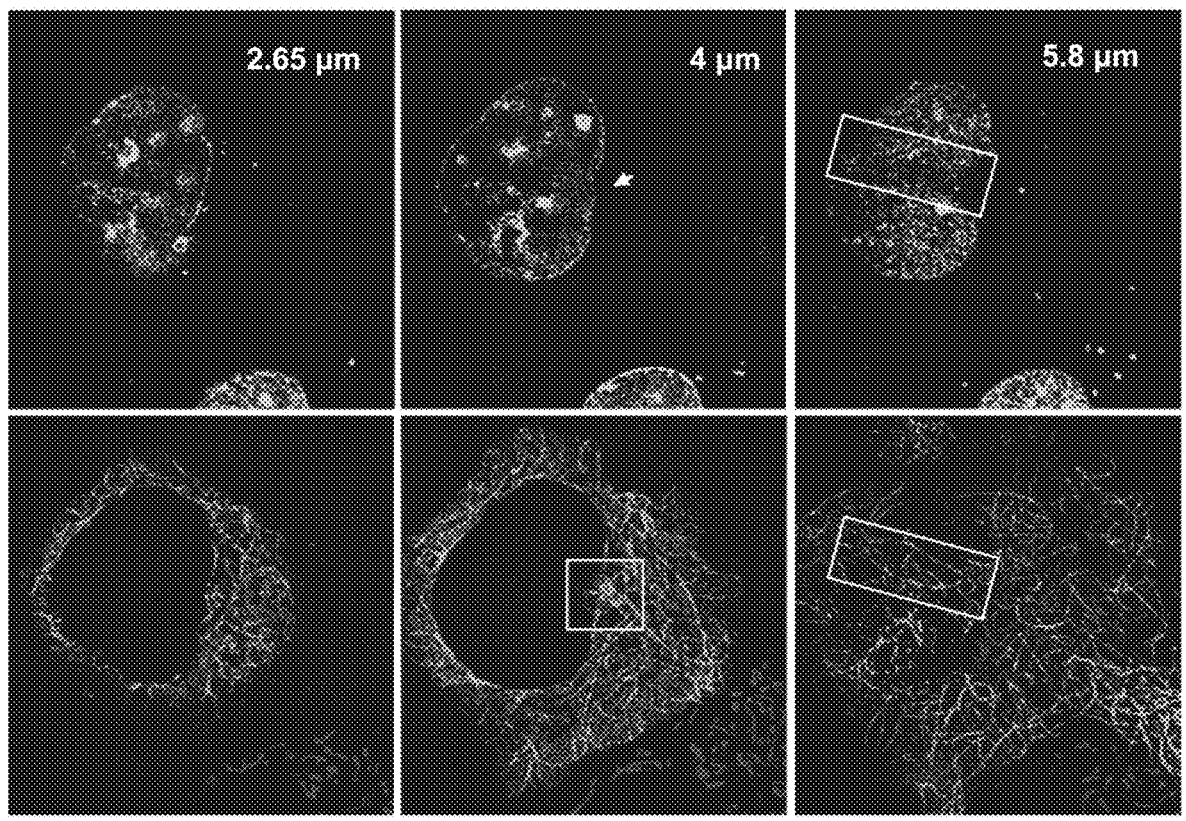
Figure 11K:
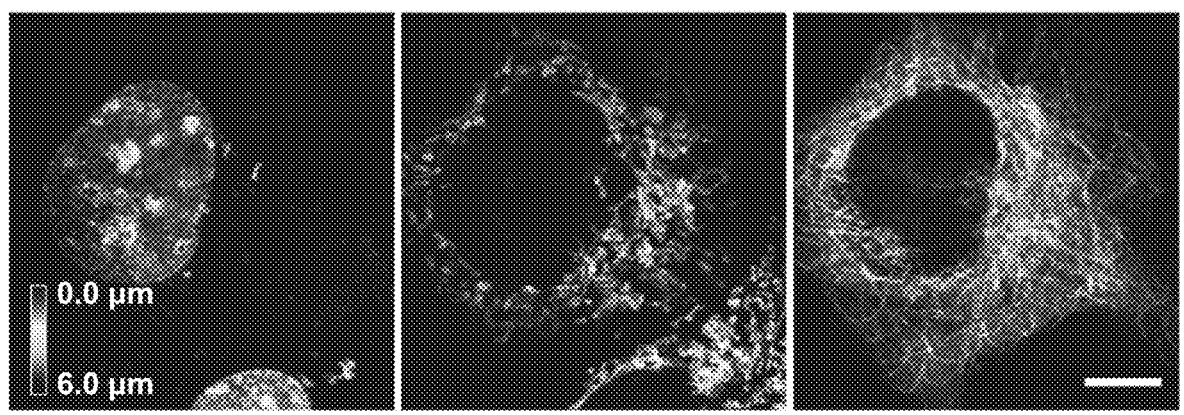

FIGS. 11A-11K illustrate exemplary results indicating that upsampling may enable Sparse SD-SIM to overcome the Nyquist sampling limit to accomplish multicolor 3D SR imaging in live cells according to some embodiments of the present disclosure. FIG. 11A shows (from left to right) ER tubules in the periphery of a COS-7 cell (labeled with Sec61β-EGFP) seen under the SD-SIM, Hessian SD-SIM, Sparse SD-SIM, and Sparse SD-SIM×2 configurations. The SD-SIM system may be equipped with an EMCCD camera, whereas the physical pixel size in each SR image may be substantially 94 nm. FIG. 11B shows average minimal resolutions of images obtained under different configurations from FIG. 11A evaluated by the FRC technique. The theoretical resolution limit according to the Nyquist criteria may be plotted as the dashed line 1120. FIG. 11C shows magnified views of ER tubules from FIG. 11A and observed under different configurations (from left to right). The ER tubular structures indicated by arrows may be resolved only under the Sparse SD-SIM×2 configuration (the right inset). FIG. 11D shows Fourier transform of images obtained under the SD-SIM (left), the Hessian SD-SIM (middle left), the Sparse SD-SIM (middle right), and the Sparse SD-SIM×2 (right) configurations. FIG. 11E shows a snapshot of a HeLa cell labeled with tubulin-EGFP (magenta), Pex11a-BFP (cyan) and Lamp1-mCherry (yellow) observed under the SD-SIM (left) and the Sparse SD-SIM×2 (right) configurations. FIG. 11F shows magnified views of the solid boxed region 1130 in FIG. 11E, in which montages at different times (upper) show a lysosome moving along the microtubule to contact two peroxisomes. The contact between the lysosome and the peroxisomes may be further magnified and be shown at the bottom. FIG. 11G shows time-lapse images of another example of the co-movement of both a lysosome and a peroxisome along a microtubule under the Sparse SD-SIM×2 configuration. The dashed lines may indicate the microtubules. FIG. 11H shows live-cell three-color 3D imaging by the Sparse SD-SIM×2 approach. COS-7 cells may be labeled with Tubulin-EGFP (green), Hoechst (cyan), and MitoTracker Deep Red (magenta). FIG. 11I shows the z-axial view from FIG. 11H recorded with SD-SIM (top) and Sparse SD-SIM×2 (bottom). The fluorescent profiles of lines 1140 (SD-SIM) and 1150 (Sparse SD-SIM×2) may across the microtubule filament in the z-axis, which may be fitted with a Gaussian fitting, yielded FWHM resolutions of substantially 465 nm and substantially 228 nm for SD-SIM and Sparse SD-SIM×2, respectively. FIG. 11J shows three horizontal sections of the cellular nucleus (top) and mitochondria merged with microtubules (bottom), in which the inward and concave regions of the nucleus may be intruded by extensive microtubule filaments along with mitochondria. FIG. 11K shows volumes of nuclei, mitochondria, and microtubules from left to right. The different imaging plane depths may be coded in different colors. Scale bars: (FIGS. 11A, 11D, 11E, 11H, 11I, 11J, and 11K) 5 μm; (FIGS. 11B and 11F top, and 11G) 3 μm; (FIG. 11C) 1 μm; (FIG. 11F bottom) 500 nm.

FIG. 12 illustrates exemplary results indicating the detailed workflow of the sparse deconvolution according to some embodiments of the present disclosure. I-II, III-IV, and V-VI may be captured by 2D-SIM using the sCMOS camera, SD-SIM using the sCMOS camera, and SD-SIM using the EMCCD camera, respectively. Then, the SR images may be reconstructed using inverse Wiener filtering. Thereafter, overall similar but slightly different strategies may be used to process these different types of datasets.

FIGS. 13A-13D illustrate exemplary results indicating benchmark of spatial resolution at different steps of sparse deconvolution according to the synthetic images according to some embodiments of the present disclosure. FIG. 13A shows the resolution plate with a pixel size of 16.25 nm, which may contain five pairs of lines at distances of 48.75 nm, 65.00 nm, 81.25 nm, 97.50 nm, and 113.75 nm. The synthetic image (512×512 pixels) may be first illuminated by pattern excitation and then convoluted with a microscope PSF of (1.4 NA, 488 nm excitation). The signal may be recorded with an sCMOS camera with a pixel size of 65 nm, which may mean 4×downsampling of the original image (128×128 pixels). Gaussian noise with a variance of 5% of the peak intensity of the line may be also included to the raw image. Then, (from left to right) inverse Wiener filtering may be used to obtain a conventional SIM image (256×256 pixels), followed by the reconstruction constrained by continuity and sparsity priori information and final deconvolution. The theoretical limit resolution of Wiener SIM may be calculated to be 97.6 nm by following the equation $\lambda/2$ $(NA_i+NA_d)$, in which i and d respectively represent the illumination and detection NA. FIG. 13B shows the corresponding intensities across different pairs of lines in FIG. 13A here. Two lines separated by 65 nm may be resolved only when the raw image underwent the full sparse deconvolution pipeline. As shown in FIG. 13C, the SIM image obtained after Wiener inverse filtering to 512×512 pixels may also be upsampled and processed it with other steps in the sparse deconvolution pipeline thereafter. FIG. 13D shows the corresponding intensities across different pairs of lines in FIG. 13C here. Note that two lines 48.75 nm apart may be separated by sparse deconvolution in the upsampled image. Scale bars: 1 μm.

Figure 14A:
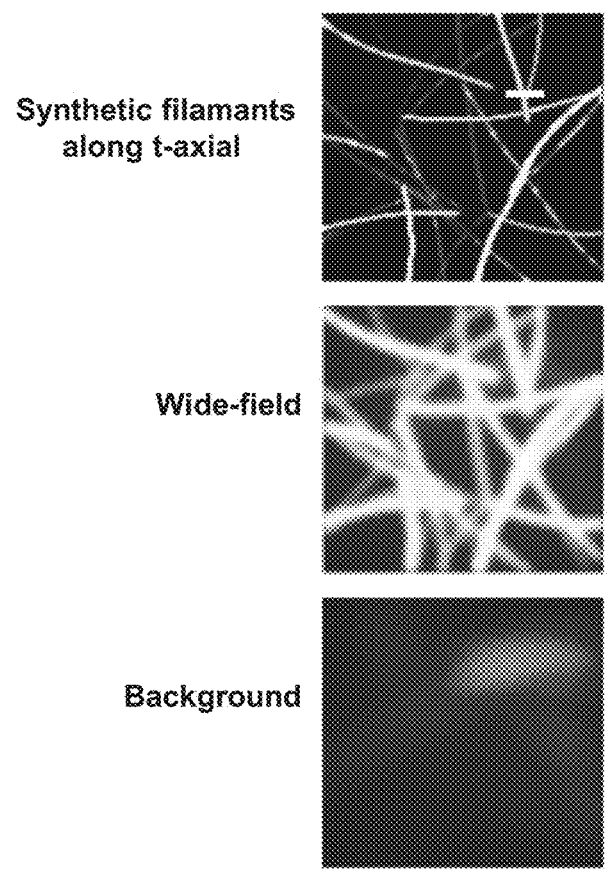
FIGS. 14A-14D illustrate exemplary results indicating that contributions of different steps in sparse deconvolution of synthetic images may corrupt with different noise extents according to some embodiments of the present disclosure.
Figure 14B:
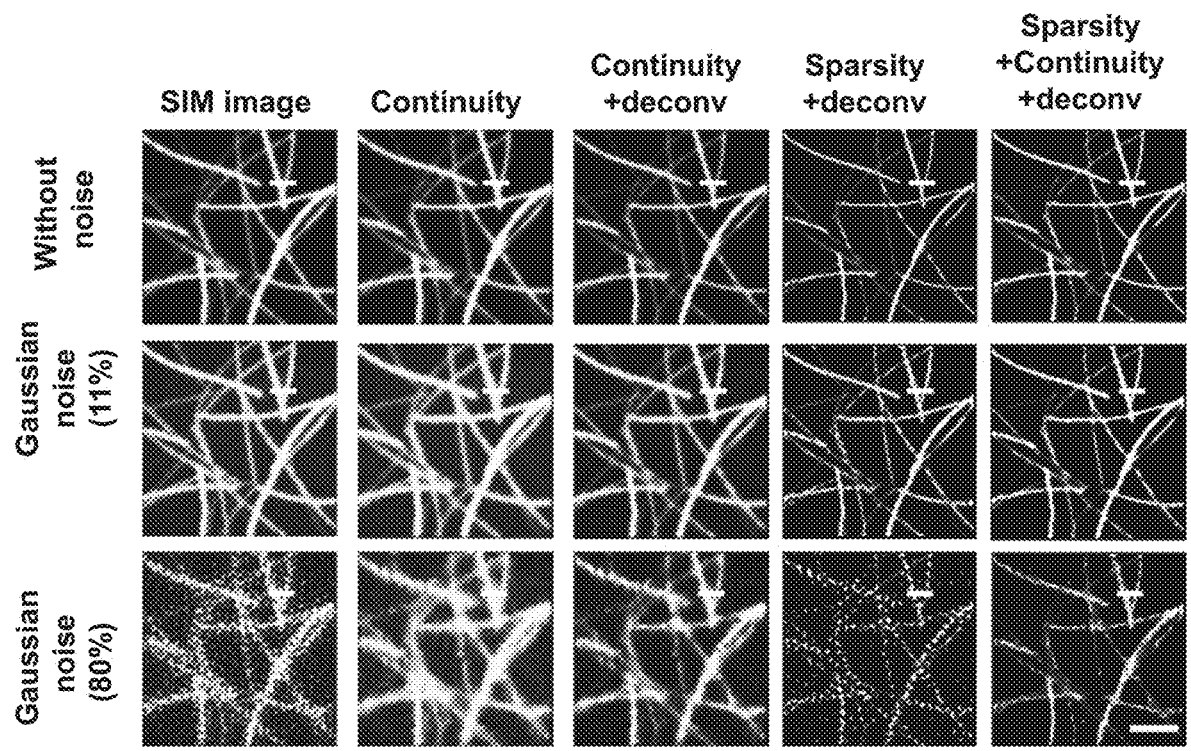
Figure 14C:
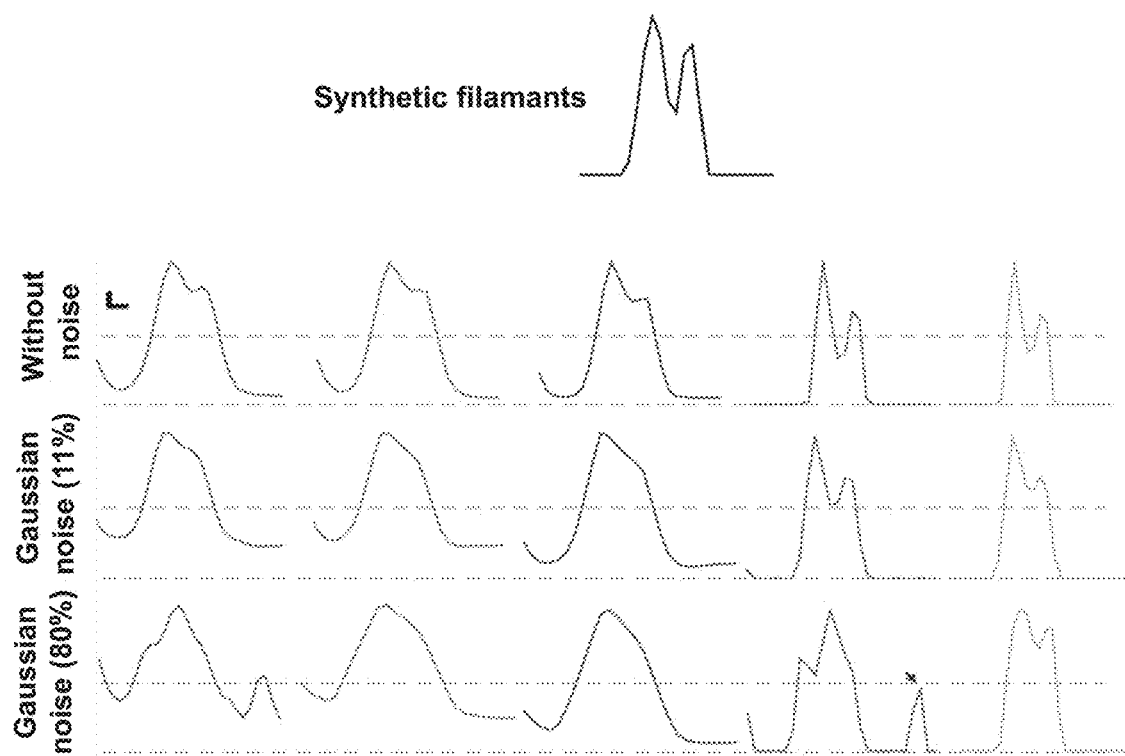
Figure 14D:
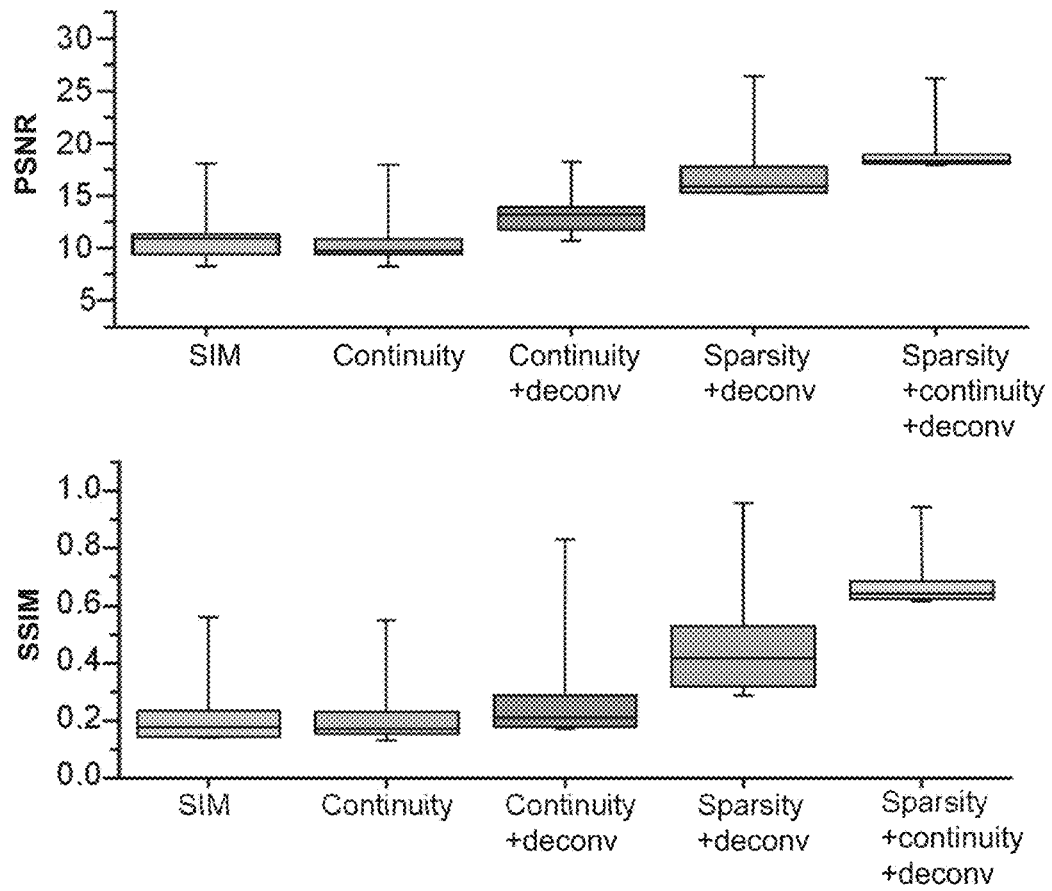

FIGS. 14A-14D illustrate exemplary results indicating that contributions of different steps in sparse deconvolution of synthetic images may corrupt with different noise extents according to some embodiments of the present disclosure. As shown in FIG. 14A, synthetic filament structures may be created using the Random Walk process and adopt the maximal curvatures in the program, generating the filament structures. To simulate time-lapse sequences of filament structures, a subpixel shift operation may be used to generate a random shift in these filaments based on the Markov chain in the t-axis, resulting in an image stack of 128×128×5 pixels. To mimic SIM acquisition, these ground truth objects may be illuminated by pattern excitation and convolute with a microscope PSF of (1.4 NA, 488 nm excitation, 32.5 nm pixel) to generate wide-field raw images. In addition to the filaments, a background signal that combines the effects of cellular autofluorescence and fluorescence emitted from the out-of-focus plane (simulated by the convolution of synthetic filaments with out-of-focus PSF 1 μm away from the focal plane) may also be included. Moreover, Gaussian noise with different variance extents (0%, 11%, 25%, 50%, 80%) may be incorporated to the peak fluorescence intensity of the filaments. The raw images may be acquired by an sCMOS camera with a pixel size of 65 nm and pixel amplitudes of 16 bits. FIG. 14B shows performance comparisons among five different types of SR reconstructions at 0% 11% and 80% noise levels (from top to bottom). Specifically, the raw images may be reconstructed with inverse Wiener filtering (column 1), followed by continuity-constraint reconstruction only (column 2), continuity-constraint reconstruction and deconvolution (column 3), sparsity-constraint reconstruction only and deconvolution (column 4), or sparsity-plus-continuity-constraint reconstruction and deconvolution (column 5). FIG. 14C shows the fluorescence intensity profiles along the two opposing synthetic filaments in FIG. 14B under different conditions. While the continuity reconstruction followed by the deconvolution may not separate these filaments, the sparsity reconstruction followed by the deconvolution may cause artifacts (an example indicated by the asterisk) in raw images with 80% noise. As shown in FIG. 14D, compared to the synthetic ground truth, the average peak signal-to-noise ratio (PSNR) and structural similarity (SSIM) values of SR images reconstructed with different techniques from raw images may corrupt with different levels of noise (0%, 11%, 25%, 50%, 80%). More details may be given in Tables S1 and S2. Scale bars: 1 μm in FIG. 14A; axial: 0.1 arbitrary units (a.u.) in FIG. 14C; lateral: 100 nm.

Figure 15A:
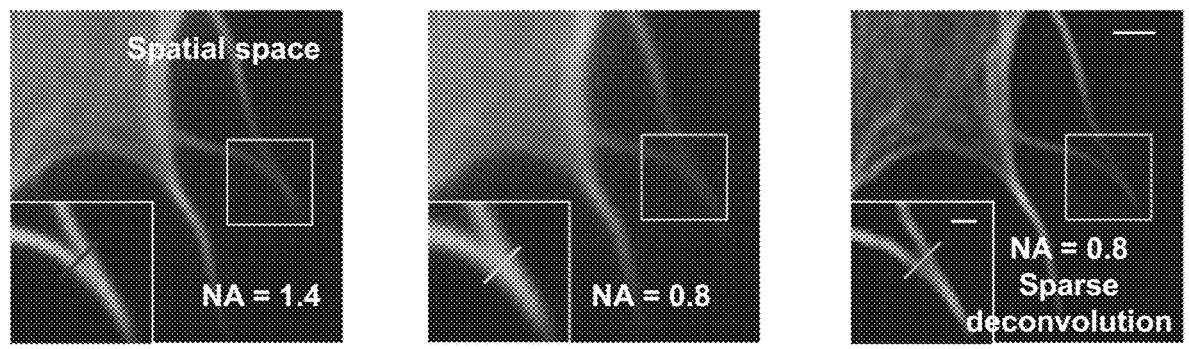
FIGS. 15A-15F illustrate exemplary results indicating bona fide extension of spatial resolution by the sparse deconvolution algorithm when processing real biological structures according to some embodiments of the present disclosure.
Figure 15B:
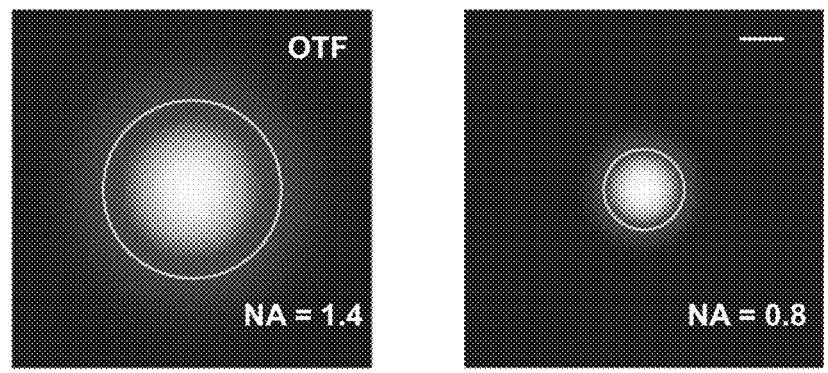
Figure 15C:
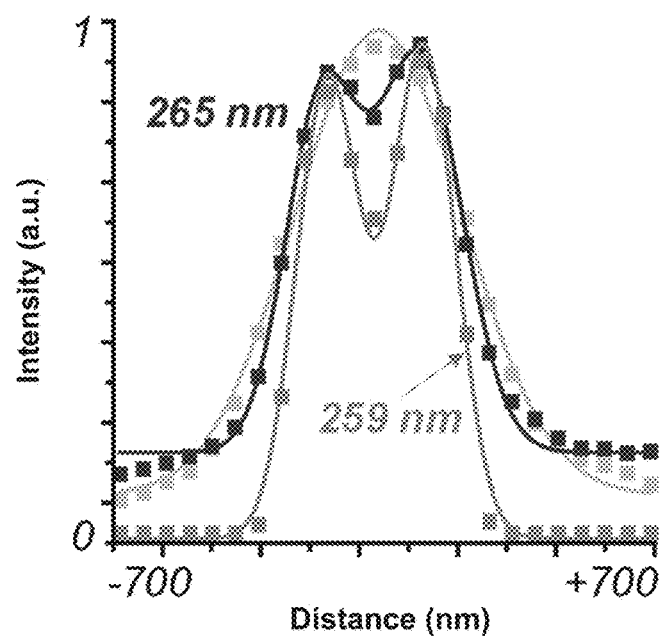
Figure 15D:
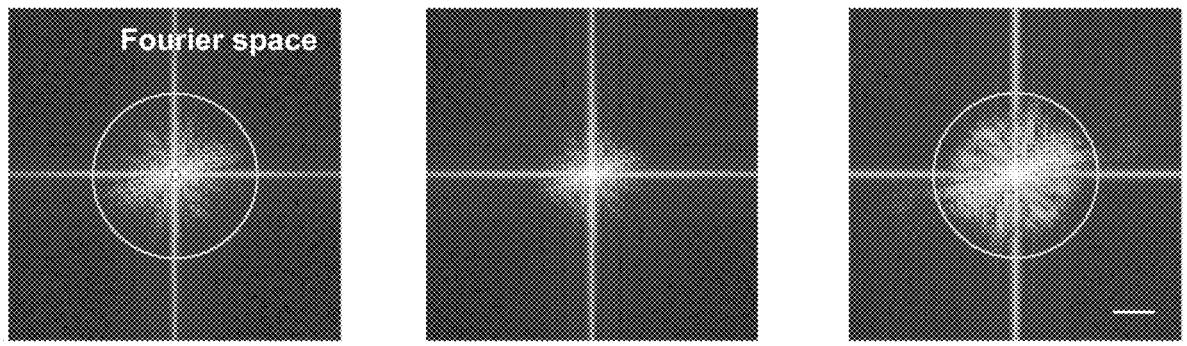
Figure 15E:
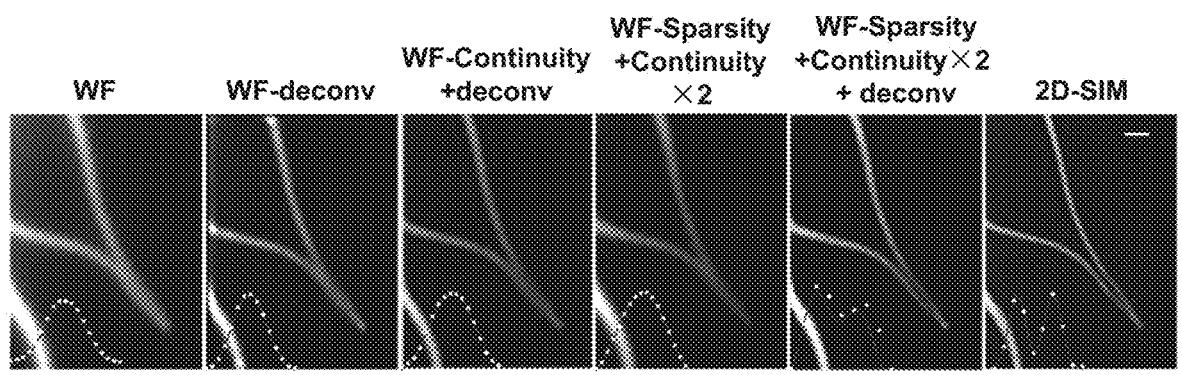
Figure 15F:
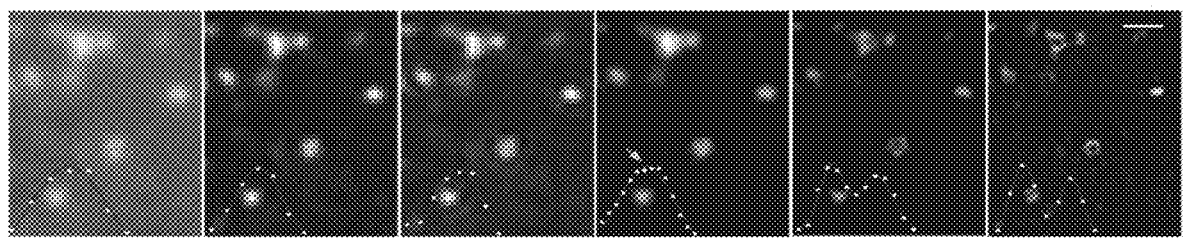

FIGS. 15A-15F illustrate exemplary results indicating bona fide extension of spatial resolution by the sparse deconvolution algorithm when processing real biological structures according to some embodiments of the present disclosure. FIGS. 15A-15D show comparison between wide-field high NA (1.4) and low NA (0.8) imaging after the sparse deconvolution process in both the spatial and Fourier spaces. As shown in FIG. 15A, from left to right may be the high NA (1.4) image, the simulated low NA (0.8) image, and the low NA (0.8) image after sparse deconvolution (same data as in FIG. 8A). Here, the low NA image may be generated using the formula iFFT{FFT($IMG_{1.4}$)×($OTF_{0.8}$/$OTF_{1.4}$)}. In the formula, the FFT (iFFT) denotes the (inverse) fast Fourier transform, and $IMG_{1.4}$ represents the high NA image. FIG. 15B shows the optical transform functions of NA=1.4 ($OTF_{1.4}$) and NA=0.8 ($OTF_{0.8}$). FIG. 15C shows the corresponding Gaussian-fitted cross sections of the insets in FIG. 15A. It may be clear that the two peaks with a distance of 259 nm may be resolved under the low NA after sparse deconvolution, which is similar to 265 nm in the original high NA image. This may indicate that sparse deconvolution may achieve high NA resolution with better contrast. As shown in FIG. 15D, corresponding Fourier space images may be presented from left to right. As shown in FIGS. 15E and 15F, a bona fide increase in spatial resolution may occur by the Sparse deconvolution of wide-field (WF) images according to the SIM images used as the ground truth. Live COS-7 cells overexpressing LifeAct-EGFP (FIG. 15E) or Clathrin-EGFP (FIG. 15F) may be used and be imaged with 2D-SIM, and TIRF-SIM respectively. From the raw dataset, regular deconvolution, continuity reconstruction followed by deconvolution, upsampling plus sparsity and continuity reconstruction, or upsampling plus sparsity and continuity reconstruction followed by deconvolution may be used. Clearly, only the full sparse deconvolution algorithm may be able to resolve the two opposing actin filaments (FIG. 15E) and the ring structure of CCPs (FIG. 15F), the fidelity of which was confirmed by the SIM images on the right. Scale bars: (FIGS. 15A, 15B, and 15D, and 15F) 500 nm; (A, inset) 200 nm.

Figure 16A:
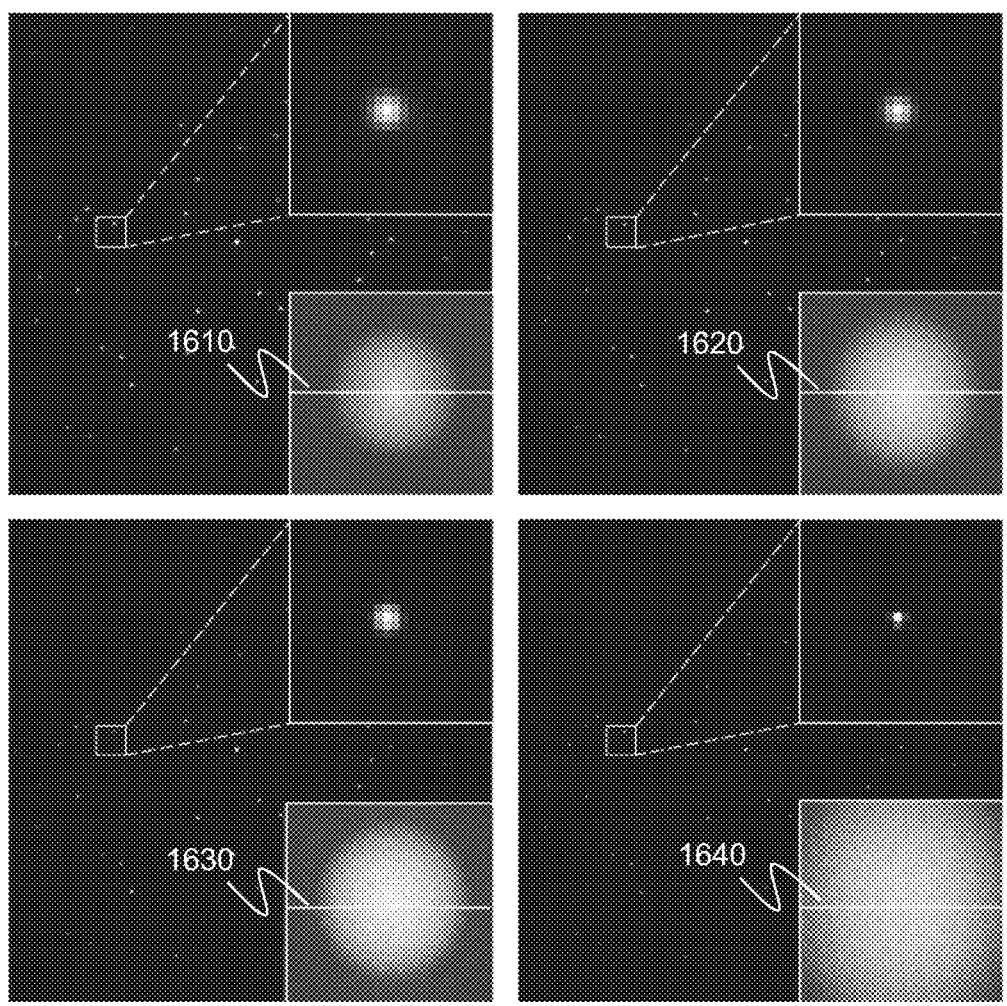
FIGS. 16A and 16B illustrate exemplary results indicating OTFs obtained by the Fourier transform of fluorescent beads visualized under different conditions according to some embodiments of the present disclosure.
Figure 16B:
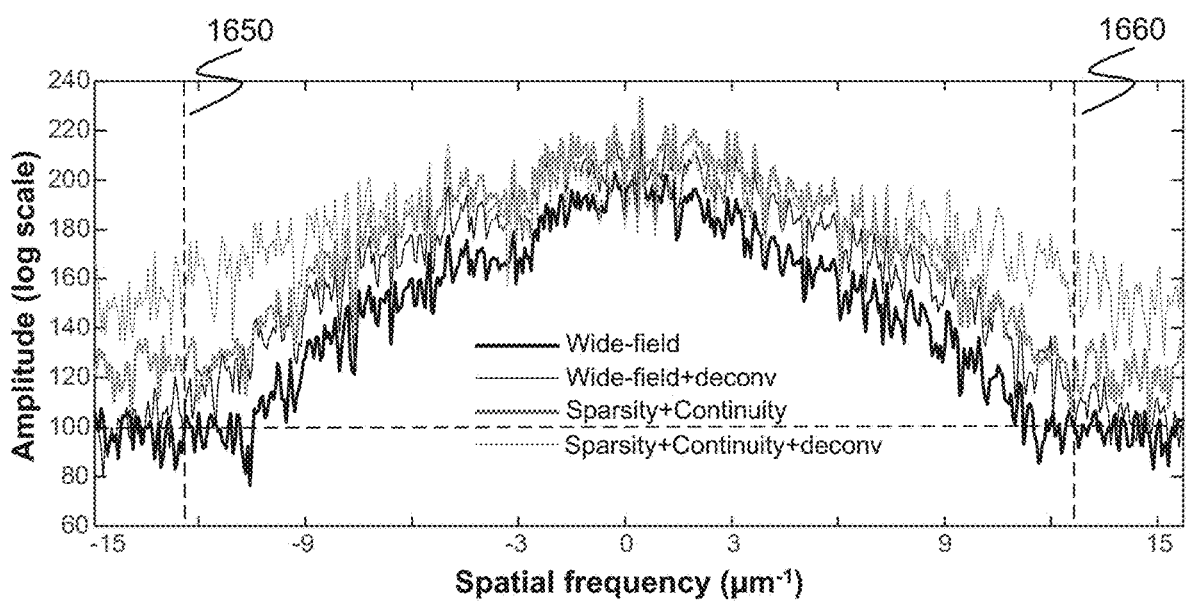

FIGS. 16A and 16B illustrate exemplary results indicating OTFs obtained by the Fourier transform of fluorescent beads visualized under different conditions according to some embodiments of the present disclosure. FIG. 16A shows images of fluorescent beads (48 nm in diameter) under wide-field imaging: (left upper), wide-field followed by deconvolution (right upper), wide-field plus sparsity and continuity reconstruction (left bottom), and wide-field plus sparsity and continuity reconstruction followed by deconvolution (right bottom). Upper insets: A single bead observed under different conditions; Lower insets: the corresponding Fourier transform of the image on the left. FIG. 16B shows the amplitudes along the white lines 1610-1640 in the frequency domain from the low insets in FIG. 16A, while the two vertical dashed lines 1650 and 1660 indicate the spatial frequency limits of the wide-field microscope. Scale bar: 5 μm; inset: 500 nm.

Figure 17A:
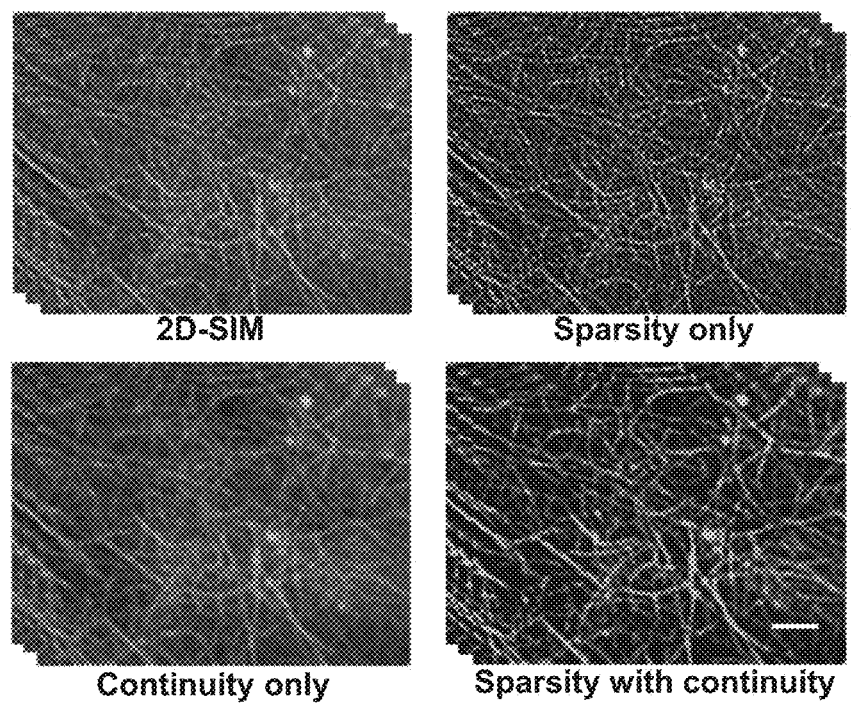
FIGS. 17A and 17B illustrate exemplary results indicating reconstructions with only sparsity, only continuity, or both the sparsity and continuity priors according to some embodiments of the present disclosure.
Figure 17B:
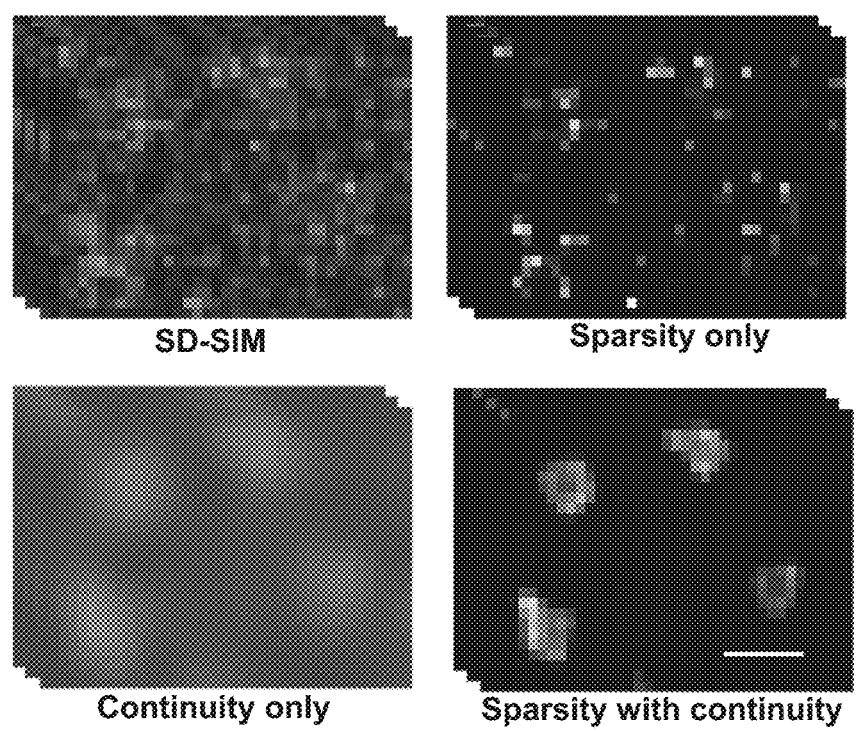

FIGS. 17A and 17B illustrate exemplary results indicating reconstructions with only sparsity, only continuity, or both the sparsity and continuity priors according to some embodiments of the present disclosure. FIG. 17A shows actin filaments labeled with LifeAct-EGFP in a live COS-7 cell in FIG. 8A under 2D-SIM (left), followed by sparsity-constraint reconstruction and deconvolution (middle left), continuity-constraint reconstruction and deconvolution (middle right), or both sparsity and continuity-constraint reconstruction and deconvolution (right). FIG. 17B shows CCPs labeled by Clathrin-EGFP under 2D-SIM (left), followed by sparsity-constraint reconstruction and deconvolution (middle left), continuity-constraint reconstruction and deconvolution (middle right), or both sparsity and continuity-constraint reconstruction and deconvolution (right). Scale bars: (FIG. 17A) 1 μm; (FIG. 17B) 300 nm.

Figure 18A:
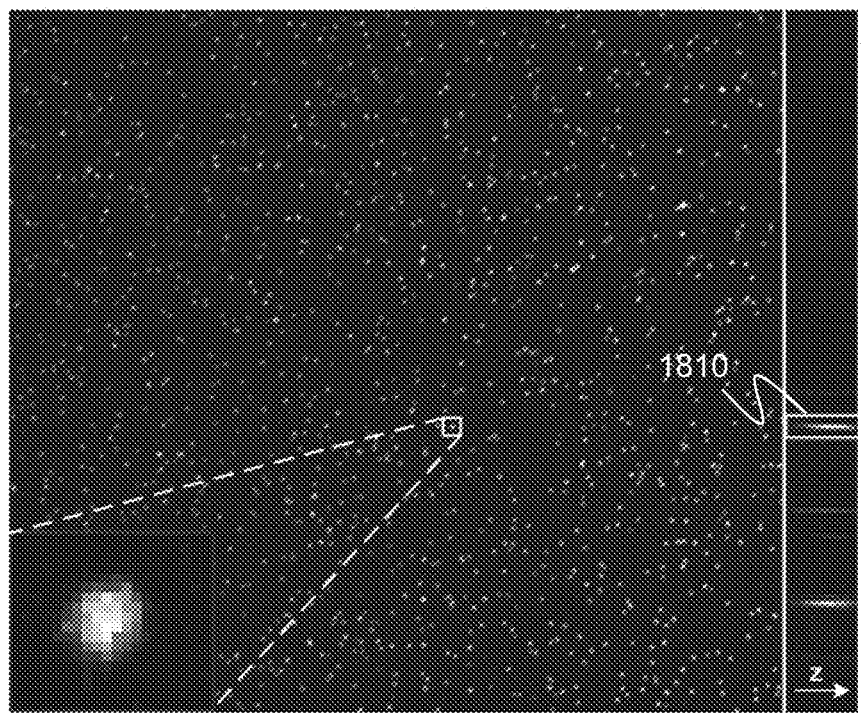
FIGS. 18A-18E illustrate exemplary results indicating a three-dimensional image stack of fluorescent beads under SD-SIM and Sparse SD-SIM according to some embodiments of the present disclosure.
Figure 18B:
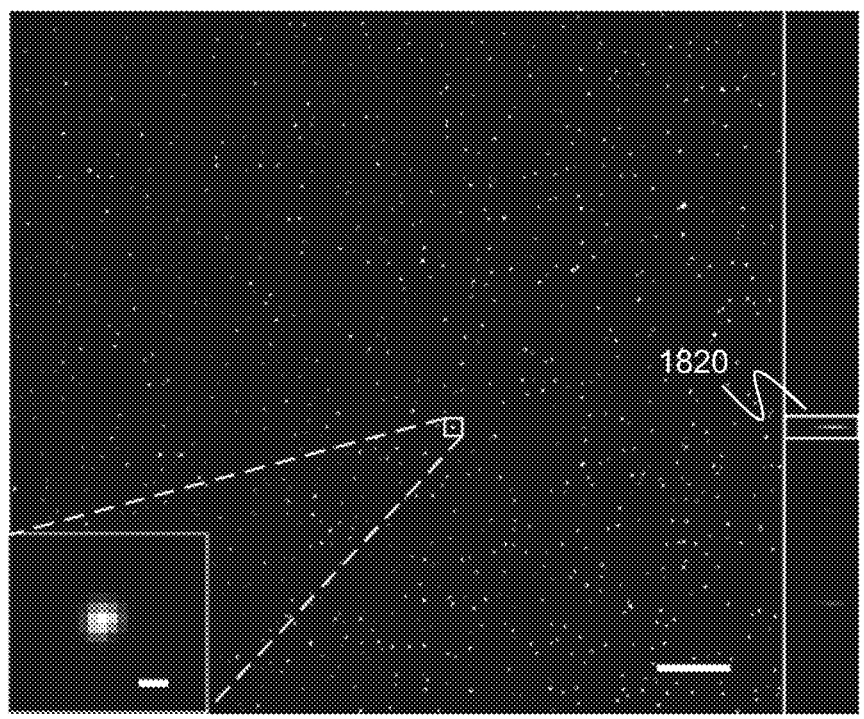
Figure 18C:
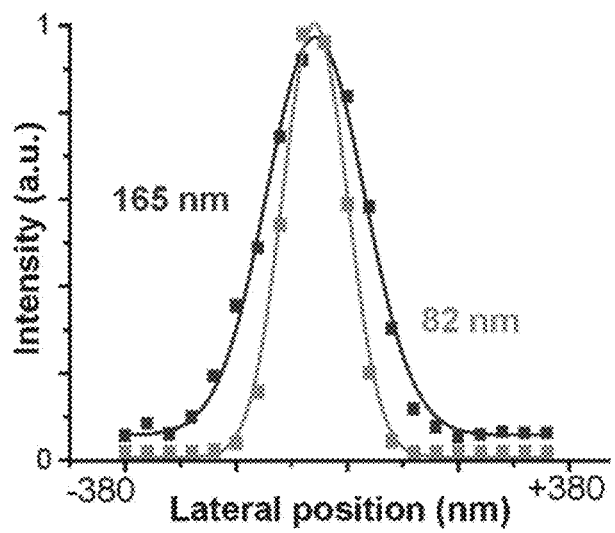
Figure 18D:
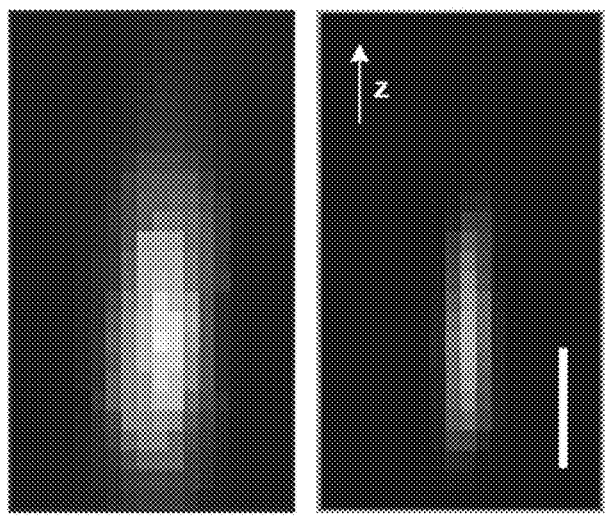
Figure 18E:
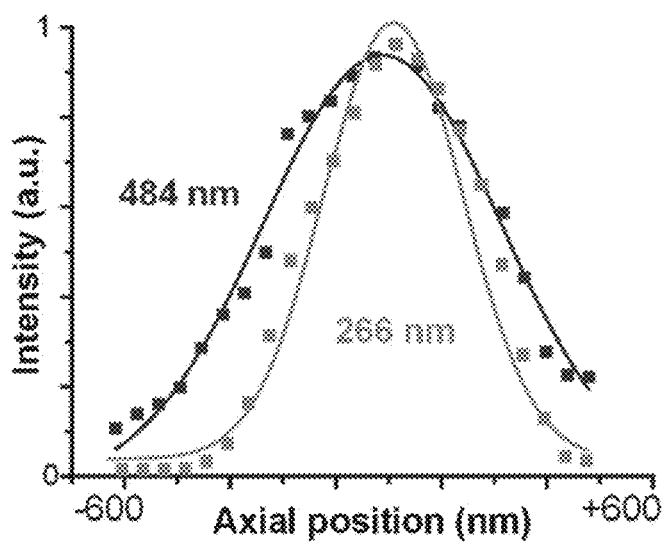

FIGS. 18A-18E illustrate exemplary results indicating three-dimensional image stack of fluorescent beads under SD-SIM and Sparse SD-SIM according to some embodiments of the present disclosure. FIGS. 18A-18B show a maximum intensity projection (MIP) view (left) and a horizontal section (right) of fluorescent beads (100 nm in diameter) recorded by SD-SIM (FIG. 18A) and after the sparse deconvolution (FIG. 18B), respectively. Insets in the left-lower corner show a magnified view of the same fluorescent bead under different reconstruction algorithms. FIG. 18C shows the corresponding Gaussian fitted profiles in (FIG. 18A, left-lower corner), which may indicate that the lateral resolutions of SD-SIM and Sparse SD-SIMmay be 165 nm and 82 nm, respectively. FIG. 18D shows magnified horizontal sections from the boxes 1810 and 1820 in FIGS. 18A and 18B in the left and right panels, while the SD-SIM image may be processed with a median filter to avoid a nonconverged fitting result. As shown in FIG. 18E, gaussian functions may be used to fit the intensity profiles along the axial direction of the fluorescent bead in FIG. 18D, yielding axial resolutions of 484 nm and 266 nm for SD-SIM and Sparse SD-SIM, respectively. Scale bars: (FIG. 18B) 4 μm, (FIG. 18B, inset) 100 nm and (FIG. 18D) 200 nm.

Figure 19A:
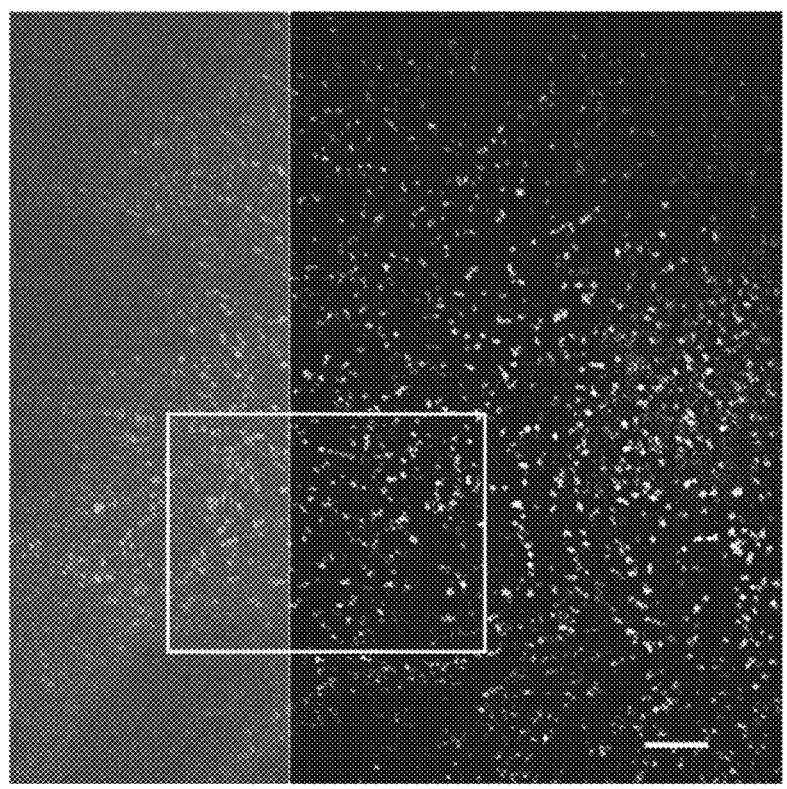
FIGS. 19A-19D illustrate exemplary results indicating two-color live-cell imaging of clathrin and actin by Sparse SD-SIM according to some embodiments of the present disclosure.
Figure 19B:
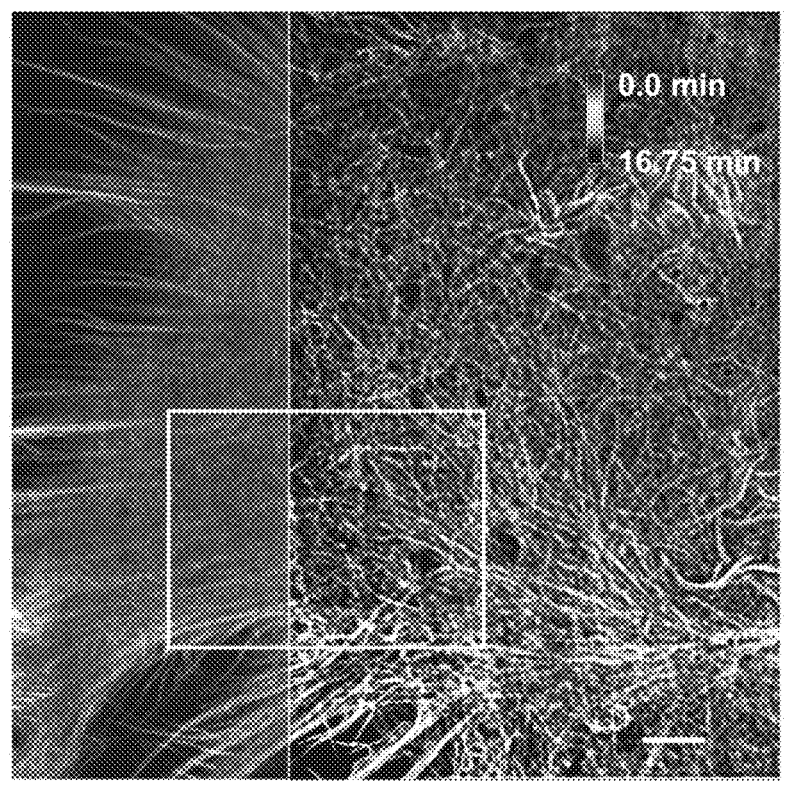
Figure 19C:
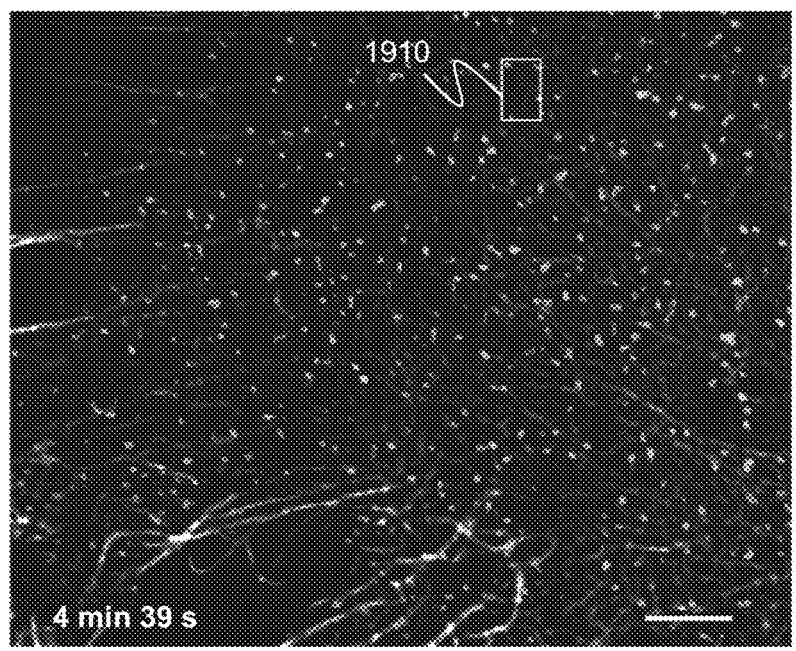
Figure 19D:
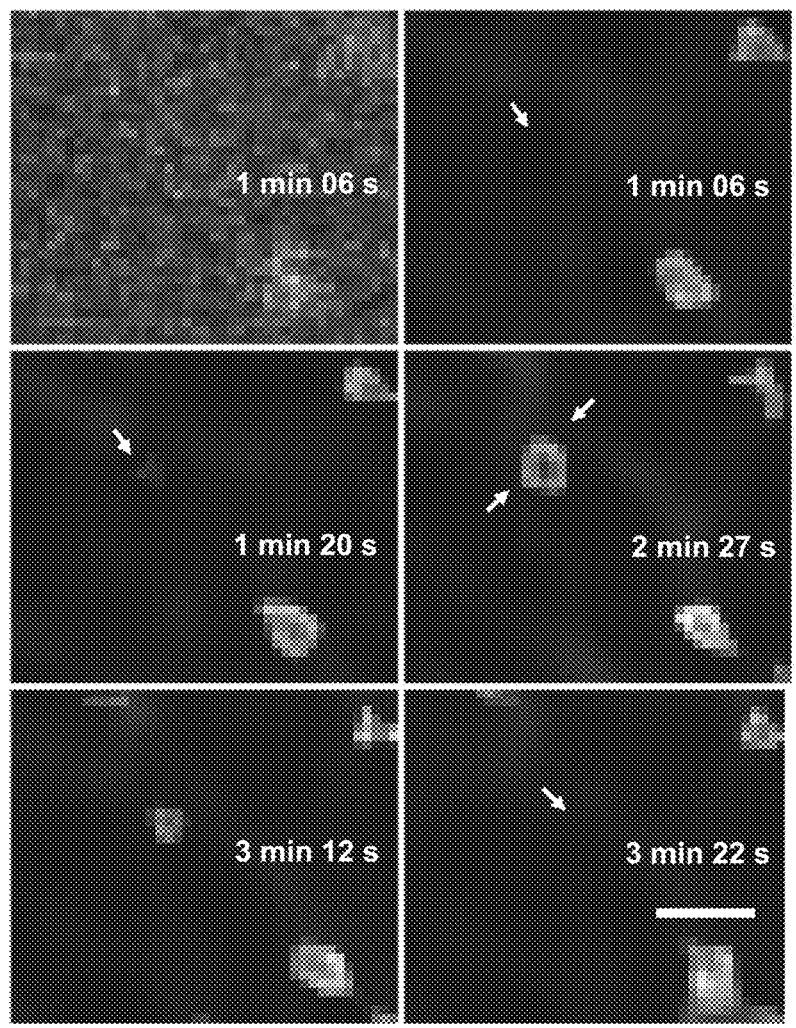

FIGS. 19A-19D. illustrate exemplary results indicating two-color live-cell imaging of clathrin and actin by Sparse SD-SIM according to some embodiments of the present disclosure. FIGS. 19A and 19B show color temporal projections of CCPs (FIG. 19A) and the actin filament network (FIG. 19B) recorded by SD-SIM (left) and Sparse SD-SIM (right) for 16.75 minutes at 5 s intervals. FIG. 19C shows CCPs (cyan) and the cortical actin cytoskeleton (magenta) in a COS-7 cell captured by Sparse SD-SIM. FIG. 19D shows montages of the boxed region 1910 FIG. 19C at five time points at a magnified scale. The first image observed under SD-SIM may appear at the top left corner for comparison. It may be observed that a CCP may dock stably at the junction of two actin filaments and then disappear from the focal plane as these neighboring filaments merge. Scale bars: (FIGS. 19A-19C) 4 µm; (FIG. 19D) 500 nm.

Figure 20A:
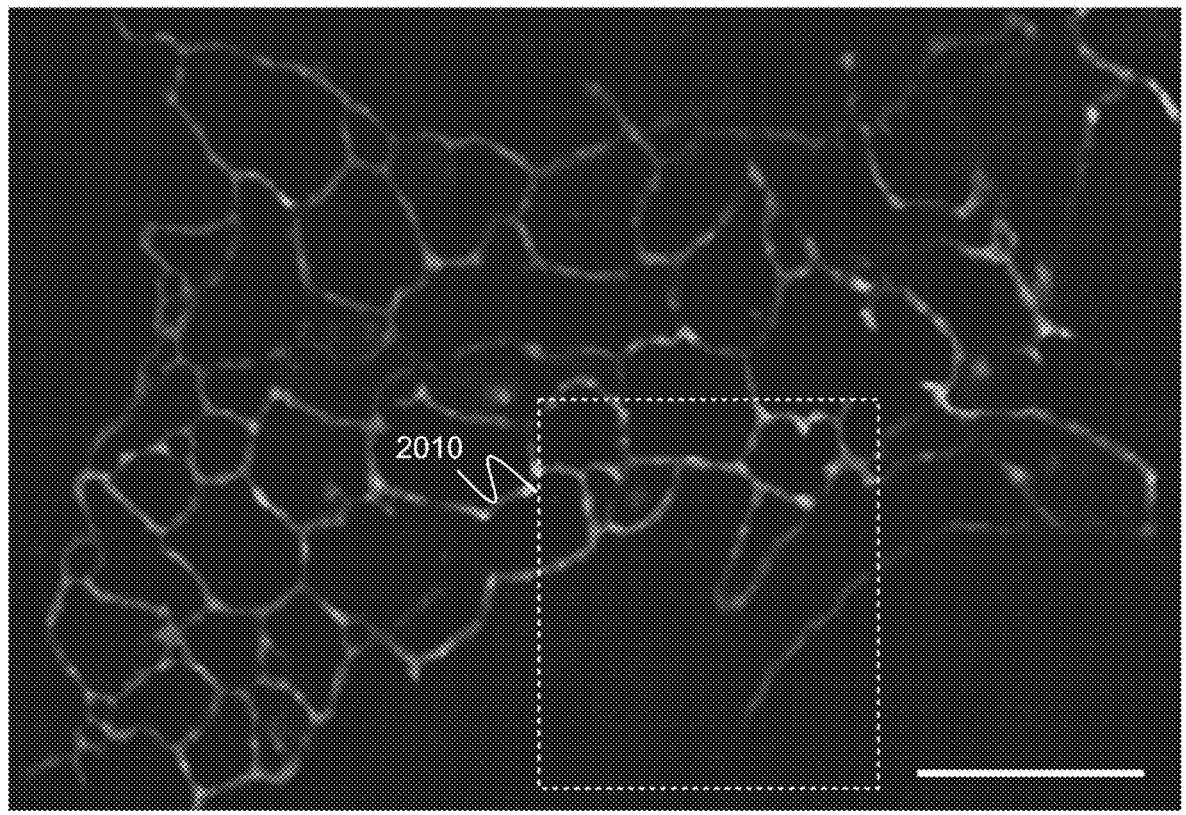
FIGS. 20A and 20B illustrate exemplary results indicating ER-lysosome contacts revealed by the sparse SD-SIM according to some embodiments of the present disclosure.
Figure 20B:
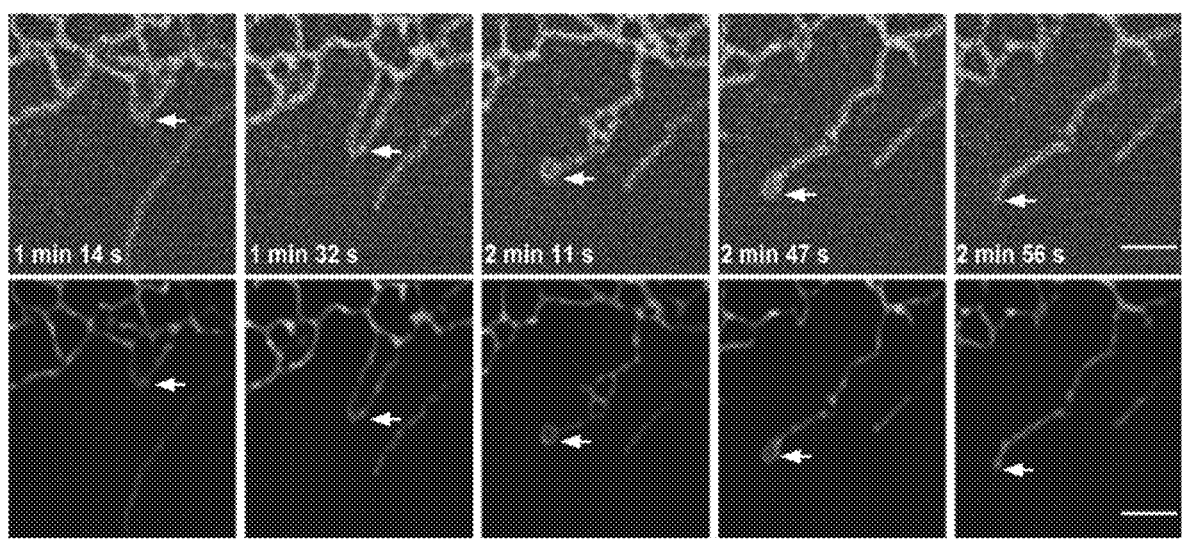

FIGS. 20A and 20B illustrate exemplary results indicating ER-lysosome contacts revealed by the sparse SD-SIM according to some embodiments of the present disclosure. FIG. 20A shows contacts between ER tubules (labeled by Sec61-EGFP, green) and lysosomes (labeled by Lysotracker DeepRed, magenta) visualized by Sparse SD-SIM in live COS-7 cells. FIG. 20B shows time-lapse images of typical lysosome-ER contact dynamics magnified from the dashed-boxed region 2010 in FIG. 20A by SD-SIM (top) and Sparse SD-SIM (bottom). The ER tubules may move along with the lysosome, followed by the contraction of the tubular structure to a polygon surrounding the lysosome (indicated by white arrows) and the final disappearance of the polygon due to the retraction of the ER tubules. Scale bars: (FIG. 20A) 3 µm; (FIG. 20B) 2 µm.

TABLE S1

PSNR of reconstructions by different algorithms from images corrupted with different noise levels (FIG. 13A) with respect to the synthetic ground truth (G representing the Gaussian noise)

| | Without noise | G(11%) | G(25%) | G(50%) | G(80%) |
|---|---|---|---|---|---|
| Wiener-SIM | 18.08 | 10.90 | 9.39 | 8.27 | 11.32 |
| Continuity | 17.94 | 10.85 | 9.40 | 8.23 | 9.73 |
| Continuity$^{+deconv}$ | 23.01 | 13.93 | 11.77 | 10.68 | 13.22 |
| Sparsity$^{+deconv}$ | 27.04 | 17.74 | 15.88 | 15.29 | 15.24 |
| Sparse-SIM | 27.92 | 18.72 | 18.08 | 17.97 | 17.83 |

TABLE S2

SSIM of reconstructions by different algorithms from images corrupted with different noise levels (FIG. 13A) with respect to the synthetic ground truth (G representing the Gaussian noise)

| | Without noise | G(11%) | G(25%) | G(50%) | G(80%) |
|---|---|---|---|---|---|
| Wiener-SIM | 0.5612 | 0.2352 | 0.1773 | 0.1417 | 0.1445 |
| Continuity | 0.5500 | 0.2303 | 0.1724 | 0.1311 | 0.1545 |
| Continuity$^{+deconv}$ | 0.8311 | 0.2886 | 0.1724 | 0.1790 | 0.2107 |
| Sparsity$^{+deconv}$ | 0.9430 | 0.5203 | 0.4178 | 0.2884 | 0.3191 |
| Sparse-SIM | 0.9570 | 0.6832 | 0.6431 | 0.6167 | 0.6251 |

TABLE S3

Imaging conditions used in different FIGS.

| Microscope | FIG. | Label | Wavelength (nm) | Exposure (ms) | Illumination intensity (W/cm$^2$) |
|---|---|---|---|---|---|
| SIM | FIG. 8A | LifeAct-EGFP | 488 | 20 × 9 | 2 |
| | FIG. 8J | Caveolin-EGFP | 488 | 7 × 9 | 14 |
| | | LAMP1-EGFP | 488 | 20 × 9 | 2 |
| | FIG. 8M | LysoView 488 | 488 | 20 × 9 | 2 |
| | | LipidSpot 488 | 488 | 20 × 9 | 2 |
| | FIG. 8O | VAMP2-pHluorin | 488 | 0.2 × 9 | 187 |
| | FIG. 9A | MitoTracker Green | 488 | 7 × 9 | 14 |
| | | Tom20-mScarlet | 561 | 7 × 9 | 50 |
| | FIG. 9F | MitoTracker Green | 488 | 7 × 9 | 14 |
| | | Sec61β-mCherry | 561 | 7 × 9 | 100 |
| | FIG. 15B | Clathrin-EGFP | 488 | 7 × 9 | 14 |
| SD-SIM | FIG. 10A | Clathrin-EGFP | 488 | 200 | 0.91 |
| | FIGS. 10G | Lifeact-EGFP | 488 | 200 | 0.89 |
| | and 19 | Clathrin-DsRed | 561 | 300 | 12.11 |
| | FIG. 10K | Tom20-mCherry | 561 | 200 | 8.84 |
| | | Hoechst H1399 | 405 | 200 | 0.87 |
| | FIG. 10H | Tubulin-EGFP | 488 | 200 | 0.91 |
| | | Lamp1-mCherry | 561 | 200 | 8.84 |
| | | MitoTracker ® Deep Red FM | 640 | 50 | 1.07 |
| | FIG. 20 | Sec61β-EGFP | 488 | 200 | 0.77 |
| | | Lysotracker Deep Red | 640 | 200 | 0.92 |
| | FIG. 12 | MitoTracker Green | 488 | 150 | 0.43 |
| | FIG. 11A | Sec61β-EGFP | 488 | 200 | 0.91 |
| | | Pex11a-BFP | 405 | 100 | 0.87 |
| | FIG. 11E | Tubulin-EGFP | 488 | 300 | 0.91 |
| | | Lamp1-mCherry | 561 | 200 | 4.96 |
| | | Hoechst H1399 | 405 | 50 | 0.87 |
| | FIG. 11H | Tubulin-EGFP | 488 | 200 | 0.89 |
| | | MitoTracker ® Deep Red FM | 640 | 50 | 0.27 |

By developing the sparse deconvolution algorithm, the long-sought goal of applying mathematical SR to image data from different fluorescence microscopes may be accomplished. In the present disclosure, evidence that demonstrates the fidelity of mathematical SR may be presented. First, in the simulated experiments with synthetic structures, it may show that sparse deconvolution may provide many more intricate details that resemble the ground truth than conventional SIM deconvolution does (FIGS. 13 and 14). Second, by using sparse deconvolution on wide-field images reconstructed from raw SIM images, it may be able to observe intricate structures inaccessible to wide-field microscopy, such as branched filaments or the ring-shaped CCP (FIGS. 15E and 15F). The fidelities of these structures may be fully confirmed by corresponding SR-SIM reconstructions. Third, for real biological structures without ground truth images, the improvements in spatial resolution may be quantitatively evaluated by the FRC technique and the claimed resolution may be confirmed by its ability to distinguish adjacent structures. In agreement with the nearly doubled resolution of SD-SIM from substantially 150 nm to substantially 80 nm, it may be able to resolve most ring-shaped CCPs whose mean diameters are centered at substantially 150 nm (FIG. 9). Fourth, using the Sparse TIRF-SIM, it may be able to resolve many ring-shaped caveolae with diameters of substantially 60 nm. Likewise, the sizes of cortical actin mesh pores measured with Sparse-SIM may be substantially 160 nm (FIG. 8I). Finally, when using sparse deconvolution on an individual, a 2D image from the volumetric stack obtained by SD-SIM may enhance the axial resolution by twofold, while manually upsampling in combination with the sparse deconvolution algorithm may be able to retrieve the SR information formerly limited by the Nyquist sampling criteria. Taken together, these data may suggest that the spatial resolution extension by the sparse deconvolution algorithm may be legitimate and real and may be combined with other hardware-based SR techniques to provide resolution enhancements with a reduced photon budget (Table S3).

For microscopists, it may be long believed that the bandwidth of the microscope may be invariant. However, an alternative point of view in which the total information carried by the microscope may be invariant may be demonstrated by examples in the present disclosure. In this sense, introducing additional priori knowledge of the object being imaged may be used to achieve mathematical SR. The bona fide extension of the bandwidth frequency limited by the image acquisition device 110 may be due to the deconvolution algorithm in the present disclosure. The inclusion of the Hessian penalty on the object continuity may increase image SNR, which may be critical for any band-limited frequency extrapolations beyond the OTF. Without the continuity prior, sparse deconvolution may led to over-sharpening or random artifacts (FIGS. 14 and 17). In contrast to the band-width extrapolation techniques, which aim to reconstruct all the object details, the sparsity prior may be used as an adjustable parameter to constrain the iterative approximation of SR information. By adjusting the parameters to impose only a mild requirement on the sparsity of objects in the final reconstructions, it may avoid removing weak fluorescent signals and enable the algorithm to be generally applicable to different datasets. The final iterative deconvolution step may also essential to boost the high-frequency information extended beyond the OTF and achieve the visual separation of closely packed structures (FIGS. 13, 14, 16, and 18). The fact that the resolutions of at least three types of microscopes may be extended by the sparse deconvolution algorithm may suggest that the sparse deconvolution algorithm may be generally applicable to other SR microscopy.

Among the different possible applications of sparse deconvolution, Sparse-SIM may achieve an unprecedented spatiotemporal resolution combination. At a substantially 60 nm resolution and a 564 Hz frame rate, opening of vesicle fusion pores smaller than 90 nm may be seen earlier and longer pore durations may readily be observed (FIGS. 8O and 8P), which may shed light on the molecular mechanism underlying vesicle fusion and other ultrafast processes. The different configurations of outer and inner mitochondrial membranes observed by the Sparse-SIM may indicate that it may also be useful in revealing details regarding organelles and organelle contacts in live cells. For multicolor three-dimensional SR imaging, Sparse SD-SIM may represent a better choice. At the price of reduced temporal resolution, Sparse SD-SIM may better preserve the resolution and contrast throughout different planes within the live cell, and the reduced illumination dosage may also enable long-term three-dimensional SR imaging.

In summary, it may be demonstrated the general applicability of the sparse deconvolution algorithm and its ability to mathematically enhance the resolution of any existing fluorescence microscope images. Its combination with hardware-based SR microscopes enables substantially 60 nm resolution at unprecedented substantially millisecond (ms) temporal resolution and may enable routine multicolor, sub-90-nm SR imaging for biologists, which may help the biologists better resolve different structures and dynamics in time and space in three dimensions.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image processing, implemented on at least one machine each of which has at least one processor and at least one storage device, comprising:
   obtaining a preliminary image;
   generating an estimated background image by performing an iterative wavelet transformation operation on the preliminary image;
   generating an intermediate image by performing, based on a first objective function, a first iterative operation on the preliminary image, the first objective function being associated with sparsity of the intermediate image, wherein the first objective function includes an L-2 norm of a fourth difference between the estimated background image and a first difference between the intermediate image and the preliminary image; and
   generating a target image based on the intermediate image.

2. The method of claim 1, wherein the obtaining a preliminary image comprises:
   performing Wiener inverse filtering on image data generated by an image acquisition device.

3. The method of claim 1, wherein the first objective function further includes a first weight factor relating to image fidelity of the intermediate image.

4. The method of claim 1, wherein the iterative wavelet transformation operation includes one or more iterations, and each current iteration comprises:
   determining an input image based on the preliminary image or an estimated image generated in a previous iteration;

generating a decomposed image by performing a multi-level wavelet decomposition operation on the input image;

generating a transformed image by performing an inverse wavelet transformation operation on the decomposed image;

generating an updated transformed image based on the transformed image and the input image;

generating an estimated image for the current iteration by performing a cut-off operation on the updated transformed image; and in response to determining that a termination condition is satisfied, designating the estimated image as the background image.

5. The method of claim 1, wherein the first objective function is further associated with continuity of the intermediate image, and the first objective function includes a Hessian matrix of the intermediate image.

6. The method of claim 1, wherein the first objective function further includes a second weight factor relating to the sparsity of the intermediate image, or an L-1 norm of the intermediate image.

7. The method of claim 1, wherein the first iterative operation comprises:

determining an initial estimated intermediate image based on the preliminary image; and updating an estimated intermediate image by performing, based on the initial estimated intermediate image, a plurality of iterations of the first objective function, wherein in each of the plurality of iterations,
in response to determining that a termination condition is satisfied,
finalizing the intermediate image.

8. The method of claim 2, wherein the generating the target image based on the intermediate image comprises:

performing, based on a second objective function, a second iterative operation on the intermediate image, the second objective function including an L-2 norm of a third difference between the intermediate image and the target image multiplied by a system matrix of the image acquisition device.

9. The method of claim 8, wherein the second iterative operation includes an iterative deconvolution.

10. The method of claim 2, wherein the image acquisition device includes a structured illumination microscope or a fluorescence microscope.

11. A method for image processing, implemented on at least one machine each of which has at least one processor and at least one storage device, comprising:

generating a preliminary image by filtering image data generated by an image acquisition device;

generating an estimated background image by performing an iterative wavelet transformation operation on the preliminary image;

generating an intermediate image by performing, based on a first objective function, a first iterative operation on the preliminary image, the first iterative operation including sparse deconvolution of the intermediate image, wherein the first objective function includes an L-2 norm of a fourth difference between the estimated background image and a first difference between the intermediate image and the preliminary image; and generating a target image by performing, based on a second objective function, a second iterative operation on the intermediate image, the second objective function being associated with a system matrix of the image acquisition device, the intermediate image, and the target image.

12. The method of claim 11, wherein the filtering the image data comprises:

filtering the image data by performing Wiener inverse filtering on the image data.

13. The method of claim 11, wherein the first objective function is associated with image fidelity of the intermediate image, continuity of the intermediate image, or sparsity of the intermediate image.

14. The method of claim 11, further comprising:

generating an estimated background image by performing an iterative wavelet transformation operation on the preliminary image, the first objective function being associated with the estimated background image.

15. The method of claim 14, wherein the iterative wavelet transformation operation includes one or more iterations, and each current iteration comprises:

determining an input image based on the preliminary image or an estimated image generated in a previous iteration;

generating a decomposed image by performing a multi-level wavelet decomposition operation on the input image;

generating a transformed image by performing an inverse wavelet transformation operation on the decomposed image;

generating an updated transformed image based on the transformed image and the input image;

generating an estimated image for the current iteration by performing a cut-off operation on the updated transformed image; and in response to determining that a termination condition is satisfied, designating the estimated image as the background image.

16. The method of claim 11, wherein the first iterative operation comprises:

determining an initial estimated intermediate image based on the preliminary image; and updating an estimated intermediate image by performing, based on the initial estimated intermediate image, a plurality of iterations of the first objective function, wherein in each of the plurality of iterations, in response to determining that a termination condition is satisfied, finalizing the intermediate image.

17. The method of claim 11, wherein the second iterative operation includes an iterative deconvolution, and the second objective function is associated with a third difference between the intermediate image and the target image multiplied by the system matrix.

18. A system for image processing, comprising:

at least one storage medium including a set of instructions; and at least one processor in communication with the at least one storage medium, wherein when executing the set of instructions, the at least one processor is directed to cause the system to perform operations including:

obtaining a preliminary image;

generating an estimated background image by performing an iterative wavelet transformation operation on the preliminary image;

generating an intermediate image by performing, based on a first objective function, a first iterative operation on the preliminary image, the first objective function being associated with sparsity of the intermediate image, wherein the first objective function includes an L-2 norm of a fourth difference between the estimated background image and a first difference between the intermediate image and the preliminary image; and generating a target image based on the intermediate image.

* * * * *